United States Patent
Ahmed et al.

(10) Patent No.: US 12,459,908 B2
(45) Date of Patent: Nov. 4, 2025

(54) ALPHA, BETA UNSATURATED METHACRYLIC ESTERS WITH ANTI-INFLAMMATORY PROPERTIES

(71) Applicant: Sitryx Therapeutics Limited, Oxford (GB)

(72) Inventors: Saleh Ahmed, Nottingham (GB); Michael Liam Cooke, Nottingham (GB); Matthew Colin Thor Fyfe, Oxford (GB)

(73) Assignee: Sitryx Therapeutics Limited, Oxford (GB)

( * ) Notice: Subject to any disclaimer, the term of this patent is extended or adjusted under 35 U.S.C. 154(b) by 466 days.

(21) Appl. No.: 18/019,632

(22) PCT Filed: Aug. 5, 2021

(86) PCT No.: PCT/GB2021/052026
§ 371 (c)(1),
(2) Date: Feb. 3, 2023

(87) PCT Pub. No.: WO2022/029438
PCT Pub. Date: Feb. 10, 2022

(65) Prior Publication Data
US 2024/0018111 A1  Jan. 18, 2024

(30) Foreign Application Priority Data
Aug. 5, 2020 (EP) .................... 20189667
Nov. 4, 2020 (EP) .................... 20205659

(51) Int. Cl.
*C07D 271/06* (2006.01)
*A61P 29/00* (2006.01)
*C07D 413/12* (2006.01)

(52) U.S. Cl.
CPC .......... *C07D 271/06* (2013.01); *A61P 29/00* (2018.01); *C07D 413/12* (2013.01)

(58) Field of Classification Search
CPC ...... C07D 271/06; C07D 413/12; A61P 29/00
See application file for complete search history.

(56) References Cited

U.S. PATENT DOCUMENTS

| 2020/0155490 A1 | 5/2020 | Artyomov |
| 2020/0375929 A1 | 12/2020 | Artyomov |
| 2022/0265595 A1 | 8/2022 | Cooke et al. |

FOREIGN PATENT DOCUMENTS

| WO | 2017142855 A1 | 8/2017 |
| WO | 2019036509 A1 | 2/2019 |
| WO | 2021130492 A1 | 7/2020 |
| WO | 2020222010 A1 | 11/2020 |
| WO | 2020222011 A1 | 11/2020 |
| WO | 2022038365 A2 | 2/2022 |
| WO | 2022090714 A1 | 5/2022 |
| WO | 2022090723 A1 | 5/2022 |
| WO | 2022090724 A1 | 5/2022 |
| WO | 2022229617 A1 | 11/2022 |
| WO | 2022269251 A1 | 12/2022 |

OTHER PUBLICATIONS

Jurgen Bruck et al; A review of the mechanisms of action of dimethylfumarate in the treatment of psoriasis, Experimental Dermatology, Mar. 22, 2018, vol. 27, No. 6, p. 620.
Evanna Mills et al; Itaconate is an anti-inflammatory metabolite that activates Nrf2 via alkylation of KEAPI, Nature, Apr. 5, 2018, vol. 556, No. 7699, pp. 113-117.
Patra et al.; Isoxazole-Based Derivatives from Baylis-Hillman Chemistry: Assessment of Preliminary Hypolipidemic Activity, Feb. 21, 2003 Bioorg. Med. Chem. 2003, 11, 2269-2276.
Shen et al.; Discovery of Biaryl Anthranilides as Full Agonists for the High Affinity Niacin Receptor, Jul. 31, 2007, J. Med. Chem. 2007, 50, 6303-6306.
Zhang et al.; Design and synthesis of natural product derivatives with selective and improved cytotoxicity base on a sesquiterpene scaffold, Mar. 8, 2016Bioorg. Med. Chem. Lett. 2016, 26, 1885-1888.

*Primary Examiner* — Andrew S Rosenthal
(74) *Attorney, Agent, or Firm* — Faegre Drinker Biddle & Reath LLP

(57) ABSTRACT

The invention relates to compounds of formula (I):

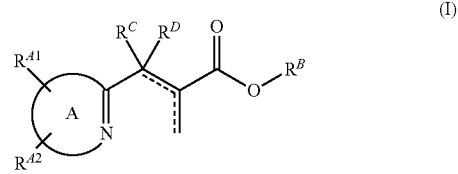

wherein A, $R^{A1}$, $R^{A2}$, $R^B$, $R^C$ and $R^D$ are as defined herein, and associated aspects.

19 Claims, No Drawings

ALPHA, BETA UNSATURATED METHACRYLIC ESTERS WITH ANTI-INFLAMMATORY PROPERTIES

CROSS-REFERENCE TO RELATED APPLICATIONS

This application is the National Stage of International Application No. PCT/GB2021/052026 filed Aug. 5, 2021, which claims priority to and benefit of European Application Nos. 20189667.7 filed Aug. 5, 2020, and 20205659.4 filed Nov. 4, 2020, each of which is herein incorporated by reference in its entirety.

FIELD OF THE INVENTION

The present invention relates to compounds for use in treating or preventing inflammatory diseases or diseases associated with an undesirable immune response, and to related compositions, methods, uses and intermediate compounds.

BACKGROUND OF THE INVENTION

Chronic inflammatory diseases such as rheumatoid arthritis, systemic lupus erythematosus (SLE), multiple sclerosis, psoriasis, Crohn's disease, ulcerative colitis, uveitis and chronic obstructive pulmonary disease (COPD) represent a significant burden to society because of life-long debilitating illness, increased mortality and high costs for therapy and care (Straub R. H. and Schradin C., 2016). Non-steroidal anti-inflammatory drugs (NSAIDs) are the most widespread medicines employed for treating inflammatory disorders, but these agents do not prevent the progression of the inflammation and only treat the accompanying symptoms. Glucocorticoids are powerful anti-inflammatory agents, making them emergency treatments for acute inflammatory flares, but given longer term these medicines give rise to a plethora of unwanted side-effects and may also be subject to resistance (Straub R. H. and Cutolo M., 2016). Thus, considerable unmet medical need still exists for the treatment of inflammatory disorders and extensive efforts to discover new medicines to alleviate the burden of these diseases is ongoing (Hanke T. et al., 2016).

Dimethyl fumarate (DMF), a diester of the citric acid cycle (CAC) intermediate fumaric acid, is utilised as an oral therapy for treating psoriasis (Brück J. et al., 2018) and multiple sclerosis (Mills E. A. et al., 2018). Importantly, following oral administration, none of this agent is detected in plasma (Dibbert S. et al., 2013), the only drug-related compounds observed being the hydrolysis product monomethyl fumarate (MMF) and glutathione (GSH) conjugates of both the parent (DMF) and metabolite (MMF). DMF's mechanism of action is complex and controversial. This compound's efficacy has been attributed to a multiplicity of different phenomena involving covalent modification of proteins and the conversion of "prodrug" DMF to MMF. In particular, the following pathways have been highlighted as being of relevance to DMF's anti-inflammatory effects: 1) activation of the anti-oxidant, anti-inflammatory, nuclear factor (erythroid-derived 2)-like 2 (NRF2) pathway as a consequence of reaction of the electrophilic α,β-unsaturated ester moiety with nucleophilic cysteine residues on kelch-like ECH-associated protein 1 (KEAP1) (Brennan M. S. et al., 2015); 2) induction of activating transcription factor 3 (ATF3), leading to suppression of pro-inflammatory cytokines interleukin (IL)-6 and IL-8 (Müller S. et al., 2017); 3) inactivation of the glycolytic enzyme glyceraldehyde 3-phosphate dehydrogenase (GAPDH) through succination of its catalytic cysteine residue with a Michael accepting unsaturated ester (Kornberg M. D. et al., 2018; Angiari S. and O'Neill L. A., 2018); 4) inhibition of nuclear factor-kappaB (NF-κB)-driven cytokine production (Gillard G. O. et al., 2015); 5) prevention of the association of PKCθ with the costimulatory receptor CD28 to reduce the production of IL-2 and block T-cell activation (Blewett M. M. et al., 2016); 6) reaction of the electrophilic α,β-unsaturated ester with the nucleophilic thiol group of anti-oxidant GSH, impacting cellular responses to oxidative stress (Lehmann J. C. U. et al., 2007); 7) agonism of the hydroxycarboxylic acid receptor 2 (HCA2) by the MMF generated in vivo through DMF hydrolysis (von Glehn F. et al., 2018); 8) allosteric covalent inhibition of the p90 ribosomal S6 kinases (Andersen J. L. et al., 2018); 9) inhibition of the expression and function of hypoxia-inducible factor-1a (HIF-1α) and its target genes, such as IL-8 (Zhao G. et al., 2014); and 10) inhibition of Toll-like receptor (TLR)-induced M1 and K63 ubiquitin chain formation (McGuire V. A. et al., 2016). In general, with the exception of HCA2 agonism (Tang H. et al., 2008), membrane permeable diester DMF tends to exhibit much more profound biological effects in cells compared to its monoester counterpart MMF. However, the lack of systemic exposure of DMF in vivo has led some researchers to assert that MMF is, in fact, the principal active component following oral DMF administration (Mrowietz U. et al., 2018). As such, it is evident that some of the profound biology exerted by DMF in cells is lost because of hydrolysis in vivo to MMF.

Recently, it has been discovered that, during inflammatory macrophage activation, the CAC becomes anaplerotic and is diverted such that the unsaturated diacid itaconic acid, "itaconate", is generated (Murphy M. P. and O'Neill L. A. J., 2018; O'Neill L. A. J. and Artyomov M. N., 2019; Yu X.-H. et al., 2019). Instead of being hydrated to isocitrate by aconitate hydratase, the CAC intermediate aconitate is decarboxylated by the protein product of immune-responsive gene 1 (IRG1), one of the most highly upregulated genes in macrophages under proinflammatory conditions, subsequently named aconitate decarboxylase 1, to produce itaconic acid (Michelucci A. et al., 2013). This unsaturated diacid is an inhibitor of the bacterial enzyme isocitrate lyase and, as such, it exerts anti-bacterial activity. In addition, itaconic acid has been shown to inhibit the CAC enzyme succinate dehydrogenase (SDH) (Ackermann et al., 1949), leading accordingly to succinate accumulation (Cordes T. et al., 2016). By inhibiting SDH, an enzyme critical for the inflammatory response (E. L. Mills et al., 2016), itaconate ameliorates inflammation in vitro and in vivo during macrophage activation and ischemia-reperfusion injury (Lampropoulou V. et al., 2016).

Like fumaric acid, itaconic acid is an α,β-unsaturated carboxylic acid. As such, it is a Michael acceptor which induces a global electrophilic stress response. In this regard, the itaconic acid diesterdimethyl itaconate (DMI), like DMF, produces an anti-inflammatory response, reducing the expression levels of pro-inflammatory cytokines IL-1β, IL-6, IL-12 and IL-18 in lipopolysaccharide (LPS)-stimulated bone marrow-derived macrophages (WO2017/142855A1, incorporated herein by reference). This response appears to be mediated, in part, by NRF2 activation, via alkylation of KEAP1 cysteine residues by the electrophilic α,β-unsaturated ester moiety (Mills E. L. et al., 2018), which enhances the expression of downstream genes with anti-oxidant and anti-inflammatory capacities. Nevertheless, not all of the pronounced immunoregulatory effects engendered by DMI can be attributed to NRF2 activation. In particular, the modulation of IκBζ by DMI is independent of NRF2 and is mediated via upregulation of ATF3, a global negative regulator of immune activation that downregulates various cytokines, such as IL-6 (Bambouskova M. et al., 2018). Moreover, by inhibiting IκBζ protein production, DMI ameliorates IL-17-mediated pathologies, highlighting the therapeutic potential of this regulatory pathway (WO2019/036509A1, incorporated herein by reference). Further highlighting its pharmacologic potential, DMI has recently been reported to 1) demonstrate a protective effect on cerebral ischemia/reperfusion injury, thereby offering potential for the treatment of ischemic stroke (Zhang D. et al., 2019); 2) provide protection from the cardiotoxic effects of doxorubicin (Shan Q. et al., 2019); 3) protect against lipolysacchride-induced mastitis in mice by activating MAPKs and NRF2 while inhibiting NF-κB signaling pathways (Zhao C. et al., 2019). Furthermore, DMI is said to have utility in preventing and treating ulcerative colitis and canceration thereof (CN110731955, Sun Yat-sen University Cancer Center); and has been reported to protect against fungal keratitis by activating the NRF2/HO-1 signalling pathway (Gu L. et al., 2020). Nevertheless, it should be noted that DMI is not metabolised to itaconic acid intracellularly (ElAzzouny M. et al., 2017). Other α,β-unsaturated esters and acids exhibit IL-1β-lowering effects in macrophages by inhibiting the NLRP3 inflammasome (Cocco M. et al., 2017 and 2014), and have been demonstrated to inhibit the TLR4 pathway, leading ultimately to suppression of LPS-induced stimulation of NF-κB, tumour necrosis factor (TNF)-α, IL-1β and nitric oxide release (Zhang S. et al., 2012). WO2014/152263A1 (Karyopharm Therapeutics, Inc.) describes α,β-unsaturated esters which are said to be chromosomal region maintenance 1 (CRM1) inhibitors. CRM-1 plays a role in exporting several key proteins that are involved in many inflammatory processes.

Other itaconic acid derivatives have been demonstrated to elicit anti-inflammatory effects (Bagavant G. et al., 1994). A notable example is 4-octyl itaconic acid (4OI), an itaconate derivative with improved cellular uptake. Since the α,β-unsaturated carboxylic acid is not esterified in 4OI, this electrophile exhibits low reactivity with biological thiols (Schmidt T. J. et al., 2007), much like the situation encountered with itaconic acid itself. As a result of its low reactivity/electrophilicity, the NRF2-activating effects of 4OI are not attenuated by GSH, in contrast to the findings with the much more reactive DMI. In this latter case, the α,β-unsaturated carboxylic acid is esterified and, as a consequence, the IL-6-lowering and NRF2-activating effects of DMI are reversed by the thiols N-acetylcysteine and GSH, respectively. Through the reaction with KEAP1 and the resulting NRF2 activation, as well as GAPDH inhibition (Liao S.-T. et al., 2019), 4OI has been demonstrated to produce a wide range of interesting biological effects, including: 1) protection of neuronal cells from hydrogen peroxide (Liu H. et al., 2018); 2) inhibition of proinflammatory cytokine production in peripheral blood mononuclear cells of SLE patients (Tang C. et al., 2018); 3) protection of human umbilical vein endothelial cells from high glucose (Tang C. et al., 2019); 4) inhibition of osteoclastogenesis by suppressing the E3 ubiquitin ligase Hrd1 and activating NRF2 signaling (Sun X. et al., 2019); 5) induction of repression of STING by NRF2 and type I IFN production in cells from patients with STING-dependent interferonopathies (Olagnier D. et al., 2018); 6) protection against renal fibrosis via inhibiting the TGF-beta/Smad pathway, autophagy and reducing generation of reactive oxygen species (Tian F. et al., 2020); 7) reduction of brain viral burden in mice intracranially injected with Zika virus (Daniels B. P. et al. 2019); and 8) protection against liver ischemia-reperfusion injury (Yi F. et al. 2020). Furthermore, itaconate has been reported to modulate tricarboxylic acid and redox metabolism to mitigate reperfusion injury (Cordes T. et al., 2020). In addition, raised plasma itaconate levels demonstrate a clear correlation with reduction in rheumatoid arthritis disease activity scores following commencement of therapy with conventional disease modifying anti-rheumatic drug (cDMARD) therapy (Daly R. et al., 2019).

Artyomov et al. (WO2017/142855; WO2019/036509) disclose the use of itaconate, malonate or a derivative thereof as an immunomodulatory agent.

In spite of the above findings, there remains a need to identify and develop new α,β-unsaturated carboxyl compounds such as itaconate and acrylate derivatives possessing enhanced properties compared to currently marketed anti-inflammatory agents, such as DMF. The present inventors have now discovered, surprisingly, that certain α,β-unsaturated methacrylic esters possessing heteroaryl groups are effective at reducing cytokine release, activating NRF2 in cells and/or have improved metabolic stability. These properties make them potentially more effective than 4-octyl itaconate in particular. Such compounds are therefore expected to possess excellent anti-inflammatory properties.

SUMMARY OF THE INVENTION

The invention relates to a compound of formula (I):

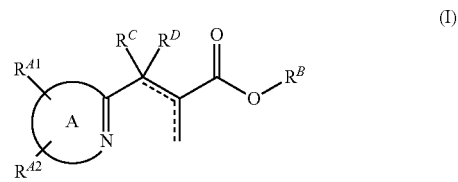

wherein,

represents a 5 membered heteroaryl ring, which in addition to the C=N shown contains one or more further heteroatoms independently selected from N, O and S; or

represents a 6 membered heteroaryl ring, which in addition to the C=N shown optionally contains one or more further N atoms;

$R^{41}$ is $C_{1-10}$ alkyl wherein the alkyl group is optionally substituted by one or more $R^{4'}$ wherein $R^{4'}$ is selected from the group consisting of halo, $C_{1-6}$ haloalkyl, hydroxy, cyano, $OG^1$, $S(O)_{0-2}G^1$, $SF_5$, $C_{3-7}$ cycloalkyl, 5-7-membered heterocyclyl, and phenyl, wherein the phenyl is optionally substituted by $C_{1-2}$ haloalkyl, $C_{1-2}$ haloalkoxy or one or more halo atoms; wherein said $C_{3-7}$ cycloalkyl and said 5-7-membered heterocyclyl are optionally substituted by one or more groups selected from halo, $C_{1-3}$ alkyl and $C_{1-3}$ haloalkyl; and/or $R^{A'}$ represents two alkyl groups which are attached to the same carbon atom and joined to form a $C_{3-7}$ cycloalkyl ring; or $R^{A1}$ is selected from the group consisting of $C_{2-10}$ alkenyl, $C_{2-10}$ alkynyl, —$(CH_2)_{0-6}$—$C_{3-10}$ cycloalkyl, —$(CH_2)_{0-6}$—$C_{5-10}$ spirocycloalkyl, —$(CH_2)_{0-6}$-aryl and —O-aryl; wherein $R^{A1}$ is optionally substituted by one or more $R^{A''}$ wherein $R^{A''}$ is selected from the group consisting of halo, $C_{1-6}$ alkyl, $C_{1-6}$ haloalkyl, hydroxy, cyano, $OG^1$, $S(O)_{0-2}G^1$, $SF_5$, $(CH_2)_{0-3}C_{3-7}$ cycloalkyl, 5-7-membered heterocyclyl, and phenyl, wherein the phenyl is optionally substituted by $C_{1-2}$ haloalkyl, $C_{1-2}$ haloalkoxy or one or more halo atoms; wherein said $C_{3-7}$ cycloalkyl and said 5-7-membered heterocyclyl are optionally substituted by one or more groups selected from halo, $C_{1-3}$ alkyl and $C_{1-3}$ haloalkyl; and/or $R^{A1}$ is optionally substituted by two $R^{A''}$ substituents wherein both $R^{A''}$ are $C_{1-6}$ alkyl which are attached to the same carbon atom and are joined to form a $C_{3-7}$ cycloalkyl ring; and wherein the $C_{3-10}$ cycloalkyl group is optionally fused to a phenyl ring which phenyl ring is optionally substituted by one or more halo atoms;

wherein $G^1$ is $C_{1-6}$ alkyl, $C_{3-7}$ cycloalkyl, $C_{1-6}$ haloalkyl, or $(CH_2)_{0-1}$phenyl, wherein $G^1$ is optionally substituted by one or more $G^{1'}$ wherein $G^{1'}$ is selected from the group consisting of halo, $C_{1-2}$ alkyl, $C_{1-2}$ haloalkyl, hydroxy, cyano, nitro, $C_{1-2}$ alkoxy and $C_{1-2}$ haloalkoxy;

$R^{A2}$ is selected from the group consisting of halo, $C_{1-6}$ alkyl, $C_{2-6}$ alkenyl, $C_{2-6}$ alkynyl, $C_{1-6}$ haloalkyl, hydroxy, cyano, nitro, $NR^1R^2$, $OG^2$ and $S(O)_{0-2}G^2$;

wherein $G^2$ is $C_{1-6}$ alkyl, $C_{3-7}$ cycloalkyl, $C_{1-6}$ haloalkyl, or phenyl, wherein $G^2$ is optionally substituted by one or more $G^{2'}$ wherein $G^{2'}$ is selected from the group consisting of halo, $C_{1-2}$ alkyl, $C_{1-2}$ haloalkyl, hydroxy, cyano, nitro, $C_{1-2}$ alkoxy and $C_{1-2}$ haloalkoxy; and wherein $R^1$ and $R^2$ are independently H or $C_{1-2}$ alkyl or, taken together, $R^1$ and $R^2$ may combine to form a 5-7 membered heterocyclic ring; or $R^{A2}$ is absent;

$R^B$ is selected from the group consisting of $CH_2COOH$, $CH_2CH_2COOH$, $CH_2$tetrazolyl and $CH_2CH_2$tetrazolyl, wherein $R^B$ is optionally substituted on an available carbon atom by one or more $R^{B'}$ wherein $R^{B'}$ is selected from the group consisting of difluoromethyl, trifluoromethyl and methyl; and/or wherein $R^B$ is optionally substituted by two $R^{B'}$ groups, attached to the same carbon atom, that are joined to form a $C_{3-6}$ cycloalkyl or a 4-6-membered heterocyclyl ring;

$R^C$ and $R^D$ are each independently H, $C_{1-2}$ alkyl, hydroxy, $C_{1-2}$ alkoxy or fluoro; or $R^C$ and $R^D$ may join to form a $C_{3-5}$ cycloalkyl ring;

wherein

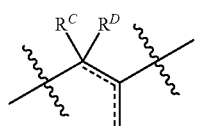

in the compound of formula (I) represents:

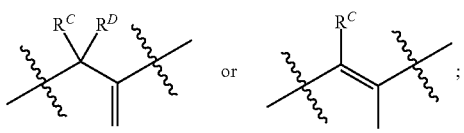

and wherein, the total number of carbon atoms in groups $R^{A1}$ and $R^{A2}$ taken together, including their optional substituents, is 5-14;

or a pharmaceutically acceptable salt and/or solvate thereof.

In a further aspect, the present invention provides a pharmaceutical composition comprising a compound of formula (I) or a pharmaceutically acceptable salt and/or solvate thereof and one or more pharmaceutically acceptable diluents or carriers.

In a further aspect, the present invention provides a compound of formula (I) or a pharmaceutically acceptable salt and/or solvate thereof for use as a medicament.

In a further aspect, the present invention provides a compound of formula (I) or a pharmaceutically acceptable salt and/or solvate thereof for use in treating or preventing an inflammatory disease or a disease associated with an undesirable immune response.

In a further aspect, the present invention provides the use of a compound of formula (I) or a pharmaceutically acceptable salt and/or solvate thereof in the manufacture of a medicament for treating or preventing an inflammatory disease or a disease associated with an undesirable immune response.

In a further aspect, the present invention provides a method of treating or preventing an inflammatory disease or a disease associated with an undesirable immune response, which comprises administering a compound of formula (I) or a pharmaceutically acceptable salt and/or solvate thereof.

DETAILED DESCRIPTION OF THE INVENTION

Compounds of Formula (I)

Embodiments and preferences set out herein with respect to the compound of formula (I) apply equally to the pharmaceutical composition, compound for use, use and method aspects of the invention.

In one embodiment, there is provided a compound of formula (I) as described above.

Suitably, the invention relates to a compound of formula (I-A):

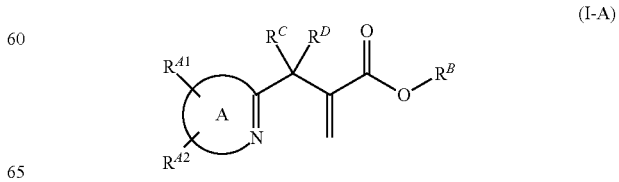

(I-A)

wherein,

represents a 5 membered heteroaryl ring, which in addition to the C=N shown contains one or more further heteroatoms independently selected from N, O and S; or

represents a 6 membered heteroaryl ring, which in addition to the C=N shown optionally contains one or more further N atoms;

$R^{A1}$ is $C_{1-10}$ alkyl wherein the alkyl group is optionally substituted by one or more $R^{A'}$ wherein $R^{A'}$ is selected from the group consisting of halo, $C_{1-6}$ haloalkyl, hydroxy, cyano and $OG^1$; and/or $R^{A'}$ represents two alkyl groups which are attached to the same carbon atom and joined to form a $C_{3-7}$ cycloalkyl ring; or $R^{A1}$ is selected from the group consisting of $C_{2-10}$ alkenyl, $C_{2-10}$ alkynyl, —$(CH_2)_{0-6}$—$C_{3-10}$ cycloalkyl, —$(CH_2)_{0-6}$—$C_{5-10}$ spirocycloalkyl and —$(CH_2)_{0-6}$-aryl; wherein $R^{A1}$ is optionally substituted by one or more $R^{A''}$ wherein $R^{A''}$ is selected from the group consisting of halo, $C_{1-6}$ alkyl, $C_{1-6}$ haloalkyl, hydroxy, cyano, $OG^1$ and phenyl, wherein the phenyl is optionally substituted by $C_{1-2}$ haloalkyl, $C_{1-2}$ haloalkoxy or one or more halo atoms; and/or $R^{A1}$ is optionally substituted by two $R^{A''}$ substituents wherein both $R^{A''}$ are $C_{1-6}$ alkyl which are attached to the same carbon atom and joined to form a $C_{3-7}$ cycloalkyl ring;

wherein $G^1$ is $C_{1-6}$ alkyl, $C_{3-7}$ cycloalkyl, $C_{1-6}$ haloalkyl, or phenyl, wherein $G^1$ is optionally substituted by one or more $G^{1'}$ wherein $G^{1'}$ is selected from the group consisting of halo, $C_{1-2}$ alkyl, $C_{1-2}$ haloalkyl, hydroxy, cyano, nitro, $C_{1-2}$ alkoxy and $C_{1-2}$ haloalkoxy;

$R^{A2}$ is selected from the group consisting of halo, $C_{1-6}$ alkyl, $C_{2-6}$ alkenyl, $C_{2-6}$ alkynyl, $C_{1-6}$ haloalkyl, hydroxy, cyano, nitro, $NR^1R^2$ and $OG^2$;

wherein $G^2$ is $C_{1-6}$ alkyl, $C_{3-7}$ cycloalkyl, $C_{1-6}$ haloalkyl, or phenyl, wherein $G^2$ is optionally substituted by one or more $G^{2'}$ wherein $G^{2'}$ is selected from the group consisting of halo, $C_{1-2}$ alkyl, $C_{1-2}$ haloalkyl, hydroxy, cyano, nitro, $C_{1-2}$ alkoxy and $C_{1-2}$ haloalkoxy; and wherein $R^1$ and $R^2$ are independently H or $C_{1-2}$ alkyl or, taken together, $R^1$ and $R^2$ may combine to form a 5-7 membered heterocyclic ring;

or $R^{A2}$ is absent;

$R^B$ is $CH_2COOH$ or $CH_2CH_2COOH$, wherein $R^B$ is optionally substituted on an available carbon atom by one or more $R^{B'}$ wherein $R^{B'}$ is selected from the group consisting of difluoromethyl, trifluoromethyl and methyl;

$R^C$ and $R^D$ are each independently H, $C_{1-2}$ alkyl, hydroxy, methoxy or fluoro; and wherein, the total number of carbon atoms in groups $R^{A1}$ and $R^{A2}$ taken together, including their optional substituents, is 6-14;

or a pharmaceutically acceptable salt and/or solvate thereof.

Suitably, the invention relates to a compound of formula (I-B):

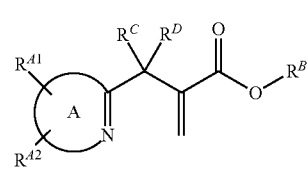

(I-B)

wherein,

represents a 5 membered heteroaryl ring, which in addition to the C=N shown contains one or more further heteroatoms independently selected from N, O and S; or

represents a 6 membered heteroaryl ring, which in addition to the C=N shown optionally contains one or more further N atoms;

$R^{A1}$ is $C_{1-10}$ alkyl wherein the alkyl group is optionally substituted by one or more $R^{A'}$ wherein $R^{A'}$ is selected from the group consisting of halo, $C_{1-6}$ haloalkyl, hydroxy, cyano and $OG^1$; and/or $R^{A'}$ represents two alkyl groups which are attached to the same carbon atom and joined to form a $C_{3-7}$ cycloalkyl ring; or $R^{A1}$ is selected from the group consisting of $C_{2-10}$ alkenyl, $C_{2-10}$ alkynyl, —$(CH_2)_{0-6}$—$C_{3-10}$ cycloalkyl, —$(CH_2)_{0-6}$—$C_{5-10}$ spirocycloalkyl and —$(CH_2)_{0-6}$-aryl; wherein $R^{A1}$ is optionally substituted by one or more $R^{A''}$ wherein $R^{A''}$ is selected from the group consisting of halo, $C_{1-6}$ alkyl, $C_{1-6}$ haloalkyl, hydroxy, cyano, $OG^1$, $SC_{1-4}$alkyl, $SC_{1-4}$haloalkyl, $SF_5$, $C_{3-7}$ cycloalkyl and phenyl, wherein the phenyl is optionally substituted by $C_{1-2}$ haloalkyl, $C_{1-2}$ haloalkoxy or one or more halo atoms; and/or $R^{A1}$ is optionally substituted by two $R^{A''}$ substituents wherein both $R^{A''}$ are $C_{1-6}$ alkyl which are attached to the same carbon atom and joined to form a $C_{3-7}$ cycloalkyl ring;

wherein $G^1$ is $C_{1-6}$ alkyl, $C_{3-7}$ cycloalkyl, $C_{1-6}$ haloalkyl, or $(CH_2)_{0-1}$phenyl, wherein $G^1$ is optionally substituted by one or more $G^{1'}$ wherein $G^{1'}$ is selected from the group consisting of halo, $C_{1-2}$ alkyl, $C_{1-2}$ haloalkyl, hydroxy, cyano, nitro, $C_{1-2}$ alkoxy and $C_{1-2}$ haloalkoxy;

$R^{A2}$ is selected from the group consisting of halo, $C_{1-6}$ alkyl, $C_{2-6}$ alkenyl, $C_{2-6}$ alkynyl, $C_{1-6}$ haloalkyl, hydroxy, cyano, nitro, $NR^1R^2$ and $OG^2$;

wherein $G^2$ is $C_{1-6}$ alkyl, $C_{3-7}$ cycloalkyl, $C_{1-6}$ haloalkyl, or phenyl, wherein $G^2$ is optionally substituted by one or more $G^{2'}$ wherein $G^{2'}$ is selected from the group consisting of halo, $C_{1-2}$ alkyl, $C_{1-2}$ haloalkyl, hydroxy, cyano, nitro, $C_{1-2}$ alkoxy and $C_{1-2}$ haloalkoxy; and wherein $R^1$ and $R^2$ are independently H or $C_{1-2}$ alkyl or, taken together, $R^1$ and $R^2$ may combine to form a 5-7 membered heterocyclic ring;

or $R^{42}$ is absent;

$R^B$ is selected from the group consisting of $CH_2COOH$, $CH_2CH_2COOH$, $CH_2$tetrazolyl and $CH_2CH_2$tetrazolyl, wherein $R^B$ is optionally substituted on an available carbon atom by one or more $R^{B'}$ wherein $R^{B'}$ is selected from the group consisting of difluoromethyl, trifluoromethyl and methyl; and/or wherein $R^B$ is optionally substituted by two $R^{B'}$ groups, attached to the same carbon atom, that are joined to form a $C_{3-6}$ cycloalkyl or a 4-6-membered heterocyclyl ring;

$R^C$ and $R^D$ are each independently H, $C_{1-2}$ alkyl, hydroxy, $C_{1-2}$ alkoxy or fluoro; and wherein, the total number of carbon atoms in groups $R^{41}$ and $R^{42}$ taken together, including their optional substituents, is 5-14;

or a pharmaceutically acceptable salt and/or solvate thereof.

References and embodiments provided in respect of formula (I) as disclosed herein are applicable to compounds of formula (I-A) and (I-B).

The term "$C_{1-10}$ alkyl" refers to a straight or branched fully saturated hydrocarbon group having from 1 to 10 carbon atoms. The term encompasses methyl, ethyl, n-propyl, isopropyl, n-butyl, isobutyl, sec-butyl, tert-butyl, n-pentyl, n-heptyl, n-hexyl and n-octyl. Other branched variants such as heptyl-$CH(CH_3)$— and hexyl-$CH(CH_3)$— are also included. Further branched variants include n-pentyl-CH$(CH_2CH_3)$— and $(n\text{-Bu})_2CH$—. Other branched variants include n-pentyl-$C(CH_3)_2$— or n-hexyl-$C(CH_3)_2$—. Another branched variant is —$CH(t\text{-Bu})_2$. Other alkyl groups, for example $C_{1-9}$ alkyl, $C_{1-8}$ alkyl, $C_{1-7}$ alkyl, $C_{1-6}$ alkyl, $C_{1-5}$ alkyl, $C_{1-4}$ alkyl, $C_{1-3}$ alkyl, $C_{1-2}$ alkyl, $C_{2-10}$ alkyl, $C_{2-9}$ alkyl, $C_{2-8}$ alkyl, $C_{2-7}$ alkyl, $C_{2-6}$ alkyl, $C_{2-5}$ alkyl, $C_{2-4}$ alkyl, $C_{2-3}$ alkyl, $C_{3-10}$ alkyl, $C_{3-9}$ alkyl, $C_{3-8}$ alkyl, $C_{3-7}$ alkyl, $C_{3-6}$ alkyl, $C_{3-5}$ alkyl, $C_{3-4}$ alkyl, $C_{4-10}$ alkyl, $C_{4-9}$ alkyl, $C_{4-8}$ alkyl, $C_{4-7}$ alkyl, $C_{4-6}$ alkyl, $C_{4-5}$ alkyl, $C_{5-10}$ alkyl, $C_{5-9}$ alkyl, $C_{5-8}$ alkyl, $C_{5-7}$ alkyl, $C_{5-8}$ alkyl, $C_{6-10}$ alkyl, $C_{6-9}$ alkyl, $C_{6-8}$ alkyl, $C_{7-10}$ alkyl, $C_{7-9}$ alkyl, $C_{7-8}$ alkyl, $C_{8-10}$ alkyl, $C_{8-9}$ alkyl and $C_{9-10}$ alkyl are as defined above but contain different numbers of carbon atoms. The term "$C_{1-10}$ alkyl" also encompasses "$C_{1-10}$ alkylene" which is a bifunctional straight or branched fully saturated hydrocarbon group having the stated number of carbon atoms. Example "alkylene" groups include methylene, ethylene, n-propylene, n-butylene, n-pentylene, n-hexylene, n-heptylene, n-octylene, and stereoisomers thereof such as 2-propylene, 2-butylene, 2-pentylene, 3-pentylene, 2-hexylene, 3-hexylene, 2-heptylene, 3-heptylene, 4-heptylene, 2-octylene, 3-octylene and 4-octylene.

The term "$C_{2-10}$ alkenyl" refers to a straight or branched hydrocarbon group having from 2 to 10 carbon atoms and at least one carbon-carbon double bond. The term encompasses, CH=$CH_2$, $CH_2CH$=$CH_2$, CH=$CHCH_3$, $CH_2CH_2CH$=$CH_2$, CH=$CHCH_2CH_3$, $CH_2CH$=$CHCH_3$, $CH_2CH_2CH_2CH$=$CH_2$, CH=$CHCH_2CH_2CH_3$, $CH_2CH$=$CHCH_2CH_3$, $CH_2CH_2CH$=$CHCH_3$, CH=$CHCH$=$CHCH_3$ and $CH_2CH$=$CHCH$=$CH_2$. Branched variants such as $CH(CH_3)CH$=$CH_2$ and CH=$C(CH_3)CH_2$ are also included. Other alkenyl groups, for example $C_{2-9}$ alkenyl, $C_{2-8}$ alkenyl, $C_{2-7}$ alkenyl, $C_{2-6}$ alkenyl, $C_{2-5}$ alkenyl, $C_{2-4}$ alkenyl, $C_{2-3}$ alkenyl, $C_{3-10}$ alkenyl, $C_{3-9}$ alkenyl, $C_{3-8}$ alkenyl, $C_{3-7}$ alkenyl, $C_{3-6}$ alkenyl, $C_{3-5}$ alkenyl, $C_{3-4}$alkenyl, $C_{4-10}$ alkenyl, $C_{4-9}$ alkenyl, $C_{4-8}$ alkenyl, $C_{4-7}$ alkenyl, $C_{4-6}$ alkenyl, $C_{4-5}$ alkenyl, $C_{5-10}$ alkenyl, $C_{5-9}$ alkenyl, $C_{5-8}$ alkenyl, $C_{5-7}$ alkenyl, $C_{5-6}$ alkenyl, $C_{6-10}$ alkenyl, $C_{6-9}$ alkenyl, $C_{6-8}$ alkenyl, $C_{7-10}$ alkenyl, $C_{7-9}$ alkenyl, $C_{7-8}$ alkenyl, $C_{8-10}$ alkenyl, $C_{8-9}$ alkenyl and $C_{9-10}$ alkenyl are as defined above but contain different numbers of carbon atoms.

The term "$C_{2-10}$ alkynyl" refers to a straight or branched hydrocarbon group having from 2 to 10 carbon atoms and at least one carbon-carbon triple bond. The term encompasses, C≡CH, $CH_2$C≡CH, C≡C—$CH_3$, $CH_2CH_2$C≡CH, C≡C$CH_2CH_3$, $CH_2$C≡$CCH_3$, $CH_2CH_2CH_2$C≡CH, C≡$CCH_2CH_2CH_3$, $CH_2$C≡$CCH_2CH_3$, $CH_2CH_2$C≡$CCH_3$, C≡CC≡$CCH_3$ and $CH_2$C≡CC≡CH. Branched variants such as $CH(CH_3)$C≡CH are also included. Other alkynyl groups, for example $C_{2-9}$ alkynyl, $C_{2-8}$ alkynyl, $C_{2-7}$ alkynyl, $C_{2-6}$ alkynyl, $C_{2-5}$ alkynyl, $C_{2-4}$ alkynyl, $C_{2-3}$ alkynyl, $C_{3-10}$ alkynyl, $C_{3-9}$ alkynyl, $C_{3-8}$ alkynyl, $C_{3-7}$ alkynyl, $C_{3-6}$ alkynyl, $C_{3-5}$ alkynyl, $C_{3-4}$ alkynyl, $C_{4-10}$ alkynyl, $C_{4-9}$ alkynyl, $C_{4-8}$ alkynyl, $C_{4-7}$ alkynyl, $C_{4-6}$ alkynyl, $C_{4-5}$ alkynyl, $C_{5-10}$ alkynyl, $C_{5-9}$ alkynyl, $C_{5-8}$ alkynyl, $C_{5-7}$ alkynyl, $C_{5-6}$ alkynyl, $C_{6-10}$ alkynyl, $C_{6-9}$ alkynyl, $C_{6-8}$ alkynyl, $C_{7-10}$ alkynyl, $C_{7-9}$ alkynyl, $C_{7-8}$ alkynyl, $C_{8-10}$ alkynyl, $C_{8-9}$ alkynyl and $C_{9-10}$ alkynyl are as defined above but contain different numbers of carbon atoms.

The term "$C_{3-10}$ cycloalkyl" refers to a fully saturated cyclic hydrocarbon group having from 3 to 10 carbon atoms. The term encompasses cyclopropyl, cyclobutyl, cyclopentyl, cyclohexyl, cycloheptyl, cyclooctyl, cyclononyl and cyclodecyl as well as bridged systems such as bicyclo[1.1.1]pentyl, bicyclo[2.2.1]heptyl, bicyclo[2.2.2]octyl and adamantyl. Other cycloalkyl groups, for example $C_{3-9}$ cycloalkyl, $C_{3-8}$ cycloalkyl, $C_{3-7}$ cycloalkyl, $C_{3-6}$ cycloalkyl, $C_{3-5}$ cycloalkyl, $C_{3-4}$ cycloalkyl, $C_{4-10}$ cycloalkyl, $C_{4-9}$ cycloalkyl, $C_{4-8}$ cycloalkyl, $C_{4-7}$ cycloalkyl, $C_{4-6}$ cycloalkyl, $C_{4-5}$ cycloalkyl, $C_{5-10}$ cycloalkyl, $C_{5-9}$ cycloalkyl, $C_{5-8}$ cycloalkyl, $C_{5-7}$ cycloalkyl, $C_{5-6}$ cycloalkyl, $C_{6-10}$ cycloalkyl, $C_{6-9}$ cycloalkyl, $C_{6-8}$ cycloalkyl, $C_{6-7}$ cycloalkyl, $C_{7-10}$ cycloalkyl, $C_{7-9}$ cycloalkyl, $C_{7-8}$ cycloalkyl, $C_{8-10}$ cycloalkyl, $C_{8-9}$ cycloalkyl and $C_{9-10}$ cycloalkyl are as defined above but contain different numbers of carbon atoms.

The term "$C_{5-10}$ spirocycloalkyl" refers to a bicyclic cycloalkyl group wherein the two rings are connected through just one atom. The rings can be different or identical. The term encompasses spiro[3.3]heptyl. Other spirocycloalkyl groups, for example $C_{5-9}$ spirocycloalkyl, $C_{5-8}$ spirocycloalkyl and $C_{5-7}$ spirocycloalkyl are as defined above but contain different numbers of carbon atoms.

The term "aryl" refers to a cyclic group with aromatic character having from 6 to 10 ring carbon atoms and containing one or two rings. Where an aryl group contains more than one ring, both rings must be aromatic in character. Suitably "aryl" encompasses only phenyl and naphthyl. Most suitably, "aryl" is phenyl.

The term "hydroxy" (which may also be referred to as "hydroxyl") refers to an —OH group.

The term "halo" as used herein, refers to fluorine, chlorine, bromine or iodine. Particular examples of halo are fluorine and chlorine, especially fluorine.

The term "$C_{1-6}$ haloalkyl" refers to a $C_{1-6}$ alkyl group (e.g. a $C_1$ alkyl group i.e. methyl) as defined above, which is substituted by one or more e.g. one, two or three halo atoms. Examples include trifluoromethyl, difluoromethyl, 2,2,2-trifluoroethyl and 1,1-difluoroethyl.

The term "$C_{1-2}$ alkoxy" refers to a $C_{1-2}$ alkyl group (e.g. a $C_1$ alkyl group i.e. methyl) as defined above, singularly bonded to oxygen. The term encompasses methoxy (i.e. —OMe) and ethoxy (i.e. —OEt).

The term "$C_{1-2}$ haloalkoxy" refers to a $C_{1-2}$ alkoxy as defined above, which is substituted by one or more e.g. one, two or three halo atoms. An example includes trifluoromethoxy.

The term "5-7 membered heterocyclic ring" refers to a non-aromatic cyclic group having 5 to 7 ring atoms and wherein at least one of the ring atoms is a heteroatom selected from N, O, S and B. The term "heterocyclic ring" is interchangeable with "heterocyclyl". The term encompasses pyrrolidinyl, tetrahydrofuranyl, tetrahydrothienyl, tetrahydropyranyl, piperidinyl, piperazinyl, morpholinyl, thiomorpholinyl and homomorpholinyl. 5-7 membered heterocyclyl groups can typically be substituted by one or more (e.g. one or two) oxo groups. Suitably, thietanyl is substituted by one or two oxo groups. Bicyclic heterocyclic compounds are also encompassed, such as the following:

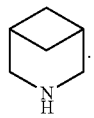

The term "4-6 membered heterocyclic ring" refers to a non-aromatic cyclic group having 4 to 6 ring atoms and wherein at least one of the ring atoms is a heteroatom selected from N, O, S and B. The term "heterocyclic ring" is interchangeable with "heterocyclyl". The term encompasses azetidine, oxetane, thietane, pyrrolidinyl, tetrahydrofuranyl, tetrahydrothienyl, tetrahydropyranyl, piperidinyl, piperazinyl, morpholinyl and thiomorpholinyl. 4-6 membered heterocyclyl groups can typically be substituted by one or more (e.g. one or two) oxo groups. Suitably, thietanyl is substituted by one or two oxo groups.

The term "tetrazolyl" refers to a 5-(1H-tetrazolyl) substituent where the tetrazole is linked to the rest of the molecule via a carbon atom:

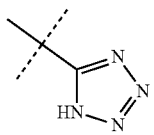

wherein the dashed line indicates the point of attachment to the rest of the molecule.

Where substituents are indicated as being optionally substituted in formula (I) in the embodiments and preferences set out below, the optional substituent may be attached to an available carbon atom, which means a carbon atom which is attached to a hydrogen atom i.e. a C—H group. The optional substituent replaces the hydrogen atom attached to the carbon atom.

When $R^{41}$ is substituted by two alkyl groups such as $C_{1-6}$ alkyl for example $C_{1-2}$ alkyl, and the alkyl groups are attached to the same carbon atom in $R^{41}$ and said alkyl groups are joined to form a $C_{3-7}$ cycloalkyl ring, groups of the following structure form:

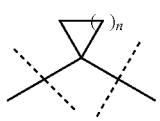

wherein n is an integer selected from 1, 2, 3, 4 and 5. Suitably n is 1.

The group

may also be written as

In one embodiment,

represents a 5 membered heteroaryl ring, which in addition to the C═N shown contains one or more e.g. one or two further heteroatoms independently selected from N, O and S.

In one embodiment,

represents a 5 membered heteroaryl ring selected from the group consisting of imidazole, pyrazole, oxazole, isoxazole, thiazole, isothiazole, 1,2,3-triazole, 1,2,4-triazole, 1,2,4-oxadiazole, 1,2,5-oxadiazole, 1,3,4-oxadiazole, 1,2,4-thiadiazole, 1,2,5-thiadiazole, 1,3,4-thiadiazole and tetrazole.

When

represents imidazole, it is intended to represent

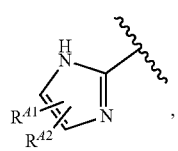

in formula (I). For the avoidance of doubt, substituent $R^{41}$ and/or $R^{42}$ (if present) can be bound to a carbon or nitrogen atom of the imidazole moiety.

When

represents pyrazole, it is intended to represent

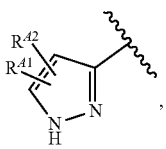, in formula (I). For the avoidance of doubt, substituent $R^{A1}$ and/or $R^{A2}$ (if present) can be bound to a carbon or nitrogen atom of the pyrazole moiety.

When

represents oxazole, it is intended to represent

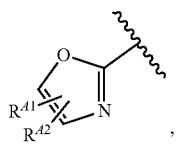, in formula (I).

When

represents isoxazole, it is intended to represent

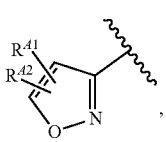, in formula (I).

When

represents thiazole, it is intended to represent

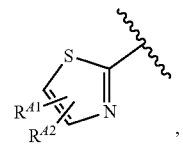, in formula (I).

When

represents isothiazole, it is intended to represent

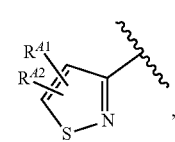, in formula (I).

When

represents 1,2,3-triazole, it is intended to represent

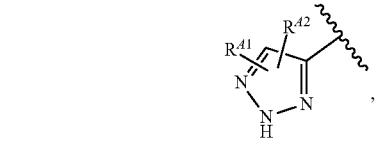, in formula (I). For the avoidance of doubt, substituent $R^{A1}$ and/or $R^{A2}$ (if present) can be bound to a carbon or nitrogen atom of the 1,2,3-triazole moiety.

When

represents 1,2,4-triazole, it is intended to represent

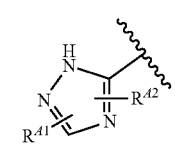

and/or

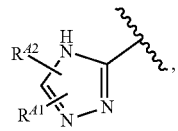

in formula (I). For the avoidance of doubt, substituent $R^{A1}$ and/or $R^{A2}$ (if present) can be bound to a carbon or nitrogen atom of the 1,2,4-triazole moiety.
When

represents 1,2,4-oxadiazole, it is intended to represent

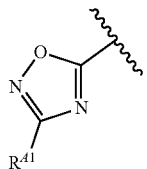

and/or

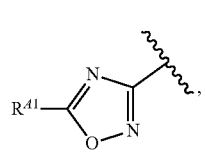

in formula (I).
When

represents 1,2,5-oxadiazole, it is intended to represent

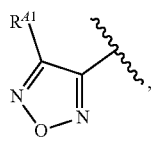

in formula (I).
When

represents 1,3,4-oxadiazole, it is intended to represent

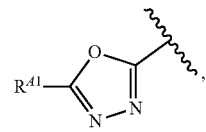

in formula (I).
When

represents 1,2,4-thiadiazole, it is intended to represent

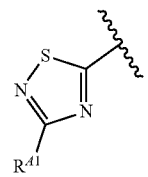

and/or

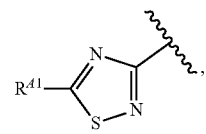

in formula (I).
When

represents 1,2,5-thiadiazole, it is intended to represent

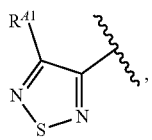

in formula (I).
When

represents 1,3,4-thiadiazole, it is intended to represent

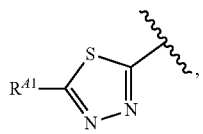

in formula (I).
When

represents tetrazole, it is intended to represent

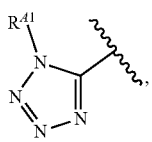

in formula (I).
In one embodiment,

represents an oxadiazole, in particular 1,2,4-oxadiazole.
Suitably, the 1,2,4-oxadiazole is

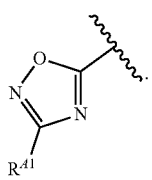

In one embodiment,

represents 1,3,4-oxadiazole.
In one embodiment,

represents a 6 membered heteroaryl ring, which in addition to the C=N shown optionally contains one or more e.g. one or two further N atoms.

In one embodiment,

represents a 6 membered heteroaryl ring selected from the group consisting of pyridine, pyridazine, pyrimidine, pyrazine and triazine.
When

represents pyridine, it is intended to represent

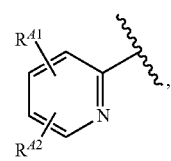

in formula (I).
When

represents pyridazine, it is intended to represent

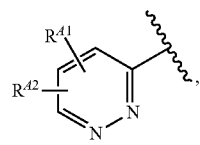

in formula (I).
When

represents pyrimidine, it is intended to represent

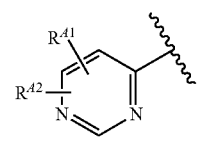

and/or

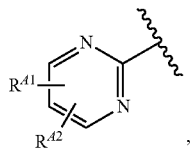

in formula (I).
When

represents pyrazine, it is intended to represent

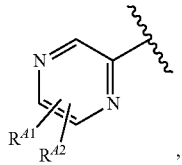

in formula (I).
When

represents triazine, it is intended to represent

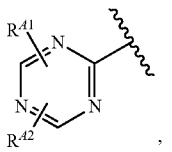

in formula (I).

In the representations above, where a substituent is not indicated as being bound to a carbon atom or nitrogen atom and is instead shown as intersecting a double or single bond of a heteroaryl compound, this indicates that the point of attachment is undefined, and may be any attachment point which is chemically feasible. Furthermore, each of the above mentioned heteroaryl groups is shown as a single tautomer. The skilled person recognises that although a single tautomer is shown, the compound may exist as a mixture of tautomeric forms. Thus, the invention extends to all tautomeric forms of the compounds of formula (I).

In one embodiment, $R^{A1}$ is $C_{1-10}$ alkyl. Suitably, $R^{A1}$ is $C_{6-10}$ alkyl. In one embodiment, $R^{A1}$ is $C_6$ alkyl e.g. n-hexyl. In another embodiment, $R^{A1}$ is $C_7$ alkyl e.g. n-heptyl. In another embodiment, $R^{A1}$ is $C_8$ alkyl e.g. n-octyl. In another embodiment, $R^{A1}$ is $C_9$ alkyl e.g. n-nonyl. In another embodiment, $R^{A1}$ is $C_{10}$ alkyl e.g. n-decyl.

Most suitably, $R^{A1}$ is $C_8$ alkyl. When $R^{A1}$ is $C_8$ alkyl, the alkyl group may be linear or branched.

Suitably, the $C_8$ alkyl group is linear such that the following group forms:

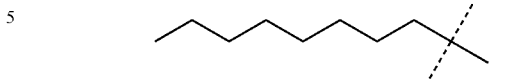

wherein the dashed bond indicates the point of attachment to ring A.

Alternatively, the $C_8$ alkyl group is branched e.g. such that the following group forms:

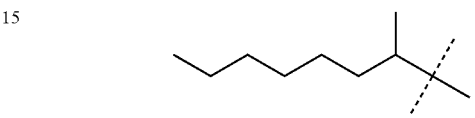

wherein the dashed bond indicates the point of attachment to ring A.

In one embodiment, $R^{A1}$ is $C_{2-10}$ alkenyl.
In one embodiment, $R^{A1}$ is $C_{2-10}$ alkynyl.
In one embodiment, $R^{A1}$ is —$(CH_2)_{0-6}$—$C_{3-10}$ cycloalkyl, in particular —$(CH_2)_{0-6}$—$C_{4-10}$ cycloalkyl, —$(CH_2)_{0-6}$—$C_{5-10}$ cycloalkyl or —$(CH_2)_{0-6}$—$C_{5-8}$ cycloalkyl. In one embodiment, $R^{A1}$ is selected from the group consisting of —$(CH_2)_{0-6}$-cyclopropyl, —$(CH_2)_{0-6}$-cyclobutyl, —$(CH_2)_{0-6}$-cyclopentyl, —$(CH_2)_{0-6}$-cyclohexyl, —$(CH_2)_{0-6}$-cycloheptyl, —$(CH_2)_{0-6}$-cyclooctyl and —$(CH_2)_{0-6}$-bicyclo[2.2.1]heptyl; and in particular is —$(CH_2)_{0-6}$-cyclopentyl, —$(CH_2)_{0-6}$-cyclohexyl, —$(CH_2)_{0-6}$-cycloheptyl, —$(CH_2)_{0-6}$-cyclooctyl or —$(CH_2)_{0-6}$-bicyclo[2.2.1]heptyl. In one embodiment, $R^{A1}$ is —$C_{3-10}$ cycloalkyl. In another embodiment, $R^{A1}$ is —$CH_2C_{3-10}$ cycloalkyl. In another embodiment, $R^{A1}$ is —$(CH_2)_2$—$C_{3-10}$ cycloalkyl. In another embodiment, $R^{A1}$ is —$(CH_2)_3$—$C_{3-10}$ cycloalkyl. In another embodiment, $R^{A1}$ is —$(CH_2)_4$—$C_{3-10}$ cycloalkyl. In another embodiment, $R^{A1}$ is —$(CH_2)_5$—$C_{3-10}$ cycloalkyl. In another embodiment, $R^{A1}$ is —$(CH_2)_6$—$C_{3-10}$ cycloalkyl.

In one embodiment, $R^{A1}$ is —$(CH_2)_{0-6}$—$C_{5-10}$ spirocycloalkyl, in particular —$(CH_2)_{0-6}$-spiro[3.3]heptyl. Suitably, $R^{A1}$ is $C_{5-10}$ spirocycloalkyl.

In one embodiment, $R^{A1}$ is —$(CH_2)_{0-6}$-aryl, for example —$(CH_2)_{0-6}$-phenyl. Suitably, $R^{A1}$ is —$CH_2$-aryl.

Suitably, $R^{A1}$ is —$(CH_2)_{0-2}$-phenyl. In one embodiment, $R^{A1}$ is phenyl. In another embodiment $R^{A1}$ is $CH_2$-phenyl. In another embodiment, $R^{A1}$ is $(CH_2)_2$-phenyl. Most suitably, $R^{A1}$ is —$CH_2$-phenyl.

In one embodiment, $R^{A1}$ is —O-aryl, such as —O-phenyl.
In one embodiment, $R^{A1}$ is not substituted.
In another embodiment such as when $R^{A1}$ is $C_{1-10}$ alkyl, $R^{A1}$ is substituted by one or more $R^{A'}$. Suitably, $R^{A1}$ is substituted by one, two, three or four $R^{A'}$. In one embodiment, $R^{A1}$ is substituted by one $R^{A'}$. In another embodiment, $R^{A1}$ is substituted by two $R^{A'}$. In another embodiment, $R^{A1}$ is substituted by three $R^{A'}$. In another embodiment, $R^{A1}$ is substituted by four $R^{A'}$.

When $R^{A1}$ is $C_{1-10}$ alkyl, $R^{A'}$ is selected from the group consisting of halo, $C_{1-6}$ haloalkyl, hydroxy, cyano, $OG^1$, $S(O)_{0-2}G^1$, $SF_5$, $C_{3-7}$ cycloalkyl, 5-7-membered heterocyclyl, and phenyl, wherein the phenyl is optionally substituted by $C_{1-2}$ haloalkyl, $C_{1-2}$ haloalkoxy or one or more halo atoms; wherein said $C_{3-7}$ cycloalkyl and said 5-7-membered heterocyclyl are optionally substituted by one or more groups selected from halo, $C_{1-3}$ alkyl and $C_{1-3}$ haloalkyl;

and/or $R^{A'}$ represents two alkyl groups which are attached to the same carbon atom and joined to form a $C_{3-7}$ cycloalkyl ring.

Suitably, $R^{A'}$ is selected from the group consisting of halo, $C_{1-6}$ haloalkyl, hydroxy, cyano and $OG^1$; and/or $R^{A'}$ represents two alkyl groups which are attached to the same carbon atom and joined to form a $C_{3-7}$ cycloalkyl ring.

In one embodiment, $R^{A'}$ is halo, e.g., fluoro. In another embodiment, $R^{A'}$ is $C_{1-6}$ haloalkyl wherein suitably the halo atoms are fluoro. In another embodiment, $R^{A'}$ is hydroxy. In another embodiment, $R^{A'}$ is cyano. In another embodiment, $R^{A'}$ is $OG^1$. In another embodiment, $R^{A'}$ is $S(O)_{0-2}G^1$. In another embodiment, $R^{A'}$ is $SF_5$. In another embodiment, $R^{A'}$ is $C_{3-7}$ cycloalkyl, which is optionally substituted by one or more groups selected from halo, $C_{1-3}$ alkyl and $C_{1-3}$ haloalkyl. In another embodiment, $R^{A'}$ is 5-7-membered heterocyclyl, which is optionally substituted by one or more groups selected from halo, $C_{1-3}$ alkyl and $C_{1-3}$ haloalkyl. In another embodiment, $R^{A'}$ is phenyl, wherein the phenyl is optionally substituted (e.g. is substituted) by $C_{1-2}$ haloalkyl, $C_{1-2}$ haloalkoxy or one or more halo atoms. In another embodiment, $R^{A'}$ represents two alkyl groups which are attached to the same carbon atom and joined to form a $C_{3-7}$ cycloalkyl ring, e.g., a cyclopropyl ring.

In another embodiment such as when $R^{A1}$ is selected from the group consisting of $C_{2-10}$ alkenyl, $C_{2-10}$ alkynyl, —(CH$_2$)$_{0-6}$—C$_{3-10}$ cycloalkyl, —(CH$_2$)$_{0-6}$—C$_{5-10}$ spirocycloalkyl and —(CH$_2$)$_{0-6}$-aryl, $R^{A1}$ is substituted by one or more $R^{A''}$. Suitably, $R^{A1}$ is substituted by one, two, three or four $R^{A''}$. In one embodiment, $R^{A1}$ is substituted by one $R^{A''}$. In another embodiment, $R^{A1}$ is substituted by two $R^{A''}$. In another embodiment, $R^{A1}$ is substituted by three $R^{A''}$. In another embodiment, $R^{A1}$ is substituted by four $R^{A''}$.

When $R^{A1}$ is selected from the group consisting of $C_{2-10}$ alkenyl, $C_{2-10}$ alkynyl, —(CH$_2$)$_{0-6}$—C$_{3-10}$ cycloalkyl, —(CH$_2$)$_{0-6}$—C$_{5-10}$ spirocycloalkyl, —(CH$_2$)$_{0-6}$-aryl and —O-aryl, $R^{A''}$ is selected from the group consisting of halo, $C_{1-6}$ alkyl, $C_{1-6}$ haloalkyl, hydroxy, cyano, $OG^1$, $S(O)_{0-2}G^1$, $SF_5$, (CH$_2$)$_{0-3}$C$_{3-7}$ cycloalkyl, 5-7-membered heterocyclyl, and phenyl, wherein the phenyl is optionally substituted by $C_{1-2}$ haloalkyl, $C_{1-2}$ haloalkoxy or one or more halo atoms; wherein said $C_{3-7}$ cycloalkyl and said 5-7-membered heterocyclyl are optionally substituted by one or more groups selected from halo, $C_{1-3}$ alkyl and $C_{1-3}$ haloalkyl; and/or $R^{A1}$ is optionally substituted by two $R^{A''}$ substituents wherein both $R^{A''}$ are $C_{1-6}$ alkyl which are attached to the same carbon atom and are joined to form a $C_{3-7}$ cycloalkyl ring; and wherein the $C_{3-10}$ cycloalkyl group is optionally fused to a phenyl ring which phenyl ring is optionally substituted by one or more halo atoms.

When $R^{A1}$ is selected from the group consisting of $C_{2-10}$ alkenyl, $C_{2-10}$ alkynyl, —(CH$_2$)$_{0-6}$—C$_{3-10}$ cycloalkyl, —(CH$_2$)$_{0-6}$—C$_{5-10}$ spirocycloalkyl and —(CH$_2$)$_{0-6}$-aryl, $R^{A''}$ is selected from the group consisting of halo, $C_{1-6}$ alkyl, $C_{1-6}$ haloalkyl, hydroxy, cyano, $OG^1$, $SC_{1-4}$alkyl, $SC_{1-4}$haloalkyl, $SF_5$, $C_{3-7}$ cycloalkyl and phenyl (such as halo, $C_{1-6}$ alkyl, $C_{1-6}$ haloalkyl, hydroxy, cyano, $OG^1$ and phenyl), wherein the phenyl is optionally substituted by $C_{1-2}$ haloalkyl, $C_{1-2}$ haloalkoxy or one or more halo atoms; and/or $R^{A1}$ is optionally substituted by two $R^{A''}$ substituents wherein both $R^{A''}$ are $C_{1-6}$ alkyl which are attached to the same carbon atom and joined to form a $C_{3-7}$ cycloalkyl ring.

In one embodiment, $R^{A''}$ is halo e.g. chloro or bromo. In another embodiment, $R^{A''}$ is $C_{1-6}$ alkyl e.g. n-butyl. In another embodiment, $R^{A''}$ is $C_{1-6}$ haloalkyl wherein suitably the halo atom is fluoro. In another embodiment, $R^{A''}$ is hydroxy. In another embodiment, $R^{A''}$ is cyano. In another embodiment, $R^{A''}$ is $OG^1$. In another embodiment, $R^{A''}$ is $S(O)_{0-2}G^1$. In another embodiment, $R^{A''}$ is $SC_{1-4}$alkyl (such as $SCH_3$). In another embodiment, $R^{A''}$ is $SC_{1-4}$haloalkyl (such as $SCF_3$). In another embodiment, $R^{A''}$ is $SF_5$. In another embodiment, $R^{A''}$ is (CH$_2$)$_{0-3}$C$_{3-7}$ cycloalkyl such as $C_{3-7}$ cycloalkyl, wherein the $C_{3-7}$ cycloalkyl is optionally substituted by one or more groups selected from halo, $C_{1-3}$ alkyl and $C_{1-3}$ haloalkyl. In another embodiment, $R^{A''}$ is 5-7-membered heterocyclyl which is optionally substituted by one or more groups selected from halo, $C_{1-3}$ alkyl and $C_{1-3}$ haloalkyl. In another embodiment, $R^{A''}$ is phenyl. In another embodiment, $R^{A''}$ is phenyl which is substituted by $C_{1-2}$ haloalkyl (such as $CF_3$). In another embodiment, $R^{A''}$ is phenyl which is substituted by $C_{1-2}$ haloalkoxy (such as $OCF_3$). In another embodiment, $R^{A''}$ is phenyl which is substituted by one or more such as one, two or three halo atoms (such as one, e.g. bromo atom, or two e.g. chloro atoms). In another embodiment, $R^{A1}$ is substituted by two $R^{A''}$ substituents wherein both $R^{A''}$ are $C_{1-6}$ alkyl which are attached to the same carbon atom and joined to form a $C_{3-7}$ cycloalkyl ring.

When $R^{A1}$ is substituted by two $R^{A''}$ substituents wherein both $R^{A''}$ are $C_{1-6}$ alkyl for example $C_{1-2}$ alkyl, and the alkyl groups are attached to the same carbon atom in $R^{A1}$, and said alkyl groups are joined to form a $C_{3-7}$ cycloalkyl group, the following groups are formed.

Suitably, the $C_3$ cycloalkyl group is a $C_3$ cycloalkyl group:

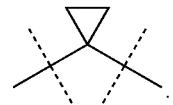

Suitably, the $C_{3-7}$ cycloalkyl group is a $C_4$ cycloalkyl group:

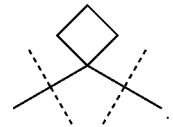

Suitably, the $C_{3-7}$ cycloalkyl group is a $C_5$ cycloalkyl group:

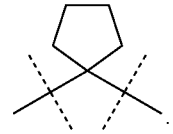

Suitably, the $C_{3-7}$ cycloalkyl group is a C cycloalkyl group:

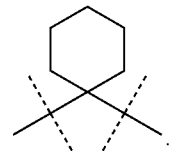

When $R^{A1}$ is —$(CH_2)_{0-6}$-aryl, such as —$CH_2$-phenyl, and $R^{A1}$ is substituted by one or more $R^{A''}$ groups, suitably the aryl ring, such as the phenyl ring of $R^{A1}$, is substituted by one or more (such as one, two or three, e.g., one) $R^{A''}$ groups selected from the group consisting of halo, $C_{1-6}$ alkyl, $C_{1-6}$ haloalkyl, hydroxy, cyano, $OG^1$, $SC_{1-4}$alkyl, $SC_{1-4}$haloalkyl, $SF_5$, $C_{3-7}$ cycloalkyl and phenyl, wherein the $R^{A''}$ phenyl is optionally substituted by $C_{1-2}$ haloalkyl, $C_{1-2}$ haloalkoxy or one or more halo atoms, and a $CH_2$ of $R^{A1}$ (such as the $CH_2$ of $R^{A1}$) is substituted by two $R^{A''}$ substituents, wherein both $R^{A''}$ are $C_{1-6}$ alkyl which are attached to the same carbon atom and joined to form a $C_{3-7}$ cycloalkyl ring, such as a cyclopropyl ring.

Suitably, $R^{A''}$ is selected from the group consisting of chloro, bromo and $CF_3$; and/or (e.g. and) $R^{A1}$ is substituted by two $R^{A''}$ substituents wherein both $R^{A''}$ are $C_{1-6}$ alkyl which are attached to the same carbon atom and joined to form a $C_{3-7}$ cycloalkyl ring.

Suitably, $R^{A''}$ is selected from the group consisting of $SCH_3$, $SCF_3$ and $SF_5$; and/or (e.g. and) $R^{A1}$ is substituted by two $R^{A''}$ substituents wherein both $R^{A''}$ are $C_{1-6}$ alkyl which are attached to the same carbon atom and joined to form a $C_{3-7}$ cycloalkyl ring.

In one embodiment, $G^1$ is $C_{1-6}$ alkyl e.g. n-butyl. In another embodiment, $G^1$ is $C_{3-7}$ cycloalkyl. In another embodiment, $G^1$ is $C_{1-6}$ haloalkyl e.g. $CF_3$. In another embodiment, $G^1$ is $(CH_2)_{0-1}$phenyl. Suitably, $G^1$ is phenyl. Alternatively, $G^1$ is $CH_2$phenyl.

In one embodiment, $G^1$ is not substituted.

In another embodiment, $G^1$ is substituted by one or more $G^{1'}$. Suitably, $G^1$ is substituted by one, two, three or four, e.g., one, $G^{1'}$.

In one embodiment, $G^{1'}$ is halo. In another embodiment, $G^{1'}$ is $C_{1-2}$ alkyl. In another embodiment, $G^{1'}$ is $C_{1-2}$ haloalkyl. In another embodiment, $G^{1'}$ is hydroxy. In another embodiment, $G^{1'}$ is cyano. In another embodiment, $G^{1'}$ is nitro. In another embodiment, $G^{1'}$ is $C_{1-2}$ alkoxy. In another embodiment, $G^{1'}$ is $C_{1-2}$ haloalkoxy.

In one embodiment, $R^{A2}$ is halo. In another embodiment, $R^{A2}$ is $C_{1-6}$ alkyl. In another embodiment, $R^{A2}$ is $C_{2-6}$ alkenyl. In another embodiment, $R^{A2}$ is $C_{2-6}$ alkynyl. In another embodiment, $R^{A2}$ is $C_{1-6}$ haloalkyl. In another embodiment, $R^{A2}$ is hydroxy. In another embodiment, $R^{A2}$ is cyano. In another embodiment, $R^{A2}$ is nitro. In another embodiment, $R^{A2}$ is $NR^1R^2$. In another embodiment, $R^{A2}$ is $OG^2$. In another embodiment, $R^{A2}$ is $S(O)_{0-2}G^2$. In one embodiment, $R^{A2}$ is absent.

Suitably, $R^{A2}$ is absent.

In one embodiment, $G^2$ is $C_{1-6}$ alkyl. In another embodiment, $G^2$ is $C_{3-7}$ cycloalkyl. In another embodiment, $G^2$ is $C_{1-6}$ haloalkyl. In another embodiment, $G^2$ is phenyl.

In one embodiment, $G^2$ is not substituted.

In another embodiment, $G^2$ is substituted by one or more $G^{2'}$. Suitably, $G^2$ is substituted by one, two, three or four, e.g., one, $G^{2'}$.

In one embodiment, $G^{2'}$ is halo. In another embodiment, $G^{2'}$ is $C_{1-2}$ alkyl. In another embodiment, $G^{2'}$ is $C_{1-2}$ haloalkyl. In another embodiment, $G^{2'}$ is hydroxy. In another embodiment, $G^{2'}$ is cyano. In another embodiment, $G^{2'}$ is nitro. In another embodiment, $G^{2'}$ is $C_{1-2}$ alkoxy. In another embodiment, $G^{2'}$ is $C_{1-2}$ haloalkoxy.

In one embodiment, $R^1$ is H. In another embodiment, $R^1$ is $C_{1-2}$ alkyl e.g. methyl. In one embodiment, $R^2$ is H. In another embodiment, $R^2$ is $C_{1-2}$ alkyl, e.g., methyl.

In another embodiment, $R^1$ and $R^2$ may combine to form a 5-7 membered heterocyclic ring such as a 5-7 membered heterocyclic ring comprising (such as containing) one nitrogen atom e.g. pyrrolidinyl, piperidinyl, azepanyl, thiomorpholinyl or morpholinyl.

In one embodiment, $R^B$ is $CH_2COOH$. In another embodiment, $R^B$ is $CH_2CH_2COOH$. In a third embodiment, $R^B$ is $CH_2$tetrazolyl. In a fourth embodiment, $R^B$ is $CH_2CH_2$tetrazolyl.

In one embodiment, $R^B$ is not substituted. In another embodiment, $R^B$ is substituted on an available carbon atom by one or more $R^{B'}$ e.g. one or two $R^{B'}$. Suitably, $R^B$ is substituted on an available carbon atom by one $R^{B'}$.

The term "available carbon atom" means any carbon atom which forms a C—H bond in the group $R^B$. The substituent replaces the hydrogen atom attached to the carbon atom.

In one embodiment, $R^{B'}$ is difluoromethyl. In another embodiment, $R^{B'}$ is trifluoromethyl. In another embodiment, $R^{B'}$ is methyl. In another embodiment, $R^B$ is optionally substituted by two $R^{B'}$ groups, attached to the same carbon atom, that are joined to form a $C_{3-6}$ cycloalkyl or a 4-6-membered heterocyclyl ring. Suitably, the two $R^{B'}$ groups are joined to form a $C_{3-6}$ cycloalkyl ring (e.g. a cyclopropyl ring). Alternatively, the two $R^{B'}$ groups are joined to form a 4-6-membered heterocyclyl ring.

Suitably, $R^B$ is $CH_2CH_2COOH$ and is optionally substituted on an available carbon atom by one $R^{B'}$ wherein $R^{B'}$ is trifluoromethyl.

In one embodiment, $R^C$ is H. In another embodiment, $R^C$ is $C_{1-2}$ alkyl e.g. methyl. In another embodiment, $R^C$ is hydroxy. In another embodiment, $R^C$ is $C_{1-2}$ alkoxy e.g. methoxy. In another embodiment, $R^C$ is fluoro.

In one embodiment, $R^D$ is H. In another embodiment, $R^D$ is $C_{1-2}$ alkyl e.g. methyl. In another embodiment, $R^D$ is hydroxy. In another embodiment, $R^D$ is $C_{1-2}$ alkoxy e.g. methoxy. In another embodiment, $R^D$ is fluoro.

In one embodiment, $R^C$ and $R^D$ may join to form a $C_{3-5}$ cycloalkyl ring, such as a $C_3$ cycloalkyl ring.

Suitably, both $R^C$ and $R^D$ are H.

In one embodiment,

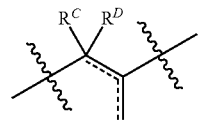

in the compound of formula (I) represents

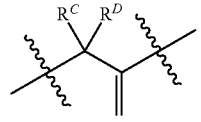

The carbon-carbon double bond in this structure is referred to as "exo".

In another embodiment,

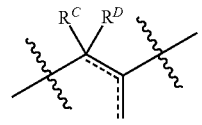

in the compound of formula (I) represents

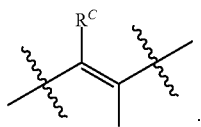

The carbon-carbon double bond in this structure is referred to as "endo".

As used herein,

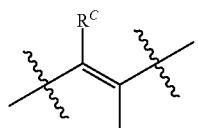

represents both cis and trans isomers.

The compounds of formula (I) in which the carbon-carbon double bond is endo can generally be obtained by isomerisation from compounds of formula (I) in which the carbon-carbon double bond is exo and such isomerisation may occur in in vitro assays or in vivo following administration of the exo compound. In some cases, isomerisation in in vitro assays, such as in vitro hepatocyte stability assays, or in vivo following administration of the exo compound may be partial and thus lead to a mixture of the endo and exo compound resulting. In some cases, the mixture of endo and exo isomers may contribute to the activity observed in a particular assay. Suitably, compounds of formula (I), such as those in which the carbon-carbon double bond is exo, are stable to isomerisation.

The total number of carbon atoms in groups $R^{A1}$ and $R^{A2}$ taken together including their optional substituents is 5-14, for example, 6-14, suitably, 7-12 or 8-12 e.g. 6-10, 7-10 or 8-10.

In an embodiment, $R^{A2}$ is absent and the total number of carbon atoms in group $R^{A1}$ including any optional substituents is 6-12, such as 7-12 or 8-12, or 6-10, 7-10 or 8-10.

In one embodiment, the compound of formula (I) is selected from the group consisting of:
2-((2-((3-octyl-1,2,4-oxadiazol-5-yl)methyl)acryloyl)oxy) acetic acid;
2-((2-((3-octyl-1,2,4-oxadiazol-5-yl)methyl)acryloyl)oxy) propanoic acid;
2-((2-((3-(4-chlorobenzyl)-1,2,4-oxadiazol-5-yl)methyl) acryloyl)oxy)acetic acid;
2-((2-((3-(1-(4-(trifluoromethyl)phenyl)cyclopropyl)-1,2,4-oxadiazol-5-yl)methyl)acryloyl)oxy)acetic acid;
(R)-4,4,4-trifluoro-3-((2-((3-octyl-1,2,4-oxadiazol-5-yl) methyl)acryloyl)oxy)butanoic acid; and
(S)-4,4,4-trifluoro-3-((2-((3-octyl-1,2,4-oxadiazol-5-yl) methyl)acryloyl)oxy)butanoic acid;
or a pharmaceutically acceptable salt and/or solvate thereof.

In another embodiment, the compound of formula (I) is selected from the group consisting of:
(R)-4,4,4-trifluoro-3-((2-((3-(1-(4-(trifluoromethyl)phenyl) cyclopropyl)-1,2,4-oxadiazol-5-yl)methyl)acryloyl)oxy) butanoic acid;
(S)-4,4,4-trifluoro-3-((2-((3-(1-(4-(trifluoromethyl)phenyl) cyclopropyl)-1,2,4-oxadiazol-5-yl)methyl)acryloyl)oxy) butanoic acid;
(R)-3-((2-((3-(4-butylbenzyl)-1,2,4-oxadiazol-5-yl)methyl) acryloyl)oxy)-4,4,4-trifluorobutanoic acid;
(S)-3-((2-((3-(4-butylbenzyl)-1,2,4-oxadiazol-5-yl)methyl) acryloyl)oxy)-4,4,4-trifluorobutanoic acid;
(R)-4,4,4-trifluoro-3-((2-((3-(4-pentylbenzyl)-1,2,4-oxadiazol-5-yl)methyl)acryloyl)oxy)butanoic acid;
(S)-4,4,4-trifluoro-3-((2-((3-(4-pentylbenzyl)-1,2,4-oxadiazol-5-yl)methyl)acryloyl)oxy)butanoic acid;
2-((2-((3-(4-butylbenzyl)-1,2,4-oxadiazol-5-yl)methyl) acryloyl)oxy)acetic acid;
2-(1H-tetrazol-5-yl)ethyl 2-((3-(4-butylbenzyl)-1,2,4-oxadiazol-5-yl)methyl)acrylate;
3-((2-((3-(4-butylbenzyl)-1,2,4-oxadiazol-5-yl)methyl) acryloyl)oxy)propanoic acid;
(1H-tetrazol-5-yl)methyl 2-((3-(4-butylbenzyl)-1,2,4-oxadiazol-5-yl)methyl)acrylate;
4,4,4-trifluoro-2,2-dimethyl-3-((2-((3-octyl-1,2,4-oxadiazol-5-yl)methyl)acryloyl)oxy)butanoic acid;
2-((2-((3-(1-(4-bromophenyl)cyclopropyl)-1,2,4-oxadiazol-5-yl)methyl)acryloyl)oxy)acetic acid;
2-((2-((3-(1-(4-(trifluoromethoxy)phenyl)cyclopropyl)-1,2,4-oxadiazol-5-yl)methyl)acryloyl)oxy)acetic acid;
2-((2-((3-(4-(trifluoromethoxy)benzyl)-1,2,4-oxadiazol-5-yl)methyl)acryloyl)oxy)acetic acid; and
2-((2-((3-pentyl-1,2,4-oxadiazol-5-yl)methyl)acryloyl)oxy) acetic acid;
or a pharmaceutically acceptable salt and/or solvate thereof.

In another embodiment, the compound of formula (I) is:
2-((2-((3-(1-(4-(((trifluoromethyl)thio)phenyl)cyclopropyl)-1,2,4-oxadiazol-5-yl)methyl)acryloyl)oxy)acetic acid;
or a pharmaceutically acceptable salt and/or solvate thereof.

The compounds of the invention may be prepared by the general methods described herein. In particular, compounds of formula (I) can be prepared as described in the Examples, see for example General Procedures A and B, or by methods analogous thereto, or by other methods known to the skilled person.

Compounds of formula (I) may prepared using the routes set out in the following schemes.

Scheme 1: Synthesis of compounds of formula (I)

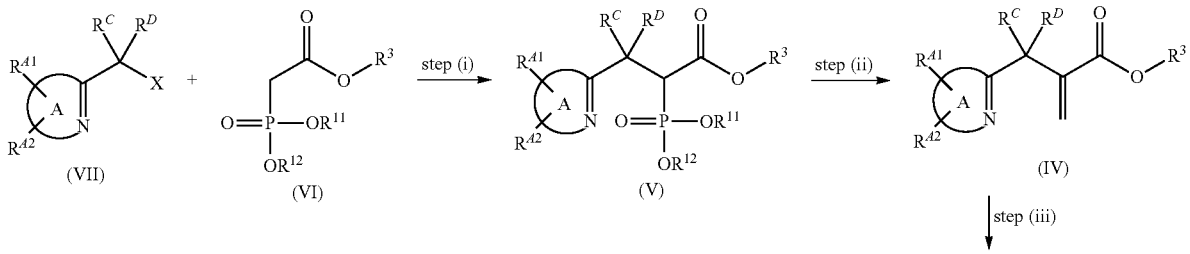

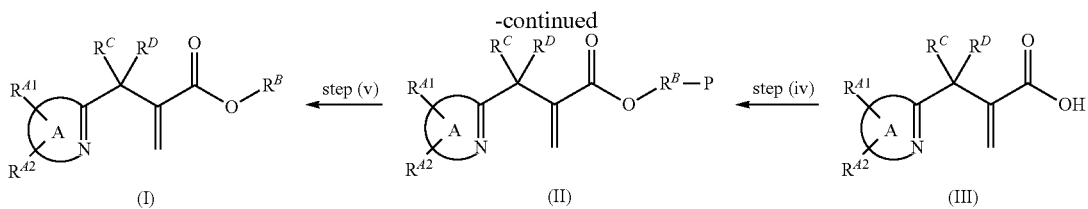

(I)   (II)   (III)

A, $R^{A1}$, $R^{A2}$, $R^C$, $R^D$ and $R^B$ are defined elsewhere herein, and P represents a carboxylic acid protecting group such as $C_{1-6}$ alkyl e.g. tert-butyl, or para-methoxybenzyl, or a tetrazolyl protecting group such as para-methoxybenzyl or trityl.

Step (i): compounds of formula (VII)—wherein X represents a leaving group, such as chloro, bromo, iodo, alkanesulfonate, e.g., methanesulfonate, or arenesulfonate, e.g., para-toluenesulfonate or benzenesulfonate—are reacted with a trialkylphosphonoacetate of formula (VI)—wherein $R^{11}$, $R^{12}$ and $R^3$ independently represent $C_{1-4}$ alkyl optionally substituted with halo—to provide compounds of formula (V).

Step (ii): compounds of formula (V) undergo a condensation reaction with formaldehyde or a formaldehyde equivalent thereof, e.g., paraformaldehyde, to give α,β-unsaturated esters of formula (IV).

Step (iii): compounds of formula (IV) are hydrolysed under standard acid or base hydrolysis conditions, e.g., TFA in DCM when $R^3$ is tert-butyl, to give compounds of formula (III).

Step (iv): compounds of formula (III) are coupled with either (a) X—$R^B$—P wherein X represents a leaving group, such as chloro, bromo, iodo, alkanesulfonate, e.g., methanesulfonate, or arenesulfonate, e.g., para-toluenesulfonate or benzenesulfonate and P represents a carboxylic acid protecting group such as $C_{1-6}$ alkyl, e.g., tert-butyl, or para-methoxybenzyl, under basic conditions, such as in the presence of potassium carbonate in DMF, or (b) HO—$R^B$—P, where P is as described above, using a coupling agent like HATU or EDCI, in the presence of a base, such as DIPEA, and a catalyst, e.g., DMAP, to give compounds of formula (II). When $R^B$ comprises tetrazolyl, the tetrazolyl is suitably protected with P wherein P is para-methoxybenzyl or trityl, suitably para-methoxybenzyl.

Step (v): compounds of formula (I) are obtained by removal of the carboxylic acid protecting group or tetrazolyl protecting group from compounds of formula (II) e.g. under acidic conditions, or other suitable conditions which are known to the person skilled in the art.

Scheme 2: Synthesis of compounds of formula (V)

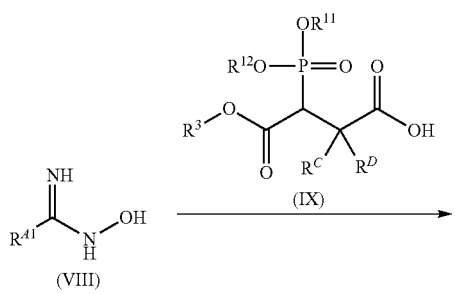

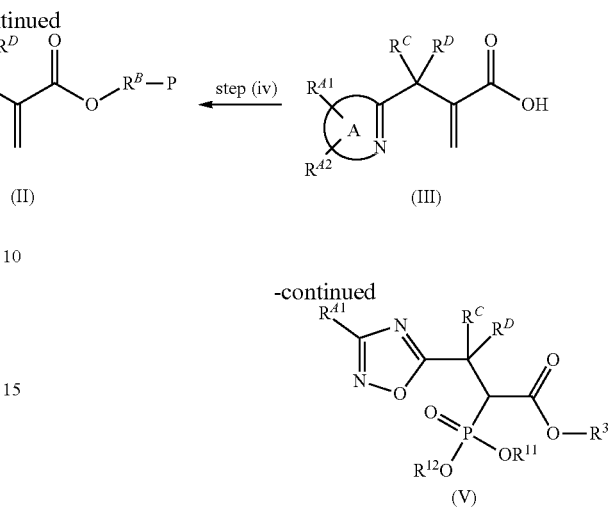

(V)

$R^{11}$, $R^{12}$ and $R^3$ are defined above, $R^{A1}$, $R^C$ and $R^D$ are defined elsewhere herein, and $R^{A2}$ is absent. Certain compounds of formula (V) may be prepared by reacting commercially available oxime (VIII) or compounds of formula (VIII) which are prepared as disclosed herein, with commercially available acid (IX) in the presence of a coupling agent such as HATU and a base such as DIPEA. Compounds of formula (I) may be accessed from compounds of formula (V) as described in Scheme 1.

Scheme 3: Synthesis of compounds of formula (V)

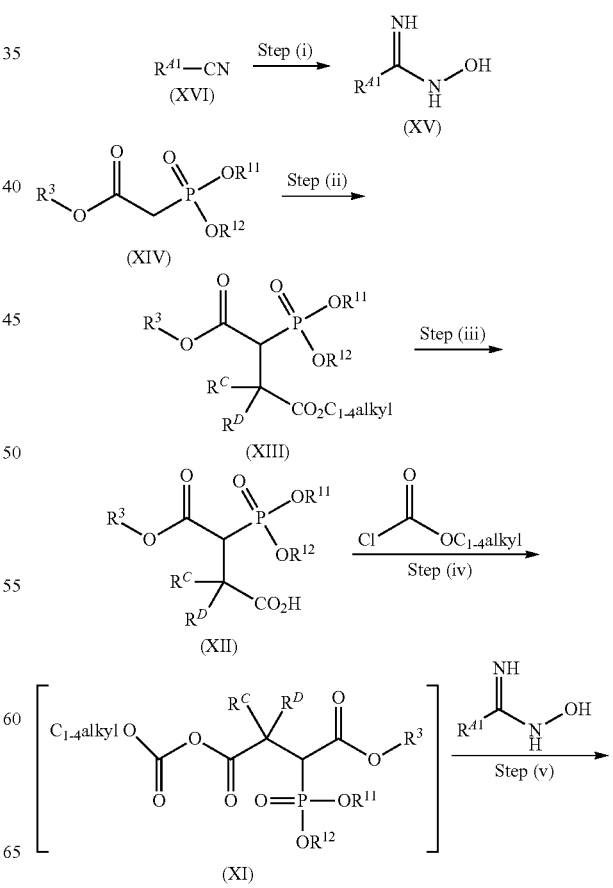

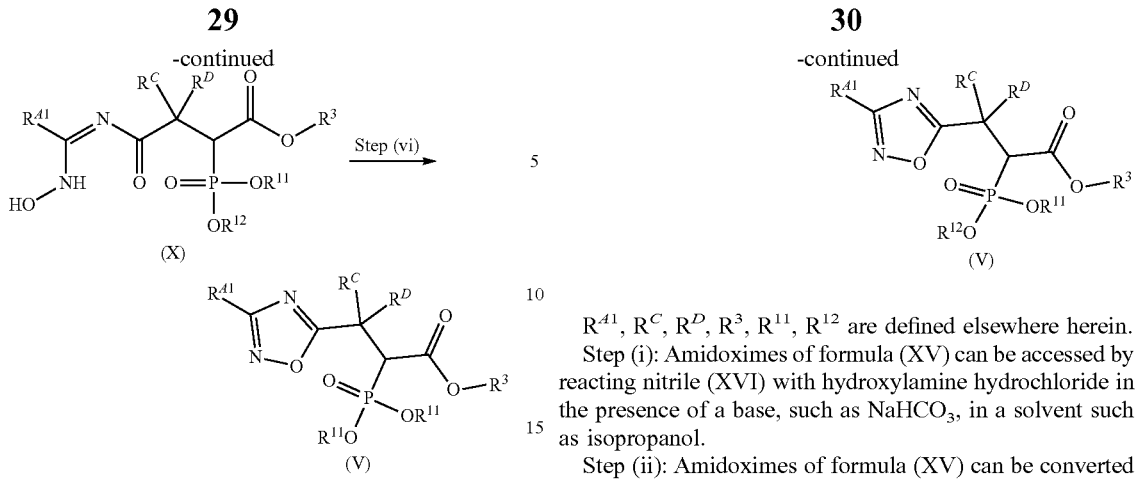

$R^{11}$, $R^{12}$ and $R^3$ are defined above, $R^{41}$, $R^C$ and $R^D$ are defined elsewhere herein, and $R^{42}$ is absent. Certain compounds of formula (V) may be prepared in 6 steps from commercially available nitriles of formula (XVI) and phosphonoacetates of formula (XIV).

Step (i): amidoximes of formula (XV) can be accessed by reacting nitrile (XVI) with hydroxylamine hydrochloride in the presence of a base such as NaHCO$_3$ in a solvent such as isopropanol.

Step (ii): compounds of formula (XIII) can be accessed by reacting phosphonate (XIV) with an appropriate ester possessing a leaving group under basic conditions (such as in the presence of NaH in tetrahydrofuran).

Step (iii): carboxylic acids of formula (XII) can be accessed by hydrolysis of the ester in compounds of formula (XIII), such as under basic conditions, for example aqueous 1M sodium hydroxide solution in tetrahydrofuran.

Step (iv) and (v): compounds of formula (X) can be accessed by reacting compounds of formula (XII) with a chloroformate in the presence of base, such as 4-methylmorpholine, to form intermediates of formula (XI), followed by addition of the amidoxime of formula (XV) to compounds of formula (X) under basic conditions, such as in the presence of triethylamine, to give compounds of formula (X).

Step (vi): compounds of formula (V) can be accessed by exposing compounds of formula (X) to basic conditions, such as Cs$_2$CO$_3$ in the presence of tetrahydrofuran, to give compounds of formula (V).

Scheme 4: Synthesis of compounds of formula (V)

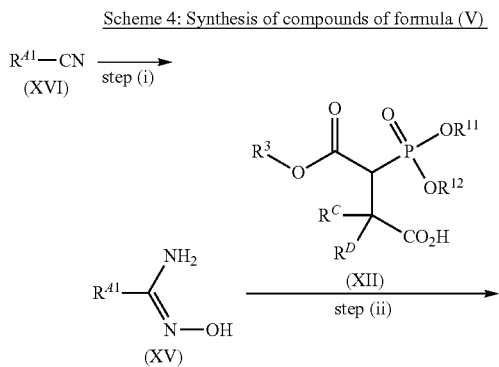

$R^{41}$, $R^C$, $R^D$, $R^3$, $R^{11}$, $R^{12}$ are defined elsewhere herein.

Step (i): Amidoximes of formula (XV) can be accessed by reacting nitrile (XVI) with hydroxylamine hydrochloride in the presence of a base, such as NaHCO$_3$, in a solvent such as isopropanol.

Step (ii): Amidoximes of formula (XV) can be converted to compounds of formula (V) by reaction with carboxylic acids of formula (XII) in the presence of an activating agent, such as T3P (propanephosphonic acid anhydride), and an organic base such as triethylamine.

The skilled person will appreciate that protecting groups may be used throughout the synthetic scheme described above to give protected derivatives of any of the above compounds or generic formulae. Protective groups and the means for their removal are described in "*Protective Groups in Organic Synthesis*", by Theodora W. Greene and Peter G. M. Wuts, published by John Wiley & Sons Inc; 4th Rev Ed., 2006, ISBN-10: 0471697540. Examples of nitrogen protecting groups include tert-butyloxycarbonyl (BOC), 9-fluorenylmethyloxycarbonyl (Fmoc), acetyl (Ac), benzyl (Bn) and para-methoxy benzyl (PMB). Examples of oxygen protecting groups include acetyl (Ac), methoxymethyl (MOM), para-methoxybenzyl (PMB), benzyl, tert-butyl, methyl, ethyl, tetrahydropyranyl (THP), and silyl ethers and esters (such as trimethylsilyl (TMS), tert-butyldimethylsilyl (TBDMS), tri-iso-propylsilyloxymethyl (TOM), and triisopropylsilyl (TIPS) ethers and esters). Carboxylic acid protecting groups (such as P as used herein) include esters such as benzyl, para-methoxybenzyl, C$_{1-6}$alkyl, e.g., methyl and tert-butyl, haloalkyl, e.g., 2,2,2-trichloroethyl, and silyl esters. Tetrazolyl protecting groups (such as P as used herein) include para-methoxybenzyl and trityl.

The invention provides a process for the preparation of compounds of formula (I) as set out in Scheme 1. Specifically, there is provided a process for the preparation of compounds of formula (I) or a salt, such as a pharmaceutically acceptable salt, and/or solvate thereof which comprises the step of reacting a compound of formula (III)

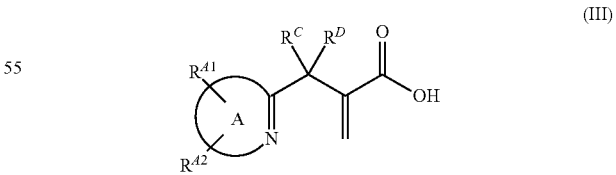

or a salt thereof;
with X—R$^B$—P or a salt thereof;
wherein R$^{41}$, R$^{42}$, A, R$^B$, R$^C$ and R$^D$ are as defined elsewhere herein, X represents a leaving group, such as chloro, bromo, iodo, alkanesulfonate, e.g., methanesulfonate, or arenesulfonate, e.g., para-toluenesulfonate or benzenesulfonate, and P represents a carboxylic acid protecting group such as $C_{1-6}$ alkyl, e.g., tert-butyl, or para-methoxybenzyl; followed by removal of protecting group P.

In this embodiment, P may additionally represent a tetrazolyl protecting group such as para-methoxybenzyl or trityl, such as para-methoxybenzyl.

There is also provided a process for the preparation of compounds of formula (I) or a salt, such as a pharmaceutically acceptable salt, and/or solvate thereof which comprises the step of reacting a compound of formula (III)

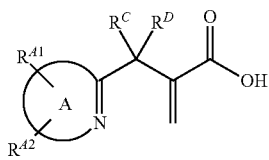

or a salt thereof:
with HO—$R^B$—P or a salt thereof;
wherein $R^{A1}$, $R^{A2}$, A, $R^B$, $R^C$ and $R^D$ are as defined elsewhere herein, and P represents a carboxylic acid protecting group such as $C_{1-6}$ alkyl, e.g., tert-butyl, or para-methoxybenzyl; followed by removal of protecting group P.

In this embodiment, P may additionally represent a tetrazolyl protecting group such as para-methoxybenzyl or trityl, such as para-methoxybenzyl.

Protecting group P may be removed under conditions known to the skilled person. When P is $C_{1-6}$ alkyl, e.g., tert-butyl, P may be removed using acidic conditions such as TFA in DCM. When P is para-methoxybenzyl or trityl, P may also be removed using acidic conditions, such as hydrogen chloride in dioxane.

The moiety "—$R^B$—P" as used herein means that $R^B$ is protected with protecting group P. The location and specific protecting group will depend on the identity of $R^B$ which will be understood by the skilled person.

For example, when $R^B$ comprises $CH_2COOH$ or $CH_2CH_2COOH$, suitably P is a carboxylic acid protecting group and suitably replaces the hydrogen atom attached to an oxygen atom, i.e., "—$R^B$—P" is $CH_2COO$—P or $CH_2CH_2COO$—P.

When $R^B$ comprises $CH_2$tetrazolyl or $CH_2CH_2$tetrazolyl, suitably P is a tetrazolyl protecting group which replaces the hydrogen atom attached to a nitrogen atom:

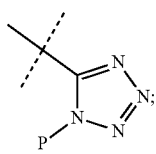

i.e., "—$R^B$—P" is

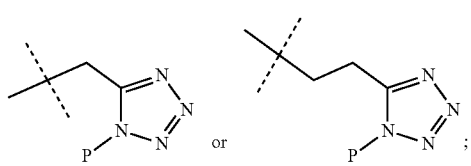

wherein the dashed line indicates attachment to the remainder of the compound of formula (I).

In one embodiment, the invention provides a compound selected from the group consisting of:

a compound of formula (II):

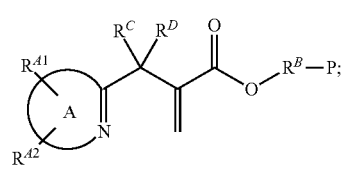

or a salt thereof;
wherein $R^{A1}$, $R^{A2}$, A, $R^B$, $R^C$, $R^D$ and P are as defined elsewhere herein;

a compound of formula (III):

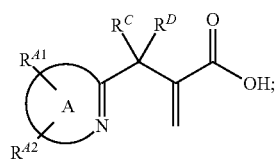

or a salt thereof;
wherein $R^{A1}$, $R^{A2}$, A, $R^C$ and $R^D$ are as defined elsewhere herein;

a compound of formula (IV):

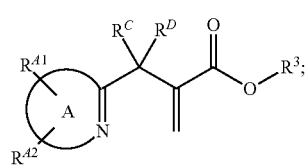

or a salt thereof; and
wherein $R^{A1}$, $R^{A2}$, A, $R^C$, $R^D$ and $R^3$ are as defined elsewhere herein;

a compound of formula (V):

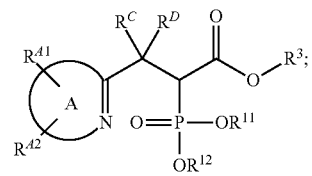

or a salt thereof;
wherein $R^{A1}$, $R^{A2}$, A, $R^B$, $R^C$, R, $R^3$, $R^{11}$, $R^{12}$ and P are as defined elsewhere herein;

a compound of formula (X):

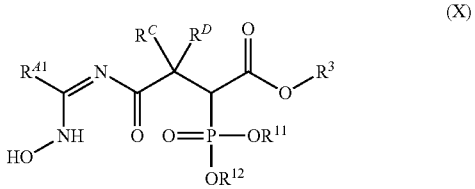

or a salt thereof;
wherein $R^{A'}$, $R^C$, $R^D$, $R^3$, $R^{11}$ and $R^{12}$ are as defined elsewhere herein.

Suitably, the compound is a compound of formula (II).

In any one of the abovementioned embodiments, such as for a compound of formula (III), suitably when

represents an isoxazole, $R^{41}$ does not represent phenyl, phenyl substituted by bromo, or phenyl substituted by methyl. In one embodiment, when

represents an isoxazole, $R^{41}$ does not represent phenyl, phenyl substituted by halo, or phenyl substituted by $C_{1-10}$ alkyl. In one embodiment, when

represents an isoxazole, $R^{41}$ does not represent phenyl or substituted phenyl.

Certain novel compounds may be used in the synthesis of compounds of formula (I). Thus, in one embodiment, there is provided a compound selected from the group consisting of:
2-((3-(1-(4-(trifluoromethyl)phenyl)cyclopropyl)-1,2,4-oxadiazol-5-yl)methyl)acrylic acid;
4-methoxybenzyl (S)-4,4,4-trifluoro-3-hydroxybutanoate; and
4-methoxybenzyl (R)-4,4,4-trifluoro-3-hydroxybutanoate;
or a salt, such as a pharmaceutically acceptable salt, and/or solvate there.

In another embodiment, there is provided a compound which is selected from the group consisting of:
2-(1-(4-methoxybenzyl)-1H-tetrazol-5-yl)ethan-1-ol;
4-methoxybenzyl 4,4,4-trifluoro-3-hydroxy-2,2-dimethylbutanoate;
5-(chloromethyl)-3-pentyl-1,2,4-oxadiazole; and
2-((3-pentyl-1,2,4-oxadiazol-5-yl)methyl)acrylic acid;
or a salt, such as a pharmaceutically acceptable salt, and/or solvate there.

In another embodiment, there is provided:
2-((3-(1-(4-((trifluoromethyl)thio)phenyl)cyclopropyl)-1,2,4-oxadiazol-5-yl)methyl)acrylic acid;
or a salt, such as a pharmaceutically acceptable salt, and/or solvate there.

In one embodiment, the molecular weight of the compound of formula (I) is 150 Da-500 Da, especially 200 Da-400 Da.

It will be appreciated that for use in therapy the salts of the compounds of formula (I) should be pharmaceutically acceptable. Suitable pharmaceutically acceptable salts will be apparent to those skilled in the art. Pharmaceutically acceptable salts include basic addition salts such as sodium, potassium, calcium, aluminium, zinc, magnesium and other metal salts. Pharmaceutically acceptable salts may also be formed with organic bases e.g. with ammonia, meglumine, tromethamine, piperazine, arginine, choline, diethylamine, benzathine or lysine. Thus, in one embodiment there is provided a compound of formula (I) in the form of a pharmaceutically acceptable salt. Alternatively, there is provided a compound of formula (I) in the form of a free acid. When the compound contains a basic group as well as the free acid it may be Zwitterionic.

The compounds of formula (I) may be prepared in crystalline or non-crystalline form and, if crystalline, may optionally be solvated, e.g. as the hydrate. This invention includes within its scope stoichiometric solvates (e.g. hydrates) as well as compounds containing variable amounts of solvent (e.g. water). Suitably, the compound of formula (I) is not a solvate.

It is to be understood that the present invention encompasses all isomers of compounds of formula (I) including all geometric, tautomeric and optical forms, and mixtures thereof (e.g. racemic mixtures). In particular, the invention extends to all tautomeric forms of the compounds of formula (I). Where additional chiral centres are present in compounds of formula (I), the present invention includes within its scope all possible diastereoisomers, including mixtures thereof. The different isomeric forms may be separated or resolved one from the other by conventional methods, or any given isomer may be obtained by conventional synthetic methods or by stereospecific or asymmetric syntheses.

The present invention also includes all isotopic forms of the compounds provided herein, whether in a form (i) wherein all atoms of a given atomic number have a mass number (or mixture of mass numbers) which predominates in nature (referred to herein as the "natural isotopic form") or (ii) wherein one or more atoms are replaced by atoms having the same atomic number, but a mass number different from the mass number of atoms which predominates in nature (referred to herein as an "unnatural variant isotopic form"). It is understood that an atom may naturally exists as a mixture of mass numbers. The term "unnatural variant isotopic form" also includes embodiments in which the proportion of an atom of given atomic number having a mass number found less commonly in nature (referred to herein as an "uncommon isotope") has been increased relative to that which is naturally occurring e.g. to the level of >20%, >50%, >75%, >90%, >95% or >99% by number of the atoms of that atomic number (the latter embodiment referred to as an "isotopically enriched variant form"). The term "unnatural variant isotopic form" also includes embodiments in which the proportion of an uncommon isotope has been reduced relative to that which is naturally occurring. Isotopic forms may include radioactive forms (i.e. they incorporate radioisotopes) and non-radioactive forms. Radioactive forms will typically be isotopically enriched variant forms.

An unnatural variant isotopic form of a compound may thus contain one or more artificial or uncommon isotopes such as deuterium ($^2$H or D), carbon-11 ($^{11}$C), carbon-13 ($^{13}$C), carbon-14 ($^{14}$C), nitrogen-13 ($^{13}$N), nitrogen-15 ($^{15}$N), oxygen-15 ($^{15}$O), oxygen-17 ($^{17}$O), oxygen-18 ($^{18}$O), phosphorus-32 ($^{32}$P), sulphur-35 ($^{35}$S), chlorine-36 ($^{36}$Cl), chlorine-37 ($^{37}$Cl), fluorine-18 ($^{18}$F) iodine-123 ($^{123}$I), iodine-125 ($^{125}$I) in one or more atoms or may contain an increased proportion of said isotopes as compared with the proportion that predominates in nature in one or more atoms.

Unnatural variant isotopic forms comprising radioisotopes may, for example, be used for drug and/or substrate tissue distribution studies. The radioactive isotopes tritium, i.e. $^3$H, and carbon-14, i.e. $^{14}$C, are particularly useful for this purpose in view of their ease of incorporation and ready means of detection. Unnatural variant isotopic forms which incorporate deuterium i.e. $^2$H or D may afford certain therapeutic advantages resulting from greater metabolic stability, for example, increased in vivo half-life or reduced dosage requirements, and hence may be preferred in some circumstances. Further, unnatural variant isotopic forms may be prepared which incorporate positron emitting isotopes, such as $^{11}$C, $^{18}$F, $^{15}$O and $^{13}$N, and would be useful in positron emission topography (PET) studies for examining substrate receptor occupancy.

In one embodiment, the compounds of formula (I) are provided in a natural isotopic form. In one embodiment, the compounds of formula (I) are provided in an unnatural variant isotopic form. In a specific embodiment, the unnatural variant isotopic form is a form in which deuterium (i.e. $^2$H or D) is incorporated where hydrogen is specified in the chemical structure in one or more atoms of a compound of formula (I). In one embodiment, the atoms of the compounds of formula (I) are in an isotopic form which is not radioactive. In one embodiment, one or more atoms of the compounds of formula (I) are in an isotopic form which is radioactive. Suitably radioactive isotopes are stable isotopes. Suitably the unnatural variant isotopic form is a pharmaceutically acceptable form.

In one embodiment, a compound of formula (I) is provided whereby a single atom of the compound exists in an unnatural variant isotopic form. In another embodiment, a compound of formula (I) is provided whereby two or more atoms exist in an unnatural variant isotopic form.

Unnatural isotopic variant forms can generally be prepared by conventional techniques known to those skilled in the art or by processes described herein e.g. processes analogous to those described in the accompanying Examples for preparing natural isotopic forms. Thus, unnatural isotopic variant forms could be prepared by using appropriate isotopically variant (or labelled) reagents in place of the normal reagents employed in the Examples. Since the compounds of formula (I) are intended for use in pharmaceutical compositions it will readily be understood that they are each preferably provided in substantially pure form, for example at least 60% pure, more suitably at least 75% pure and preferably at least 85%, especially at least 98% pure (% are on a weight for weight basis). Impure preparations of the compounds may be used for preparing the more pure forms used in the pharmaceutical compositions.

Therapeutic Indications

Compounds of formula (I) are of use in therapy, particularly for treating or preventing an inflammatory disease or a disease associated with an undesirable immune response. As shown in Biological Example 1 below, the exemplified compounds of formula (I) reduced cytokine release more effectively than 4-octyl itaconate, ethyl 2-(2-chlorobenzyl) acrylate and 2-(2-chlorobenzyl)acrylic acid, as demonstrated by lower $IC_{50}$ values. Certain compounds also activated NRF2 more potently and with higher efficacy than 4-octyl itaconate and 2-(2-chlorobenzyl)acrylic acid while also demonstrating improved stability in at least human cryopreserved hepatocytes such as in both mouse and human cryopreserved hepatocytes. Cytokines are important mediators of inflammation and immune-mediated disease as evidenced by the therapeutic benefit delivered by antibodies targeting them.

Thus, in a first aspect, the present invention provides a compound of formula (I) or a pharmaceutically acceptable salt and/or solvate thereof as defined herein, for use as a medicament. Also provided is a pharmaceutical composition comprising a compound of formula (I) or a pharmaceutically acceptable salt and/or solvate thereof as defined herein. Such a pharmaceutical composition contains (e.g. comprises) the compound of formula (I) and a pharmaceutically acceptable carrier or excipient.

In a further aspect, the present invention provides a compound of formula (I) or a pharmaceutically acceptable salt and/or solvate thereof as defined herein, for use in treating or preventing an inflammatory disease or a disease associated with an undesirable immune response. In a further aspect, the present invention provides the use of a compound of formula (I) or a pharmaceutically acceptable salt and/or solvate thereof as defined herein, in the manufacture of a medicament for treating or preventing an inflammatory disease or a disease associated with an undesirable immune response. In a further aspect, the present invention provides a method of treating or preventing an inflammatory disease or a disease associated with an undesirable immune response, which comprises administering a compound of formula (I) or a pharmaceutically acceptable salt and/or solvate thereof as defined herein.

For all aspects of the invention, suitably the compound is administered to a subject in need thereof, wherein the subject is suitably a human subject.

In one embodiment is provided a compound of formula (I) or a pharmaceutically acceptable salt and/or solvate thereof as defined herein, for use in treating an inflammatory disease or disease associated with an undesirable immune response. In one embodiment of the invention is provided the use of a compound of formula (I) or a pharmaceutically acceptable salt and/or solvate thereof as defined herein, in the manufacture of a medicament for treating an inflammatory disease or a disease associated with an undesirable immune response. In one embodiment of the invention is provided a method of treating an inflammatory disease or a disease associated with an undesirable immune response, which comprises administering a compound of formula (I) or a pharmaceutically acceptable salt and/or solvate thereof as defined herein.

In one embodiment is provided a compound of formula (I) or a pharmaceutically acceptable salt and/or solvate thereof as defined herein, for use in preventing an inflammatory disease or a disease associated with an undesirable immune response. In one embodiment of the invention is provided the use of a compound of formula (I) or a pharmaceutically acceptable salt and/or solvate thereof as defined herein, in the manufacture of a medicament for preventing an inflammatory disease or a disease associated with an undesirable immune response. In one embodiment of the invention is provided a method of preventing an inflammatory disease or a disease associated with an undesirable immune response, which comprises administering a compound of formula (I) or a pharmaceutically acceptable salt and/or solvate thereof as defined herein.

In one embodiment is provided a compound of formula (I) or a pharmaceutically acceptable salt and/or solvate thereof as defined herein, for use in treating or preventing an inflammatory disease. In one embodiment of the invention is provided the use of a compound of formula (I) or a pharmaceutically acceptable salt and/or solvate thereof as defined herein, in the manufacture of a medicament for treating or preventing an inflammatory disease. In one embodiment of the invention is provided a method of treating or preventing an inflammatory disease, which comprises administering a compound of formula (I) or a pharmaceutically acceptable salt and/or solvate thereof as defined herein.

In one embodiment is provided a compound of formula (I) or a pharmaceutically acceptable salt and/or solvate thereof as defined herein, for use in treating or preventing a disease associated with an undesirable immune response. In one embodiment of the invention is provided the use of a compound of formula (I) or a pharmaceutically acceptable salt and/or solvate thereof as defined herein, in the manufacture of a medicament for treating or preventing a disease associated with an undesirable immune response. In one embodiment of the invention is provided a method of treating or preventing a disease associated with an undesirable immune response, which comprises administering a compound of formula (I) or a pharmaceutically acceptable salt and/or solvate thereof as defined herein.

An undesirable immune response will typically be an immune response which gives rise to a pathology i.e. is a pathological immune response or reaction.

In one embodiment, the inflammatory disease or disease associated with an undesirable immune response is an auto-immune disease.

In one embodiment, the inflammatory disease or disease associated with an undesirable immune response is, or is associated with, a disease selected from the group consisting of: psoriasis (including chronic plaque, erythrodermic, pustular, guttate, inverse and nail variants), asthma, chronic obstructive pulmonary disease (COPD, including chronic bronchitis and emphysema), heart failure (including left ventricular failure), myocardial infarction, angina pectoris, other atherosclerosis and/or atherothrombosis-related disorders (including peripheral vascular disease and ischaemic stroke), a mitochondrial and neurodegenerative disease (such as Parkinson's disease, Alzheimer's disease, Huntington's disease, amyotrophic lateral sclerosis, retinitis pigmentosa or mitochondrial encephalomyopathy), autoimmune paraneoplastic retinopathy, transplantation rejection (including antibody-mediated and T cell-mediated forms), multiple sclerosis, transverse myelitis, ischaemia-reperfusion injury (e.g. during elective surgery such as cardiopulmonary bypass for coronary artery bypass grafting or other cardiac surgery, following percutaneous coronary intervention, following treatment of acute ST-elevation myocardial infarction or ischaemic stroke, organ transplantation, or acute compartment syndrome), AGE-induced genome damage, an inflammatory bowel disease (e.g. Crohn's disease or ulcerative colitis), primary sclerosing cholangitis (PSC), PSC-autoimmune hepatitis overlap syndrome, non-alcoholic fatty liver disease (non-alcoholic steatohepatitis), rheumatica, granuloma annulare, cutaneous lupus erythematosus (CLE), systemic lupus erythematosus (SLE), lupus nephritis, drug-induced lupus, autoimmune myocarditis or myopericarditis, Dressler's syndrome, giant cell myocarditis, post-pericardiotomy syndrome, drug-induced hypersensitivity syndromes (including hypersensitivity myocarditis), eczema, sarcoidosis, erythema nodosum, acute disseminated encephalomyelitis (ADEM), neuromyelitis optica spectrum disorders, MOG (myelin oligodendrocyte glycoprotein) antibody-associated disorders (including MOG-EM), optic neuritis, CLIPPERS (chronic lymphocytic inflammation with pontine perivascular enhancement responsive to steroids), diffuse myelinoclastic sclerosis, Addison's disease, alopecia areata, ankylosing spondylitis, other spondyloarthritides (including peripheral spondyloarthritis, that is associated with psoriasis, inflammatory bowel disease, reactive arthritis or juvenile onset forms), antiphospholipid antibody syndrome, autoimmune hemolytic anaemia, autoimmune hepatitis, autoimmune inner ear disease, pemphigoid (including bullous pemphigoid, mucous membrane pemphigoid, cicatricial pemphigoid, herpes gestationis or pemphigoid gestationis, ocular cicatricial pemphigoid), linear IgA disease, Behçet's disease, celiac disease, Chagas disease, dermatomyositis, diabetes mellitus type I, endometriosis, Goodpasture's syndrome, Graves' disease, Guillain-Barre syndrome and its subtypes (including acute inflammatory demyelinating polyneuropathy, AIDP, acute motor axonal neuropathy (AMAN), acute motor and sensory axonal neuropathy (AMSAN), pharyngeal-cervical-brachial variant, Miller-Fisher variant and Bickerstaff's brainstem encephalitis), progressive inflammatory neuropathy, Hashimoto's disease, hidradenitis suppurativa, inclusion body myositis, necrotising myopathy, Kawasaki disease, IgA nephropathy, Henoch-Schonlein purpura, idiopathic thrombocytopenic purpura, thrombotic thrombocytopenic purpura (TTP), Evans' syndrome, interstitial cystitis, mixed connective tissue disease, undifferentiated connective tissue disease, morphea, myasthenia gravis (including MuSK antibody positive and seronegative variants), narcolepsy, neuromyotonia, pemphigus vulgaris, pernicious anaemia, psoriatic arthritis, polymyositis, primary biliary cholangitis (also known as primary biliary cirrhosis), rheumatoid arthritis, palindromic rheumatism, schizophrenia, autoimmune (meningo-)encephalitis syndromes, scleroderma, Sjogren's syndrome, stiff person syndrome, polymylagia rheumatica, giant cell arteritis (temporal arteritis), Takayasu arteritis, polyarteritis nodosa, Kawasaki disease, granulomatosis with polyangitis (GPA; formerly known as Wegener's granulomatosis), eosinophilic granulomatosis with polyangiitis (EGPA; formerly known as Churg-Strauss syndrome), microscopic polyarteritis/polyangiitis, hypocomplementaemic urticarial vasculitis, hypersensitivity vasculitis, cryoglobulinemia, thromboangiitis obliterans (Buerger's disease), vasculitis, leukocytoclastic vasculitis, vitiligo, acute disseminated encephalomyelitis, adrenoleukodystrophy, Alexander's disease, Alper's disease, balo concentric sclerosis or Marburg disease, cryptogenic organising pneumonia (formerly known as bronchiolitis obliterans organizing pneumonia), Canavan disease, central nervous system vasculitic syndrome, Charcot-Marie-Tooth disease, childhood ataxia with central nervous system hypomyelination, chronic inflammatory demyelinating polyneuropathy (CIDP), diabetic retinopathy, globoid cell leukodystrophy (Krabbe disease), graft-versus-host disease (GVHD) (including acute and chronic forms, as well as intestinal GVHD), hepatitis C (HCV) infection or complication, herpes simplex viral infection or complication, human immunodeficiency virus (HIV) infection or complication, lichen planus, monomelic amyotrophy, cystic fibrosis, pulmonary arterial hypertension (PAH, including idiopathic PAH), lung sarcoidosis, idiopathic pulmonary fibrosis, paediatric asthma, atopic dermatitis, allergic dermatitis, contact dermatitis, allergic rhinitis, rhinitis, sinusitis, conjunctivitis, allergic conjunctivitis, keratoconjunctivitis sicca, dry eye, xerophthalmia, glaucoma, macular oedema, diabetic macular oedema, central retinal vein occlusion (CRVO), macular degeneration (including dry and/or wet age related macular degeneration, AMD), post-operative cataract inflammation, uveitis (including posterior, anterior, intermediate and pan uveitis), iridocyclitis, scleritis, corneal graft and limbal cell transplant rejection, gluten sensitive enteropathy (coeliac disease), dermatitis herpetiformis, eosinophilic esophagitis, achalasia, autoimmune dysautonomia, autoimmune encephalomyelitis, autoimmune oophoritis, autoimmune orchitis, autoimmune pancreatitis, aortitis and periaortitis, autoimmune retinopathy, autoimmune urticaria, Behcet's disease, (idiopathic) Castleman's disease, Cogan's syndrome, IgG4-related disease, retroperitoneal fibrosis, juvenile idiopathic arthritis including systemic juvenile idiopathic arthritis (Still's disease), adult-onset Still's disease, ligneous conjunctivitis, Mooren's ulcer, pityriasis lichenoides et varioliformis acuta (PLEVA, also known as Mucha-Habermann disease), multifocal motor neuropathy (MMN), paediatric acute-onset neuropsychiatric syndrome (PANS) (including paediatric autoimmune neuropsychiatric disorders associated with streptococcal infections (PANDAS)), paraneoplastic syndromes (including paraneoplastic cerebellar degeneration, Lambert-Eaton myaesthenic syndrome, limbic encephalitis, brainstem encephalitis, opsoclonus myoclonus ataxia syndrome, anti-NMDA receptor encephalitis, thymoma-associated multiorgan autoimmunity), perivenous encephalomyelitis, reflex sympathetic dystrophy, relapsing polychondritis, sperm & testicular autoimmunity, Susac's syndrome, Tolosa-Hunt syndrome, Vogt-Koyanagi-Harada Disease, anti-synthetase syndrome, autoimmune enteropathy, immune dysregulation polyendocrinopathy enteropathy X-linked (IPEX), microscopic colitis, autoimmune lymphoproliferative syndrome (ALPS), autoimmune polyendocrinopathy-candidiasis-ectodermal dystrophy syndrome (APEX), gout, pseudogout, amyloid (including AA or secondary amyloidosis), eosinophilic fasciitis (Shulman syndrome) progesterone hypersensitivity (including progesterone dermatitis), familial Mediterranean fever (FMF), tumour necrosis factor (TNF) receptor-associated periodic fever syndrome (TRAPS), hyperimmunoglobulinaemia D with periodic fever syndrome (HIDS), PAPA (pyogenic arthritis, pyoderma gangrenosum, severe cystic acne) syndrome, deficiency of interleukin-1 receptor antagonist (DIRA), deficiency of the interleukin-36-receptor antagonist (DITRA), cryopyrin-associated periodic syndromes (CAPS) (including familial cold autoinflammatory syndrome [FCAS], Muckle-Wells syndrome, neonatal onset multisystem inflammatory disease [NOMID]), NLRP12-associated autoinflammatory disorders (NLRP12AD), periodic fever aphthous stomatitis (PFAPA), chronic atypical neutrophilic dermatosis with lipodystrophy and elevated temperature (CANDLE), Majeed syndrome, Blau syndrome (also known as juvenile systemic granulomatosis), macrophage activation syndrome, chronic recurrent multifocal osteomyelitis (CRMO), familial cold autoinflammatory syndrome, mutant adenosine deaminase 2 and monogenic interferonopathies (including Aicardi-Goutieres syndrome, retinal vasculopathy with cerebral leukodystrophy, spondyloenchondrodysplasia, STING [stimulator of interferon genes]-associated vasculopathy with onset in infancy, proteasome associated autoinflammatory syndromes, familial chilblain lupus, dyschromatosis symmetrica hereditaria), Schnitzler syndrome; familial cylindromatosis, congenital B cell lymphocytosis, OTULIN-related autoinflammatory syndrome, type 2 diabetes mellitus, insulin resistance and the metabolic syndrome (including obesity-associated inflammation), atherosclerotic disorders (e.g. myocardial infarction, angina, ischaemic heart failure, ischaemic nephropathy, ischaemic stroke, peripheral vascular disease, aortic aneurysm), and renal inflammatory disorders (e.g. diabetic nephropathy, membranous nephropathy, minimal change disease, crescentic glomerulonephritis, acute kidney injury, renal transplantation).

In one embodiment, the inflammatory disease or disease associated with an undesirable immune response is, or is associated with, a disease selected from the following autoinflammatory diseases: familial Mediterranean fever (FMF), tumour necrosis factor (TNF) receptor-associated periodic fever syndrome (TRAPS), hyperimmunoglobulinaemia D with periodic fever syndrome (HIDS), PAPA (pyogenic arthritis, pyoderma gangrenosum, and severe cystic acne) syndrome, deficiency of interleukin-1 receptor antagonist (DIRA), deficiency of the interleukin-36-receptor antagonist (DITRA), cryopyrin-associated periodic syndromes (CAPS) (including familial cold autoinflammatory syndrome [FCAS], Muckle-Wells syndrome, and neonatal onset multisystem inflammatory disease [NOMID]), NLRP12-associated autoinflammatory disorders (NLRP12AD), periodic fever aphthous stomatitis (PFAPA), chronic atypical neutrophilic dermatosis with lipodystrophy and elevated temperature (CANDLE), Majeed syndrome, Blau syndrome (also known as juvenile systemic granulomatosis), macrophage activation syndrome, chronic recurrent multifocal osteomyelitis (CRMO), familial cold autoinflammatory syndrome, mutant adenosine deaminase 2 and monogenic interferonopathies (including Aicardi-Goutieres syndrome, retinal vasculopathy with cerebral leukodystrophy, spondyloenchondrodysplasia, STING [stimulator of interferon genes]-associated vasculopathy with onset in infancy, proteasome associated autoinflammatory syndromes, familial chilblain lupus, dyschromatosis symmetrica hereditaria) and Schnitzler syndrome.

In one embodiment, the inflammatory disease or disease associated with an undesirable immune response is, or is associated with, a disease selected from the following diseases mediated by excess NF-κB or gain of function in the NF-κB signalling pathway or in which there is a major contribution to the abnormal pathogenesis therefrom (including non-canonical NF-κB signalling): familial cylindromatosis, congenital B cell lymphocytosis, OTULIN-related autoinflammatory syndrome, type 2 diabetes mellitus, insulin resistance and the metabolic syndrome (including obesity-associated inflammation), atherosclerotic disorders (e.g. myocardial infarction, angina, ischaemic heart failure, ischaemic nephropathy, ischaemic stroke, peripheral vascular disease, aortic aneurysm), renal inflammatory disorders (e.g. diabetic nephropathy, membranous nephropathy, minimal change disease, crescentic glomerulonephritis, acute kidney injury, renal transplantation), asthma, COPD, type 1 diabetes mellitus, rheumatoid arthritis, multiple sclerosis, inflammatory bowel disease (including ulcerative colitis and Crohn's disease), and SLE.

In one embodiment, the disease is selected from the group consisting of rheumatoid arthritis, psoriatic arthritis, ankylosing spondylitis, systemic lupus erythematosus, multiple sclerosis, psoriasis, Crohn's disease, ulcerative colitis, uveitis, cryopyrin-associated periodic syndromes, Muckle-Wells syndrome, juvenile idiopathic arthritis and chronic obstructive pulmonary disease.

In one embodiment, the disease is multiple sclerosis.
In one embodiment, the disease is psoriasis.
In one embodiment, the disease is asthma.
In one embodiment, the disease is systemic lupus erythematosus.

In one embodiment, the disease is chronic obstructive pulmonary disease.

In one embodiment, the compound of formula (I) exhibits a lower $IC_{50}$ compared with 4-octyl itaconate when tested in a cytokine assay e.g. as described in Biological Example 1. In one embodiment, the compound of formula (I) exhibits a lower $EC_{50}$ compared with 4-octyl itaconate when tested in an NRF2 assay e.g. as described in Biological Example 2. In one embodiment, the compound of formula (I) exhibits a higher $E_{max}$ compared with 4-octyl itaconate when tested in an NRF2 assay e.g. as described in Biological Example 2. In one embodiment, the compound of formula (I) exhibits a lower $EC_{50}$ and/or higher $E_{max}$ compared with 4-octyl itaconate when tested in an NRF2 assay e.g. as described in Biological Example 2. In one embodiment, the compound of formula (I) exhibits a lower $EC_{50}$ and higher $E_{max}$ compared with 4-octyl itaconate when tested in an NRF2 assay e.g. as described in Biological Example 2. In one embodiment, the compound of formula (I) exhibits a lower $Cl_{int}$ compared with 4-octyl itaconate when tested in a hepatocyte stability assay e.g. as described in Biological Example 3. In one embodiment, the compound of formula (I) exhibits a longer half-life compared with 4-octyl itaconate when tested in a hepatocyte stability assay e.g. as described in Biological Example 3. In one embodiment, the compound of formula (I) exhibits a lower $Cl_{int}$ and longer half-life compared with 4-octyl itaconate when tested in a hepatocyte assay e.g. as described in Biological Example 3. In any one of the above embodiments, suitably, the hepatocytes are human cryopreserved hepatocytes.

Administration

The compound of formula (I) is usually administered as a pharmaceutical composition. Thus, in one embodiment, is provided a pharmaceutical composition comprising a compound of formula (I) and one or more pharmaceutically acceptable diluents or carriers.

The compound of formula (I) may be administered by any convenient method, e.g. by oral, parenteral, buccal, sublingual, nasal, rectal, intrathecal or transdermal administration, and the pharmaceutical compositions adapted accordingly.

The compound of formula (I) may be administered topically to the target organ e.g. topically to the eye, lung, nose or skin. Hence the invention provides a pharmaceutical composition comprising a compound of formula (I) optionally in combination with one or more topically acceptable diluents or carriers.

A compound of formula (I) which is active when given orally can be formulated as a liquid or solid, e.g. as a syrup, suspension, emulsion, tablet, capsule or lozenge.

A liquid formulation will generally consist of a suspension or solution of the compound of formula (I) in a suitable liquid carrier(s). Suitably the carrier is non-aqueous e.g. polyethylene glycol or an oil. The formulation may also contain a suspending agent, preservative, flavouring and/or colouring agent.

A composition in the form of a tablet can be prepared using any suitable pharmaceutical carrier(s) routinely used for preparing solid formulations, such as magnesium stearate, starch, lactose, sucrose and cellulose.

A composition in the form of a capsule can be prepared using routine encapsulation procedures, e.g. pellets containing the active ingredient can be prepared using standard carriers and then filled into a hard gelatine capsule; alternatively, a dispersion or suspension can be prepared using any suitable pharmaceutical carrier(s), e.g. aqueous gums, celluloses, silicates or oils and the dispersion or suspension then filled into a soft gelatine capsule.

Typical parenteral compositions consist of a solution or suspension of the compound of formula (I) in a sterile aqueous carrier or parenterally acceptable oil, e.g. polyethylene glycol, polyvinyl pyrrolidone, lecithin, arachis oil or sesame oil. Alternatively, the solution can be lyophilised and then reconstituted with a suitable solvent just prior to administration.

Compositions for nasal administration may conveniently be formulated as aerosols, drops, gels and powders. Aerosol formulations typically comprise a solution or fine suspension of the compound of formula (I) in a pharmaceutically acceptable aqueous or non-aqueous solvent and are usually presented in single or multidose quantities in sterile form in a sealed container which can take the form of a cartridge or refill for use with an atomising device. Alternatively, the sealed container may be a disposable dispensing device such as a single dose nasal inhaler or an aerosol dispenser fitted with a metering valve. Where the dosage form comprises an aerosol dispenser, it will contain a propellant which can be a compressed gas e.g. air, or an organic propellant such as a chlorofluorocarbon (CFC) or a hydrofluorocarbon (HFC). Aerosol dosage forms can also take the form of pump-atomisers.

Topical administration to the lung may be achieved by use of an aerosol formulation. Aerosol formulations typically comprise the active ingredient suspended or dissolved in a suitable aerosol propellant, such as a chlorofluorocarbon (CFC) or a hydrofluorocarbon (HFC).

Topical administration to the lung may also be achieved by use of a non-pressurised formulation such as an aqueous solution or suspension. These may be administered by means of a nebuliser e.g. one that can be hand-held and portable or for home or hospital use (i.e. non-portable). The formulation may comprise excipients such as water, buffers, tonicity adjusting agents, pH adjusting agents, surfactants and co-solvents.

Topical administration to the lung may also be achieved by use of a dry-powder formulation. The formulation will typically contain a topically acceptable diluent such as lactose, glucose or mannitol (preferably lactose).

The compound of the invention may also be administered rectally, for example in the form of suppositories or enemas, which include aqueous or oily solutions as well as suspensions and emulsions and foams. Such compositions are prepared following standard procedures, well known by those skilled in the art. For example, suppositories can be prepared by mixing the active ingredient with a conventional suppository base such as cocoa butter or other glycerides. In this case, the drug is mixed with a suitable non-irritating excipient which is solid at ordinary temperatures but liquid at the rectal temperature and will therefore melt in the rectum to release the drug. Such materials are cocoa butter and polyethylene glycols.

Generally, for compositions intended to be administered topically to the eye in the form of eye drops or eye ointments, the total amount of the compound of the present invention will be about 0.0001 to less than 4.0% (w/w).

Preferably, for topical ocular administration, the compositions administered according to the present invention will be formulated as solutions, suspensions, emulsions and other dosage forms.

The compositions administered according to the present invention may also include various other ingredients, including, but not limited to, tonicity agents, buffers, surfactants, stabilizing polymer, preservatives, co-solvents and viscosity building agents. Suitable pharmaceutical compositions of the present invention include a compound of the invention formulated with a tonicity agent and a buffer. The pharmaceutical compositions of the present invention may further optionally include a surfactant and/or a palliative agent and/or a stabilizing polymer.

Various tonicity agents may be employed to adjust the tonicity of the composition, preferably to that of natural tears for ophthalmic compositions. For example, sodium chloride, potassium chloride, magnesium chloride, calcium chloride, simple sugars such as dextrose, fructose, galactose, and/or simply polyols such as the sugar alcohols mannitol, sorbitol, xylitol, lactitol, isomaltitol, maltitol, and hydrogenated starch hydrolysates may be added to the composition to approximate physiological tonicity. Such an amount of tonicity agent will vary, depending on the particular agent to be added. In general, however, the compositions will have a tonicity agent in an amount sufficient to cause the final composition to have an ophthalmically acceptable osmolality (generally about 150-450 mOsm, preferably 250-350 mOsm and most preferably at approximately 290 mOsm). In general, the tonicity agents of the invention will be present in the range of 2 to 4% w/w. Preferred tonicity agents of the invention include the simple sugars or the sugar alcohols, such as D-mannitol.

An appropriate buffer system (e.g. sodium phosphate, sodium acetate, sodium citrate, sodium borate or boric acid) may be added to the compositions to prevent pH drift under storage conditions. The particular concentration will vary, depending on the agent employed. Preferably however, the buffer will be chosen to maintain a target pH within the range of pH 5 to 8, and more preferably to a target pH of pH 5 to 7.

Surfactants may optionally be employed to deliver higher concentrations of compound of the present invention. The surfactants function to solubilise the compound and stabilise colloid dispersion, such as micellar solution, microemulsion, emulsion and suspension. Examples of surfactants which may optionally be used include polysorbate, poloxamer, polyosyl 40 stearate, polyoxyl castor oil, tyloxapol, Triton, and sorbitan monolaurate. Preferred surfactants to be employed in the invention have a hydrophile/lipophile/balance "HLB" in the range of 12.4 to 13.2 and are acceptable for ophthalmic use, such as TritonX114 and tyloxapol.

Additional agents that may be added to the ophthalmic compositions of compounds of the present invention are demulcents which function as a stabilising polymer. The stabilizing polymer should be an ionic/charged example with precedence for topical ocular use, more specifically, a polymer that carries negative charge on its surface that can exhibit a zeta-potential of (−)10-50 mV for physical stability and capable of making a dispersion in water (i.e. water soluble). A preferred stabilising polymer of the invention would be polyelectrolyte, or polyelectrolytes if more than one, from the family of cross-linked polyacrylates, such as carbomers and Pemulen®, specifically Carbomer 974p (polyacrylic acid), at 0.1-0.5% w/w.

Other compounds may also be added to the ophthalmic compositions of the compound of the present invention to increase the viscosity of the carrier. Examples of viscosity enhancing agents include, but are not limited to: polysaccharides, such as hyaluronic acid and its salts, chondroitin sulfate and its salts, dextrans, various polymers of the cellulose family; vinyl polymers; and acrylic acid polymers.

Topical ophthalmic products are typically packaged in multidose form. Preservatives are thus required to prevent microbial contamination during use. Suitable preservatives include: benzalkonium chloride, chlorobutanol, benzododecinium bromide, methyl paraben, propyl paraben, phenylethyl alcohol, edentate disodium, sorbic acid, polyquaternium-1, or other agents known to those skilled in the art. Such preservatives are typically employed at a level of from 0.001 to 1.0% w/v. Unit dose compositions of the present invention will be sterile, but typically unpreserved. Such compositions, therefore, generally will not contain preservatives.

Compositions suitable for buccal or sublingual administration include tablets, lozenges and pastilles where the compound of formula (I) is formulated with a carrier such as sugar and acacia, tragacanth, or gelatine and glycerine.

Compositions suitable for transdermal administration include ointments, gels and patches.

The composition may contain from 0.1% to 100% by weight, for example from 10 to 60% by weight, of the compound of formula (I), depending on the method of administration. The composition may contain from 0% to 99% by weight, for example, 40% to 90% by weight, of the carrier, depending on the method of administration. The composition may contain from 0.05 mg to 1000 mg, for example from 1.0 mg to 500 mg, such as from 1.0 mg to 50 mg, e.g. about 10 mg of the compound of formula (I), depending on the method of administration. The composition may contain from 50 mg to 1000 mg, for example from 100 mg to 400 mg of the carrier, depending on the method of administration. The dose of the compound used in the treatment of the aforementioned disorders will vary in the usual way with the seriousness of the disorders, the weight of the sufferer, and other similar factors. However, as a general guide suitable unit doses may be 0.05 to 1000 mg, more suitably 1.0 to 500 mg, such as from 1.0 mg to 50 mg, e.g. about 10 mg and such unit doses may be administered more than once a day, for example two or three times a day. Such therapy may extend for a number of weeks or months.

In one embodiment of the invention, the compound of formula (I) is used in combination with a further therapeutic agent or agents. When the compound of formula (I) is used in combination with other therapeutic agents, the compounds may be administered either sequentially or simultaneously by any convenient route. Alternatively, the compounds may be administered separately.

Therapeutic agents which may be used in combination with the present invention include: corticosteroids (glucocorticoids), retinoids (e.g. acitretin, isotretinoin, tazarotene), anthralin, vitamin D analogues (e.g. cacitriol, calcipotriol), calcineurin inhibitors (e.g. tacrolimus, pimecrolimus), phototherapy or photochemotherapy (e.g. psoralen ultraviolet irradiation, PUVA) or other form of ultraviolet light irradiation therapy, ciclosporine, thiopurines (e.g. azathioprine, 6-mercaptopurine), methotrexate, anti-TNFα agents (e.g. infliximab, etanercept, adalimumab, certolizumab, golimumab and biosimilars), phosphodiesterase-4 (PDE4) inhibition (e.g. apremilast, crisaborole), anti-IL-17 agents (e.g. brodalumab, ixekizumab, secukinumab), anti-IL12/IL-23 agents (e.g. ustekinumab, briakinumab), anti-IL-23 agents (e.g. guselkumab, tildrakizumab), JAK (Janus Kinase) inhibitors (e.g. tofacitinib, ruxolitinib, baricitinib, filgotinib, upadacitinib), plasma exchange, intravenous immune globulin (IVIG), cyclophosphamide, anti-CD20 B cell depleting agents (e.g. rituximab, ocrelizumab, ofatumumab, obinutuzumab), anthracycline analogues (e.g. mitoxantrone), cladribine, sphingosine 1-phosphate receptor modulators or sphingosine analogues (e.g. fingolimod, siponimod, ozanimod, etrasimod), interferon beta preparations (including interferon beta 1b/1a), glatiramer, anti-CD3 therapy (e.g. OKT3), anti-CD52 targeting agents (e.g. alemtuzumab), leflunomide, teriflunomide, gold compounds, laquinimod, potassium channel blockers (e.g. dalfampridine/4-aminopyridine), mycophenolic acid, mycophenolate mofetil, purine analogues (e.g. pentostatin), mTOR (mechanistic target of rapamycin) pathway inhibitors (e.g. sirolimus, everolimus), anti-thymocyte globulin (ATG), IL-2 receptor (CD25) inhibitors (e.g. basiliximab, daclizumab), anti-IL-6 receptor or anti-IL-6 agents (e.g. tocilizumab, siltuximab), Bruton's tyrosine kinase (BTK) inhibitors (e.g. ibrutinib), tyrosine kinase inhibitors (e.g. imatinib), ursodeoxycholic acid, hydroxychloroquine, chloroquine, B cell activating factor (BAFF, also known as BLyS, B lymphocyte stimulator) inhibitors (e.g. belimumab, blisibimod), other B cell targeted therapy including fusion proteins targeting both APRIL (A PRoliferation-Inducing Ligand) and BLyS (e.g. atacicept), PI3K inhibitors including pan-inhibitors or those targeting the p110δ and/or p110γ containing isoforms (e.g. idelalisib, copanlisib, duvelisib), interferon α receptor inhibitors (e.g. anifrolumab, sifalimumab), T cell co-stimulation blockers (e.g. abatacept, belatacept), thalidomide and its derivatives (e.g. lenalidomide), dapsone, clofazimine, leukotriene antagonists (e.g. montelukast), theophylline, anti-IgE therapy (e.g. omalizumab), anti-IL-5 agents (e.g. mepolizumab, reslizumab), long-acting muscarinic agents (e.g. tiotropium, aclidinium, umeclidinium), PDE4 inhibitors (e.g. roflumilast), riluzole, free radical scavengers (e.g. edaravone), proteasome inhibitors (e.g. bortezomib), complement cascade inhibitors including those directed against C5 (e.g. eculizumab), immunoadsor, antithymocyte globulin, 5-aminosalicylates and their derivatives (e.g. sulfasalazine, balsalazide, mesalamine), anti-integrin agents including those targeting α4β1 and/or α4δ7 integrins (e.g. natalizumab, vedolizumab), anti-CD11-α agents (e.g. efalizumab), non-steroidal anti-inflammatory drugs (NSAIDs) including the salicylates (e.g. aspirin), propionic acids (e.g. ibuprofen, naproxen), acetic acids (e.g. indomethacin, diclofenac, etodolac), oxicams (e.g. meloxicam) and fenamates (e.g. mefenamic acid), selective or relatively selective COX-2 inhibitors (e.g. celecoxib, etroxicoxib, valdecoxib and etodolac, meloxicam, nabumetone), colchicine, IL-4 receptor inhibitors (e.g. dupilumab), topical/contact immunotherapy (e.g. diphenylcyclopropenone, squaric acid dibutyl ester), anti-IL-1 receptor therapy (e.g. anakinra), IL-1β inhibitor (e.g. canakinumab), IL-1 neutralising therapy (e.g. rilonacept), chlorambucil, specific antibiotics with immunomodulatory properties and/or ability to modulate NRF2 (e.g. tetracyclines including minocycline, clindamycin, macrolide antibiotics), anti-androgenic therapy (e.g. cyproterone, spironolactone, finasteride), pentoxifylline, ursodeoxycholic acid, obeticholic acid, fibrate, cystic fibrosis transmembrane conductance regulator (CFTR) modulators, VEGF (vascular endothelial growth factor) inhibitors (e.g. bevacizumab, ranibizumab, pegaptanib, aflibercept), pirfenidone, and mizoribine.

Compounds of formula (I) may display one or more of the following desirable properties:

low $IC_{50}$ values for inhibiting release of cytokines e.g. IL-1β and/or IL-6, from cells;

low $EC_{50}$ and/or high $E_{max}$ values for activating the NRF2 pathway;

enhanced efficacy through improved metabolic stability and/or augmented maximum response;

reduced dose and dosing frequency through improved pharmacokinetics, especially as a result of enhanced stability in hepatocytes;

improved oral systemic bioavailability;

reduced plasma clearance following intravenous dosing;

improved metabolic stability e.g. as demonstrated by improved stability in plasma and/or hepatocytes;

augmented cell permeability;

enhanced aqueous solubility;

good tolerability, for example, by limiting the flushing and/or gastrointestinal side effects provoked by oral DMF (Hunt T. et al., 2015; WO2014/152494A1, incorporated herein by reference), possibly by reducing or eliminating HCA2 activity;

low toxicity at the relevant therapeutic dose;

distinct anti-inflammatory profiles resulting from varied electrophilicities, leading to differential targeting of the cysteine proteome (van der Reest J. et al., 2018) and, therefore, modified effects on gene activation.

EXAMPLES

Abbreviations

Ac acetyl
aq. aqueous
BBFO broadband fluorine observe
BEH ethylene bridged hybrid
CSH charged surface hybrid
d doublet
DAD diode array detector
DCC N,N'-dicyclohexylcarbodiimide
DCM dichloromethane
DIPEA N,N-diisopropylethylamine
DMAP 4-dimethylaminopyridine
DMF dimethyl fumarate, N,N-dimethylformamide
DMI dimethyl itaconate
DMSO dimethyl sulfoxide
EDCI 1-ethyl-3-(3-dimethylaminopropyl)carbodiimide
EDC·HCl 1-ethyl-3-(3-dimethylaminopropyl)carbodiimide hydrochloride
eq. equivalents
ES electrospray (ionisation)
EtOAc ethyl acetate
FBS fetal bovine serum
g gram(s)
GSH glutathione
h hour(s)
HATU 1-[bis(dimethylamino)methylene]-1H-1,2,3-triazolo[4,5-b]pyridinium 3-oxid hexafluorophosphate
HPLC high performance liquid chromatography
IL interleukin
IPA isopropanol
K kelvin
LCMS liquid chromatography-mass spectrometry
m multiplet
M molar concentration/molar mass
m/z mass to charge ratio
MeCN acetonitrile
mCPBA meta-chloroperoxybenzoic acid
(M)Hz (mega)hertz
MeOH methanol
min minute(s)
mL millilitre
mm millimetre mmol millimole
MS mass spectrometry
MSD mass selective detector
MTBE methyl tert-butyl ether
nm nanometre
NMP N-methyl-2-pyrrolidone
NMR nuclear magnetic resonance
NRF2 nuclear factor (erythroid-derived 2)-like 2
PMB para-methoxybenzyl
PDA photodiode array
4OI 4-octyl itaconic acid
rpm revolutions per minute
RT room temperature
s singlet
t triplet
TFA trifluoroacetic acid
TFAA trifluoroacetic anhydride
THF tetrahydrofuran
µL microlitre
µM micromolar
UPLC ultra performance liquid chromatography
VWD variable wavelength detector
wt. weight
° C. degrees centigrade Analytical Equipment NMR spectra were recorded using a Bruker 400 MHz Avance III spectrometer fitted with a BBFO 5 mm probe, or a Bruker 500 MHz Avance III HD spectrometer equipped with a Bruker 5 mm SmartProbe™. Spectra were measured at 298 K, unless indicated otherwise, and were referenced relative to the solvent resonance. The chemical shifts are reported in parts per million. Data were acquired using Bruker TopSpin software.

UPLC/MS analysis was carried out on a Waters Acquity UPLC system using either a Waters Acquity CSH C18 or BEH C18 column (2.1×30 mm) maintained at a temperature of 40° C. and eluted with a linear acetonitrile gradient appropriate for the lipophilicity of the compound over 3 or 10 minutes at a constant flow rate of 0.77 ml/min. The aqueous portion of the mobile phase was either 0.1% Formic Acid (CSH C18 column), 10 mM Ammonium Bicarbonate or 10 mM Ammonia (BEH C18 column). LC-UV chromatograms were recorded using a Waters Acquity PDA detector between 210 and 400 nm. Mass spectra were recorded using a Waters Acquity Qda detector with electrospray ionisation switching between positive and negative ion mode. Sample concentration was adjusted to give adequate UV response.

LCMS analysis was carried out on a Agilent LCMS system using either a Waters Acquity CSH C18 or BEH C18 column (4.6×30 mm) maintained at a temperature of 40° C. and eluted with a linear acetonitrile gradient appropriate for the lipophilicity of the compound over 4 or 15 minutes at a constant flow rate of 2.5 ml/min. The aqueous portion of the mobile phase was either 0.1% Formic Acid (CSH C18 column), 10 mM Ammonium Bicarbonate or 10 mM Ammonia (BEH C18 column). LC-UV chromatograms were recorded using an Agilent VWD or DAD detector at 254 nm. Mass spectra were recorded using an Agilent MSD detector with electrospray ionisation switching between positive and negative ion mode. Sample concentration was adjusted to give adequate UV response.

Alternatively, the following analytical LCMS equipment and methods were also used:

| LCMS/HPLC Instrument Details | | | | |
|---|---|---|---|---|
| System | Instrument Name | LC Detector | ELS detector | Mass detector |
| 2 | Agilent LCMS 1200 | G1315C DAD | 380 ELSD | Agilent G6110A |

| LCMS/HPLC Method Details | | | | | | | |
|---|---|---|---|---|---|---|---|
| Method Name | Solvent System | Column | Gradient | UV range | Mass Range | Column Temp. ° C. | Flow Rate ml/min |
| B | A) water + 0.05% TFA B) acetonitrile + 0.05% TFA | Waters X-Bridge C18 (50 mm × 4.6 mm × 3.5 µm) | From 95:5 to 0:100 in 1.6 min, 0:100 for 1.4 min, from 0:100 to 95:5 in 0.05 min, 95:5 for 0.7 min | 190-400 nm | 100-1100 amu | 40 | 2.0 |
| C | A) water + 0.05% TFA B) acetonitrile + 0.05% TFA | Halo C18 (30 mm × 4.6 mm × 2.7 µm) | From 95:5 to 0:100 in 0.8 min, 0:100 for 0.4 min, from 0:100 to 95:5 in 0.01 min, 95:5 for 0.2 min | 190-400 nm | 100-1100 amu | 40 | 3.0 |

Commercial Materials

All starting materials disclosed herein are commercially available or are disclosed in the literature. 4-Octyl itaconate was purchased from BOC biosciences (product number: B0001-007866); Ethyl 2-(2-chlorobenzyl)acrylate was purchased from BLDPharm. 2-(2-Chlorobenzyl)acrylic acid was purchased from Chem-Space. Dimethyl fumarate was purchased from Acros Organics.

General Methods

Unless otherwise stated all reactions were stirred.

General Procedure A

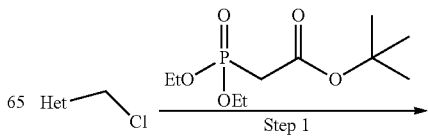

Step 1

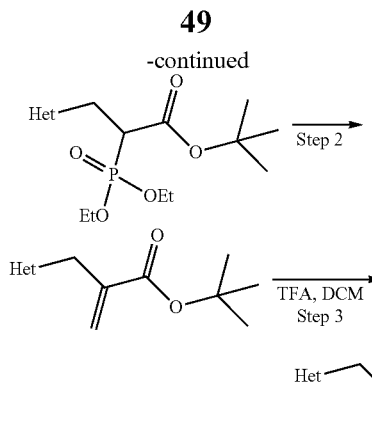

Step 1, Method A

Tert-butyl diethylphosphonoacetate (1 eq.) was added dropwise to a solution of sodium hydride (60 weight % dispersion in mineral oil, 1.1 eq.) in NMP (0.6 M) at 0° C. The reaction was warmed to RT and stirred for 2 h. A solution of chloromethyl-heteroarene (1.1 eq.) in NMP (1.3 M) was added dropwise and the mixture was heated to 60° C. for 2 h. The mixture was cooled to RT, poured into water and extracted with EtOAc (×3). The combined organic extracts were washed with brine, dried ($Na_2SO_4$) and concentrated. The crude product was purified by chromatography on silica gel to afford the required compound.

Step 1, Method B

Sodium hydride (60% dispersion in mineral oil, 1.5 eq.) was added portionwise to a solution of tert-butyl diethylphosphonoacetate (1.4 eq.) in THF (0.6 M) at 0° C. The mixture was allowed to warm to RT and stirred for 1 h. Separately, sodium iodide (1.1 eq.) was added to a chloromethyl-heteroarene (1 eq.) in THF (1.8 M) at RT. The mixture was stirred for 1 h, then added to the mixture of phosphonoacetate and sodium hydride. The reaction was heated to 70° C. and stirred for 3 h, then cooled to RT, before being partitioned between EtOAc and water. The phases were separated and the aqueous phase was extracted with EtOAc (×2). The combined organic phases were washed with brine, dried ($MgSO_4$) and concentrated. The crude product was purified by chromatography on silica gel to afford the required compound.

Step 2, Method A

Sodium hydride (60% weight dispersion in mineral oil, 1 eq.) was added to a solution of phosphonate (1 eq.) in THF (0.2 M) at 0° C. After 10 minutes, paraformaldehyde (3 eq.) was added, then the reaction was warmed to RT and stirred for 45 min. The reaction was quenched with sat. aq. $NaHCO_3$ and the mixture was extracted with EtOAc (×3). The combined organic extracts were washed with brine, dried ($Na_2SO_4$) and concentrated. The crude product was purified by chromatography on silica gel to afford the required compound.

Step 2, Method B

Paraformaldehyde (1.1-2.5 eq.) was added to a mixture of phosphonate (1 eq.) and potassium carbonate (1.2-2 eq.) in THF (0.15 M). The mixture was heated to 65° C. and stirred for 4 h, before being cooled to RT and poured into water (150 mL). The phases were separated and the aqueous phase was extracted with EtOAc (×2). The combined organic phases were washed with brine, dried ($MgSO_4$) and concentrated, then the crude product was purified by chromatography on silica gel to afford the required compound.

Step 3

TFA (10-20 eq.) was added to a solution of tert-butyl ester (1 eq.) in DCM (to make a final concentration 30-50% v/v TFA). The mixture was stirred at RT for 1-3 h, before being concentrated and co-evaporated with toluene (×2). The crude product was purified by chromatography on silica gel to afford the required compound.

General Procedure B

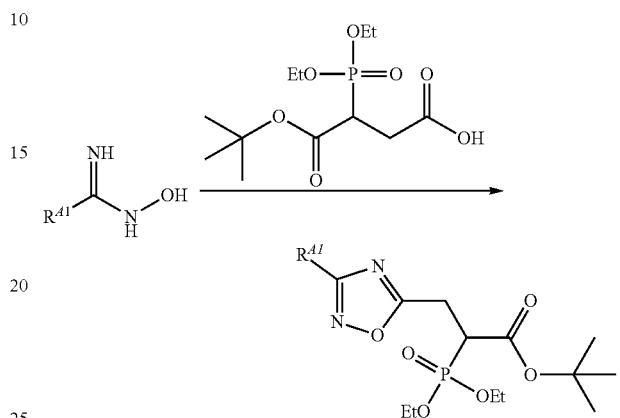

4-(tert-butoxy)-3-(diethoxyphosphoryl)-4-oxobutanoic acid may be prepared from commercially available starting materials as described below for Intermediate 3.

Method A

HATU (1.2-1.5 eq.) and amidoxime (1-1.5 eq.) were added to a solution of 4-(tert-butoxy)-3-(diethoxyphosphoryl)-4-oxobutanoic acid (1 eq.) and DIPEA (5 eq.) in DMF (0.2 M). The mixture was stirred at RT for 1 h, then heated to 90° C. for 2 h. The mixture was cooled to RT, diluted with water and extracted with EtOAc (×3). The combined organic phases were washed with 1 M HCl (200 mL), brine (200 mL), dried ($MgSO_4$) and concentrated. The crude product was purified by chromatography on silica gel to afford the required compound.

Method B

Triethylamine (3.0 eq.) was added to a suspension of amidoxime (1 eq.) and 4-(tert-butoxy)-3-(diethoxyphosphoryl)-4-oxobutanoic acid (1 eq.) in EtOAc or DMF (0.4 M) at RT. A solution of T3P (50 wt % in EtOAc or DMF, 2.0-2.5 eq.) was added dropwise at RT over 20 min. The mixture was heated to 80° C. and stirred 17 h. The mixture was cooled to RT, diluted with brine and 1M HCl and extracted with EtOAc (×3). The combined organic phases were washed with 1M HCl (aq) (×3), dried ($MgSO_4$) and concentrated. The crude product was purified by chromatography on silica gel to afford the required compound.

Intermediate 1—5-(chloromethyl)-3-octyl-1,2,4-oxadiazole

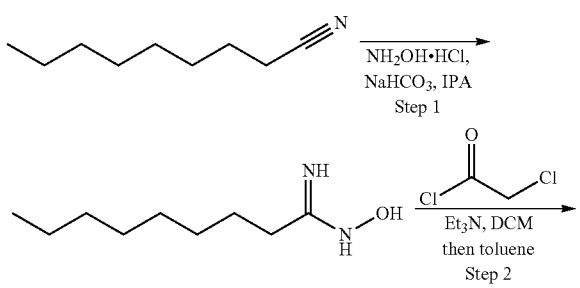

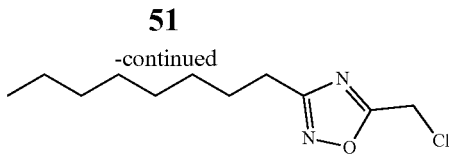

Step 1

Sodium bicarbonate (11.8 g, 141 mmol) was added to a suspension of hydroxylamine hydrochloride (5.88 g, 85 mmol) in isopropanol (100 mL). The mixture was stirred at RT for 10 min then nonanenitrile (10 mL, 57 mmol) was added and the mixture was heated to reflux for 12 h, before being cooled to RT. The mixture was filtered and concentrated in vacuo to afford N-hydroxynonanimidamide (9.74 g, 52.0 mmol, 92% purity) as a white solid. $^1$H NMR (400 MHz, DMSO-d6) δ 8.67 (s, 1H), 5.31 (s, 2H), 2.03-1.87 (m, 2H), 1.58-1.43 (m, 2H), 1.39-1.17 (m, 10H), 0.90-0.83 (m, 3H). (major tautomer assigned) LCMS m/z 173.2 (M+H)$^+$ (ES$^+$).

Step 2

Chloroacetyl chloride (3.8 mL, 48 mmol) was added dropwise to a solution of N-hydroxynonanimidamide (7.5 g, 44 mmol) and triethylamine (6.9 mL, 50 mmol) in DCM (100 mL) at 0° C. for 10 min. The mixture was allowed to warm to RT and stirred for 2 h, then diluted with EtOAc (100 mL) and washed with water (150 mL). The organic phase was washed with brine (150 mL), dried (MgSO$_4$) and concentrated. The residue was taken up in toluene (100 mL) and heated to 120° C. for 3 h, then cooled to RT and stirred for 15 h. The reaction mixture was concentrated. The crude product was purified by chromatography on silica gel (0-100% EtOAc/isohexane) to afford the title compound (6.79 g, 44 mmol) as a pale yellow oil. $^1$H NMR (400 MHz, DMSO-d6) δ 5.07 (s, 2H), 2.72 (t, J=7.4 Hz, 2H), 1.73-1.50 (m, 2H), 1.41-1.21 (m, 10H), 0.90-0.82 (m, 3H). LCMS m/z 231.0/233.0 (M+H)$^+$ (ES$^+$).

The following compound was synthesised using the same procedure as used to synthesise Intermediate 1.

| Int. Number | Structure/Name | Characterising data |
|---|---|---|
| 2 | 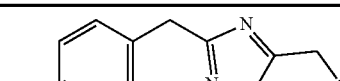<br>3-(4-chlorobenzyl)-5-(chloromethyl)-1,2,4-oxadiazole | $^1$H NMR (400 MHz, DMSO-d6) δ 7.44-7.38 (m, 2H), 7.38-7.32 (m, 2H), 5.07 (s, 2H), 4.15 (s, 2H). |
| 19 | 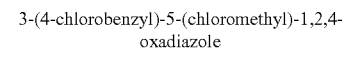<br>5-(chloromethyl)-3-pentyl-1,2,4-oxadiazole | LCMS m/z 189.1/191.2 (M + H)$^+$ (ES$^+$). $^1$H NMR (400 MHz, DMSO-d6) δ 5.07 (s, 2H), 2.72 (t, J = 7.5 Hz, 2H), 1.75-1.63 (m, 2H), 1.39-1.24 (m, 4H), 0.93-0.80 (m, 3H). |

Intermediate 3—2-((3-octyl-1,2,4-oxadiazol-5-yl)methyl)acrylic acid

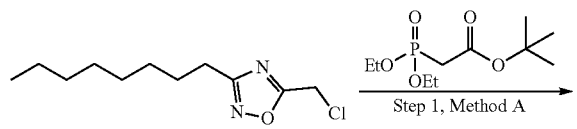

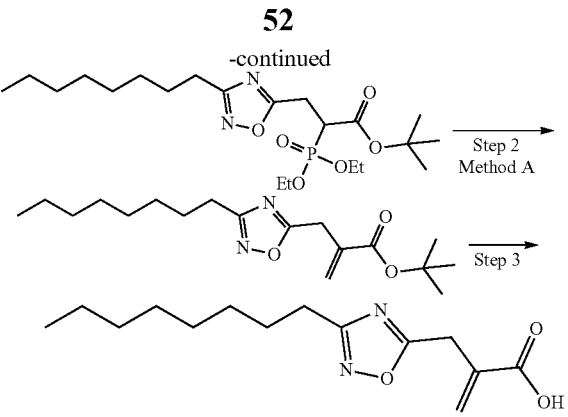

Step 1

Prepared according to General Procedure A, Step 1, Method A from 5-(chloromethyl)-3-octyl-1,2,4-oxadiazole (Intermediate 1, 0.60 g, 2.6 mmol). The crude product was purified by chromatography on silica gel (0-100% EtOAc/isohexane) to afford tert-butyl 2-(diethoxyphosphoryl)-3-(3-octyl-1,2,4-oxadiazol-5-yl)propanoate (0.413 g, 0.92 mmol) as a yellow oil. $^1$H NMR (400 MHz, DMSO-d6) δ 4.15-4.04 (m, 4H), 3.56 (ddd, J=23.4, 11.1, 4.4 Hz, 1H), 3.41-3.32 (m, 1H), 3.28-3.17 (m, 1H), 2.64 (t, J=7.4 Hz, 2H), 1.71-1.55 (m, 2H), 1.37 (s, 9H), 1.32-1.19 (m, 16H), 0.90-0.82 (m, 3H). LCMS m/z 469.3 (M+Na)$^+$ (ES$^+$).

Step 2

Prepared according to General Procedure A, Step 2, Method A from tert-butyl 2-(diethoxyphosphoryl)-3-(3-octyl-1,2,4-oxadiazol-5-yl)propanoate (0.413 g, 0.93 mmol). The crude product was purified by chromatography on silica gel (0-10% EtOAc/isohexane) to afford tert-butyl 2-((3-octyl-1,2,4-oxadiazol-5-yl)methyl)acrylate (0.105 g, 0.322 mmol) as a colourless oil. $^1$H NMR (400 MHz, DMSO-d6) δ 6.23 (d, J=1.3 Hz, 1H), 5.93-5.86 (m, 1H), 3.91 (s, 2H), 2.64 (t, J=7.3 Hz, 2H), 1.68-1.57 (m, 2H), 1.34 (s, 9H), 1.28-1.21 (m, 10H), 0.91-0.78 (m, 3H). LCMS m/z 323.2 (M+H)$^+$ (ES$^+$).

Step 3

Prepared according to General Procedure A, Step 3 from tert-butyl 2-((3-octyl-1,2,4-oxadiazol-5-yl)methyl)acrylate (0.105 g, 0.33 mmol). The crude product was purified by chromatography on silica gel (0-100% EtOAc/isohexane) to afford the title compound (0.059 g, 0.22 mmol) as a colourless oil. $^1$H NMR (400 MHz, DMSO-d6) δ 12.81 (s, 1H), 6.28 (d, J=1.2 Hz, 1H), 5.94-5.83 (m, 1H), 3.91 (s, 2H), 2.64 (t, J=7.5 Hz, 2H), 1.66-1.56 (m, 2H), 1.33-1.19 (m, 10H), 0.90-0.81 (m, 3H). LCMS m/z 267.2 (M+H)$^+$ (ES$^+$).

Intermediate 3, 2-((3-octyl-1,2,4-oxadiazol-5-yl)methyl)acrylic acid, may also be accessed using the following route:

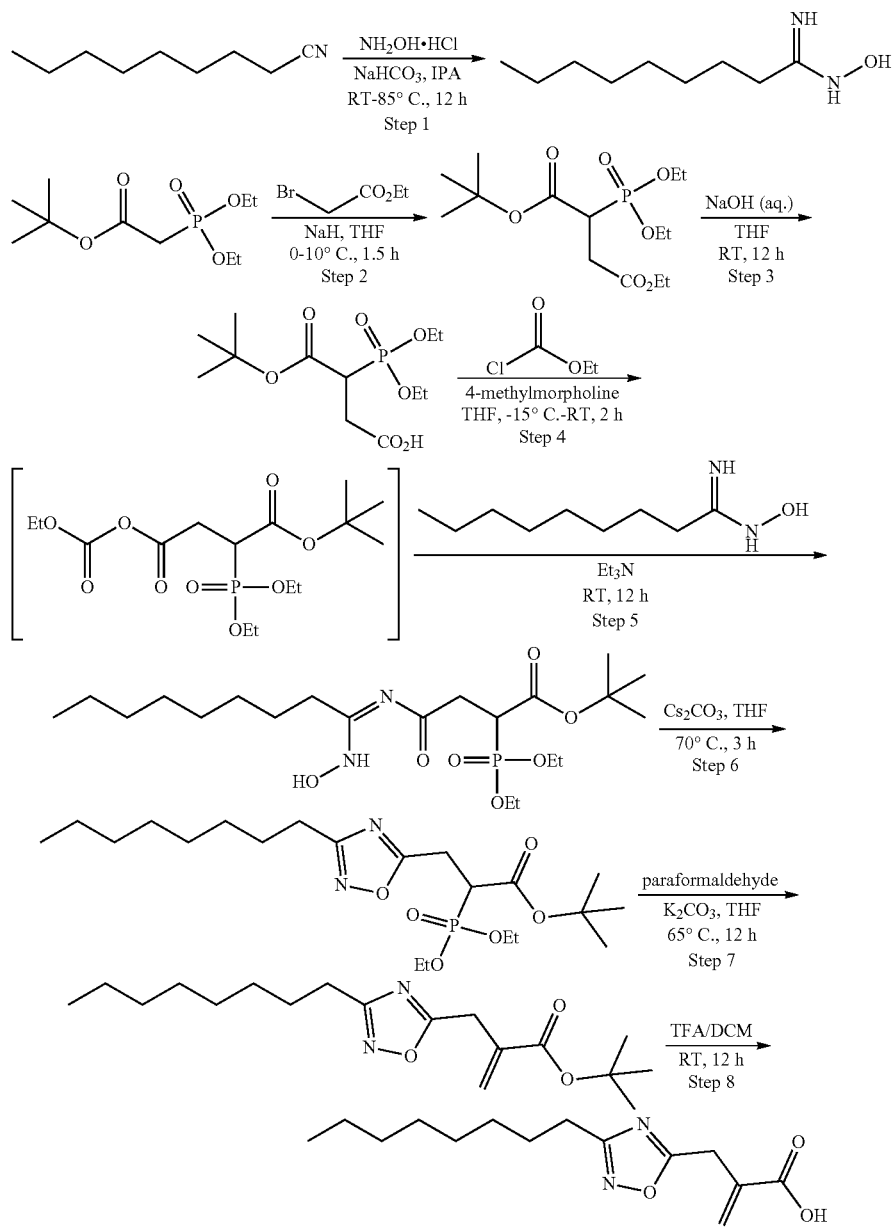

Step 1
To a solution of hydroxylamine hydrochloride (72.9 g, 1.05 mol) in isopropanol (420 mL) was added NaHCO$_3$ (150 g, 1.78 mol) in one portion. The mixture was stirred for 10 min at RT, and then nonanenitrile (73.0 g, 524 mmol) was added into the mixture in one portion. The mixture was heated to 85° C. and stirred for 12 h. The mixture was filtered, and the filter cake was washed with isopropanol (2×200 mL). The filtrate was concentrated under reduced pressure at 45° C. to give the crude N-hydroxynonanimidamide (80 g, 464 mmol, 89%) as a white solid. The crude product was used directly in the next step without further purification. $^1$H NMR (400 MHz, DMSO-d6) δ: 8.65 (s, 1H), 5.27 (s, 2H), 1.92 (t, J=7.2 Hz, 2H), 1.51-1.40 (m, 2H), 1.31-1.19 (m, 10H), 0.86 (t, J=6.0 Hz, 3H).

Step 2
Five reactions were carried out in parallel. To a solution of tert-butyl 2-(diethoxyphosphoryl)acetate (300 g, 1.19 mol) in THF (3 L) was added NaH suspension in mineral oil (60 wt. %, 50.4 g, 1.26 mol) in portions at 0° C. The mixture was stirred for 0.5 h at 0° C., then ethyl 2-bromoacetate (179 g, 1.07 mol) was added drop-wise into the mixture at such a rate to keep the internal temperature below 10° C. The mixture was stirred for 1 h at 10° C., then poured into aqueous NH$_4$Cl solution (2 L) in one portion at 0-10° C. Five batches of reactions were combined and the combined mixture was extracted with ethyl acetate (3×2 L). The combined organic layers were washed with brine (500 mL), dried over Na$_2$SO$_4$, filtered and concentrated under reduced pressure at 45° C. to give 1-(tert-butyl) 4-ethyl 2-(diethoxyphosphoryl)succinate (1.80 kg, 5.32 mol, 89% crude) as a colourless oil. The crude product was used directly in the next step without further purification. $^1$H NMR (400 MHz, DMSO-d6) δ: 4.12-3.98 (m, 6H), 3.34-3.21 (m, 1H), 2.84-2.71 (m, 1H), 2.68-2.57 (m, 1H), 1.40 (s, 9H), 1.29-1.14 (m, 9H).

Step 3

Four reactions were carried out in parallel. To a solution of 1-(tert-butyl) 4-ethyl 2-(diethoxyphosphoryl)succinate (300 g, 887 mmol) in tetrahydrofuran (1.48 L) was added aqueous NaOH solution (1 M, 1.21 L, 1.21 mol) in one portion. The mixture was stirred at room temperature for 12 h. Four reactions were combined for work up. The reaction mixture was concentrated under reduced pressure at 45° C. to remove tetrahydrofuran, and the residue was extracted with ethyl acetate (2×500 mL). The pH of the aqueous phase was adjusted to 1 with concentrated aqueous HCl (12 M), and the aqueous phase was extracted with ethyl acetate (3×2 L). The combined organic layers were washed with brine (5 L), dried over $Na_2SO_4$, filtered, and concentrated under reduced at 45° C. The crude product was triturated with isopropyl ether (1.1 L) and stirred at RT for 30 min. The suspension was filtered, and the filter cake was washed with isopropyl ether (2×300 mL) and dried under vacuum to give 4-(tert-butoxy)-3-(diethoxyphosphoryl)-4-oxobutanoic acid (840 g, 2.70 mol, 76%) as a white solid. $^1$H NMR (400 MHz, $CDCl_3$) δ: 10.04 (br.s, 1H), 4.22-4.08 (m, 4H), 3.43-3.29 (m, 1H), 3.08-2.94 (m, 1H), 2.85-2.73 (m, 1H), 1.45 (s, 9H), 1.37-1.27 (m, 6H).

Steps 4 and 5

To a solution of 4-(tert-butoxy)-3-(diethoxyphosphoryl)-4-oxobutanoic acid (100 g, 322 mmol) in THF (600 mL) was added 4-methylmorpholine (32.6 g, 322 mmol) in one portion at RT. The mixture was cooled to −15° C. and ethyl chloroformate (35.0 g, 322 mmol) was added drop-wise to the mixture at such a rate to keep the internal temperature between −15 and −10° C. The mixture was stirred for 2 h at between −15 and −10° C., then N-hydroxynonanimidamide (55.5 g, 322 mmol) and triethylamine (54.5 g, 538 mmol) were added drop-wise at −15 to −10° C. The mixture was stirred at RT for 12 h, then quenched by the addition of dilute aqueous HCl (1 M, 500 mL) at RT. The mixture was extracted with ethyl acetate (3×500 mL) and the combined organic layers were washed with brine (500 mL), dried over $Na_2SO_4$, filtered and concentrated under reduced pressure at 45° C. to give a brown oil. The crude product was purified by flash column chromatography on silica (5-100% ethyl acetate/n-heptane) to give tert-butyl 2-(diethoxyphosphoryl)-4-((1-(hydroxyamino)nonylidene)amino)-4-oxobutanoate (140 g, 301 mmol, 94%) as a yellow oil. LCMS m/z 465.1 (M+H)$^+$ (ES$^+$). $^1$H NMR (400 MHz, DMSO-d6) δ: 6.35 (s, 1H), 4.12-3.98 (m, 4H), 3.45-3.33 (m, 1H), 2.97-2.83 (m, 1H), 2.79-2.66 (m, 1H), 2.06-1.95 (m, 2H), 1.57-1.44 (m, 2H), 1.39 (s, 9H), 1.31-1.19 (m, 16H), 0.89-0.81 (m, 3H). One exchangeable proton not observed.

Step 6

To a solution of tert-butyl 2-(diethoxyphosphoryl)-4-((1-(hydroxyamino)nonylidene)amino)-4-oxobutanoate (140 g, 301 mmol) in THF (840 mL) was added $Cs_2CO_3$ (196 g, 603 mmol) in one portion at RT. The mixture was stirred for 3 h at 70° C., then quenched by the addition water (1 L) at RT. The mixture was extracted with ethyl acetate (3×1 L), and the combined organic layers were washed with brine (500 mL), dried over $Na_2SO_4$, filtered and concentrated under reduced pressure at 45° C. to give a brown oil. The crude product was purified by flash column chromatography on silica (5-100% ethyl acetate/n-heptane) to give tert-butyl 2-(diethoxyphosphoryl)-3-(3-octyl-1,2,4-oxadiazol-5-yl)propanoate (109 g, 244 mmol, 81%) as a yellow oil. LCMS m/z 469.2 (M+Na)$^+$ (ES$^+$). $^1$H NMR (400 MHz, DMSO-d6) δ: 4.14-4.04 (m, 4H), 3.60-3.48 (m, 1H), 3.39-3.28 (m, 1H), 3.27-3.17 (m, 1H), 2.62 (t, J=7.6 Hz, 2H), 1.66-1.55 (m, 2H), 1.36 (s, 9H), 1.29-1.20 (m, 16H), 0.87-0.82 (m, 3H).

Step 7

To a solution of tert-butyl 2-(diethoxyphosphoryl)-3-(3-octyl-1,2,4-oxadiazol-5-yl)propanoate (100 g, 192 mmol) in THF (600 mL) was added $K_2CO_3$ (79.9 g, 578 mmol) and paraformaldehyde (3.30 g, 193 mmol) in one portion at RT. The mixture was stirred for 12 h at 65° C., then the mixture was concentrated under reduced pressure at 45° C. to give the crude product. The crude product was purified by flash column chromatography on silica (5-100% ethyl acetate/n-heptane) to give tert-butyl 2-((3-octyl-1,2,4-oxadiazol-5-yl)methyl)acrylate (48 g, 149 mmol, 61%) as a yellow oil. LCMS m/z 323.1 (M+Na)$^+$ (ES$^+$). $^1$H NMR (400 MHz, DMSO-d6) δ: 6.22 (s, 1H), 5.89 (d, J=1.2 Hz, 1H), 3.90 (s, 2H), 2.63 (t, J=7.2 Hz, 2H), 1.67-1.55 (m, 2H), 1.34 (s, 9H), 1.31-1.18 (m, 10H), 0.85 (t, J=7.2 Hz, 3H).

Step 8

To a solution of tert-butyl 2-((3-octyl-1,2,4-oxadiazol-5-yl)methyl)acrylate (48 g, 149 mmol) in DCM (160 mL) was added TFA (170 g, 1.49 mol) in portions. The mixture was stirred for 12 h at RT and then concentrated under reduced pressure at 45° C. The residue was purified by preparative HPLC (Column: Phenomenex Luna C18 10 μm 100×250 mm; solvent system: MeCN/(0.1% TFA/water) gradient: 40-70% MeCN) to give the product which was lyophilized at RT under vacuum. The product, which still contained some MeCN was co-evaporated with MTBE (100 mL) three times, and then concentrated under reduced pressure at 45° C. for 3 h to give 2-((3-octyl-1,2,4-oxadiazol-5-yl)methyl)acrylic acid (28 g, 105 mmol, 69%) as a yellow oil. LCMS m/z 267.1 (M+Na)$^+$ (ES$^+$). $^1$H NMR (400 MHz, DMSO-d6) δ: 12.8 (s, 1H), 6.27 (s, 1H), 5.90 (d, J=0.8 Hz, 1H), 3.90 (s, 2H), 2.67-2.60 (m, 2H), 1.66-1.56 (m, 2H), 1.32-1.18 (m, 10H), 0.85 (t, J=6.8 Hz, 3H).

Intermediate 4—2-((3-(4-chlorobenzyl)-1,2,4-oxadiazol-5-yl)methyl)acrylic acid

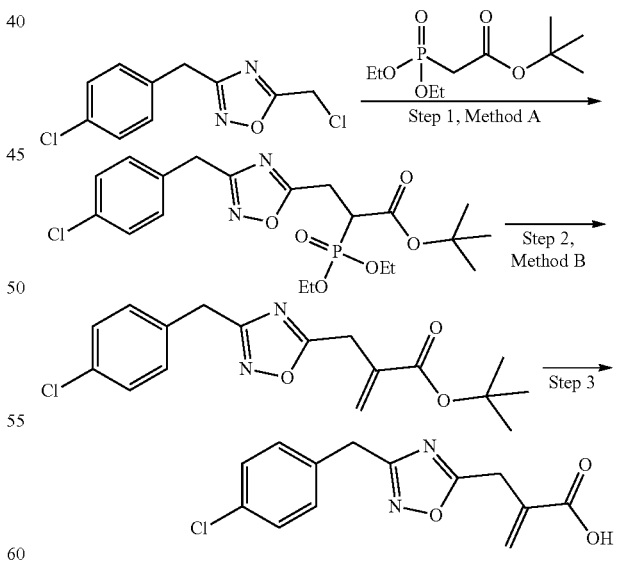

Step 1

Prepared according to General Procedure A, Step 1, Method A from 3-(4-chlorobenzyl)-5-(chloromethyl)-1,2,4-oxadiazole (Intermediate 2, 5.65 g, 23.2 mmol). The crude product was purified by chromatography on silica gel (0-100% EtOAc/isohexane) to afford tert-butyl 3-(3-(4-chlorobenzyl)-1,2,4-oxadiazol-5-yl)-2-(diethoxyphosphoryl) propanoate (7.27 g, 9.0 mmol, 57% purity) as a yellow oil. LCMS m/z 481.2/483.3 (M+Na)+ (ES+).

Step 2

Prepared according to General Procedure A, Step 2, Method B from tert-butyl 3-(3-(4-chlorobenzyl)-1,2,4-oxadiazol-5-yl)-2-(diethoxyphosphoryl)propanoate (7.27 g, 9.0 mmol, 57% purity). The crude product was purified by chromatography on silica gel (0-30% EtOAc/isohexane) to afford tert-butyl 2-((3-(4-chlorobenzyl)-1,2,4-oxadiazol-5-yl)methyl)acrylate (0.468 g, 1.4 mmol) as a colourless oil. LCMS m/z 279.1/281.0 (M-tBu+H)+ (ES+). 1H NMR (400 MHz, DMSO-d6) δ 7.42-7.35 (m, 2H), 7.35-7.26 (m, 2H), 6.21 (d, J=1.2 Hz, 1H), 5.94-5.84 (m, 1H), 4.06 (s, 2H), 3.91 (s, 2H), 1.25 (s, 9H).

Step 3

Prepared according to General Procedure A, Step 3 from tert-butyl 2-((3-(4-chlorobenzyl)-1,2,4-oxadiazol-5-yl) methyl)acrylate (0.468 g, 1.40 mmol). The crude product was purified by chromatography on silica gel (0-100% EtOAc/isohexane) to afford 2-((3-(4-chlorobenzyl)-1,2,4-oxadiazol-5-yl)methyl)acrylic acid (0.265 g, 0.94 mmol) as a colourless gum. LCMS m/z 279.5/281.1 (M+H)+ (ES+). 1H NMR (400 MHz, DMSO-d6) δ 12.80 (s, 1H), 7.44-7.35 (m, 2H), 7.35-7.28 (m, 2H), 6.27 (d, J=1.2 Hz, 1H), 5.95-5.87 (m, 1H), 4.08 (s, 2H), 3.91 (s, 2H).

Intermediate 20—2-((3-pentyl-1,2,4-oxadiazol-5-yl) methyl)acrylic acid

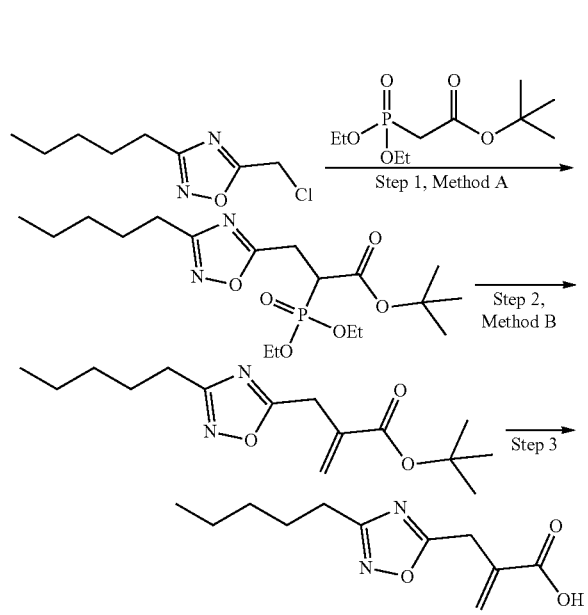

Step 1

Prepared according to General Procedure A, Step 1, Method B from 5-(chloromethyl)-3-pentyl-1,2,4-oxadiazole (Intermediate 19, 8.00 g, 36 mmol, 85% purity). The crude product was purified by chromatography on silica gel (0-50% EtOAc/isohexane) to afford tert-butyl 2-(diethoxyphosphoryl)-3-(3-pentyl-1,2,4-oxadiazol-5-yl)propanoate (6.83 g, 16 mmol) as a colourless oil. LCMS m/z 427.3 (M+H)+ (ES+). 1H NMR (400 MHz, DMSO-d6) δ 4.16-4.02 (m, 4H), 3.56 (ddd, J=23.3, 11.0, 4.4 Hz, 1H), 3.40-3.29 (m, 1H), 3.23 (ddd, J=16.8, 8.7, 4.4 Hz, 1H), 2.64 (t, J=7.4 Hz, 2H), 1.68-1.58 (m, 2H), 1.37 (s, 9H), 1.31-1.22 (m, 10H), 0.86 (t, J=6.9 Hz, 3H).

Step 2

Prepared according to General Procedure A, Step 2, Method B from tert-butyl 2-(diethoxyphosphoryl)-3-(3-pentyl-1,2,4-oxadiazol-5-yl)propanoate (6.83 g, 16 mmol). The crude product was purified by chromatography on silica gel (0-50% EtOAc/isohexane) to afford tert-butyl 2-((3-pentyl-1,2,4-oxadiazol-5-yl)methyl)acrylate (1.59 g, 5.6 mmol) as a colourless oil. LCMS m/z 225.5 (M-tBu+H)+ (ES+). 1H NMR (400 MHz, DMSO-d6) δ 7 6.23 (d, J=1.2 Hz, 1H), 5.90 (d, J=1.3 Hz, 1H), 3.91 (s, 2H), 2.64 (t, J=7.4 Hz, 2H), 1.69-1.58 (m, 2H), 1.34 (s, 9H), 1.32-1.23 (m, 4H), 0.96-0.80 (m, 3H).

Step 3

Prepared according to General Procedure A, Step 3 from tert-butyl 2-((3-pentyl-1,2,4-oxadiazol-5-yl)methyl)acrylate (1.59 g, 5.6 mmol). The crude product was purified by chromatography on silica gel (0-50% EtOAc/isohexane) to afford 2-((3-pentyl-1,2,4-oxadiazol-5-yl)methyl)acrylic acid (1.25 g, 5.5 mmol) as a pale yellow gum. LCMS m/z 225.3 (M+H)+ (ES+). 1H NMR (400 MHz, DMSO-d6) δ 12.69 (br. s, 1H), 6.28 (d, J=1.2 Hz, 1H), 5.92 (d, J=1.2 Hz, 1H), 3.91 (s, 2H), 2.65 (t, J=7.5 Hz, 2H), 1.69-1.58 (m, 2H), 1.34-1.23 (m, 4H), 0.88-0.82 (m, 3H).

Intermediate 5—2-((3-(1-(4-(trifluoromethyl)phenyl)cyclopropyl)-1,2,4-oxadiazol-5-yl)methyl) acrylic acid

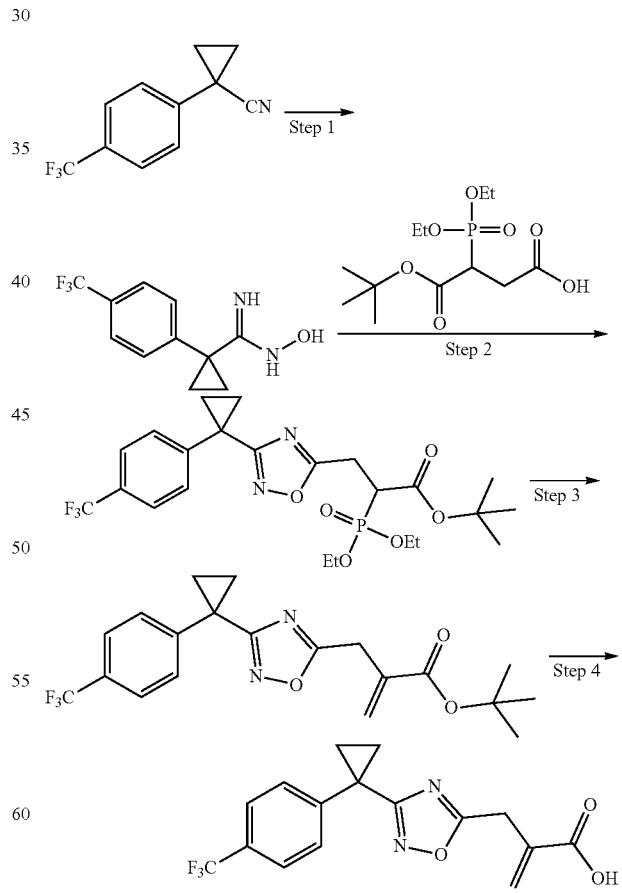

Step 1

A mixture of hydroxylamine hydrochloride (0.99 g, 14.2 mmol) and sodium bicarbonate (1.19 g, 14.2 mmol) in IPA (20 mL) was stirred for 15 min before 1-(4-(trifluoromethyl)phenyl)cyclopropane-1-carbonitrile (2.50 g, 11.8 mmol) was added and the mixture was heated to reflux and stirred for 18 h. The suspension was cooled to RT, filtered and washed with IPA (3×10 mL). The filtrate was concentrated to afford N-hydroxy-1-(4-(trifluoromethyl)phenyl)cyclopropane-1-carboximidamide (3.48 g, 10.1 mmol, 71% purity) as a white solid that was used without further purification. LCMS m/z 245.5 (M+H)$^+$ (ES$^+$). $^1$H NMR (400 MHz, DMSO-d6) δ 9.14 (s, 1H), 7.63 (d, J=8.2 Hz, 2H), 7.48-7.43 (m, 2H), 5.44 (s, 2H), 1.32-1.24 (m, 2H), 1.07-0.99 (m, 2H).

Step 2

Prepared according to General Procedure B, Method A from N-hydroxy-1-(4-(trifluoromethyl)phenyl)cyclopropane-1-carboximidamide (1.12 g, 4.59 mmol). The crude product was purified by chromatography on silica gel (0-100% MTBE/isohexane) to afford tert-butyl 2-(diethoxyphosphoryl)-3-(3-(1-(4-(trifluoromethyl)phenyl)cyclopropyl)-1,2,4-oxadiazol-5-yl)propanoate (0.532 g, 0.93 mmol, 91% purity) as a colourless oil. LCMS m/z 541.1 (M+Na)+ (ES$^+$). $^1$H NMR (400 MHz, DMSO-d6) δ 7.69 (dd, J=11.6, 8.1 Hz, 2H), 7.57 (dd, J=18.7, 8.0 Hz, 2H), 4.14-3.99 (m, 4H), 3.52 (ddd, J=23.3, 10.9, 4.4 Hz, 1H), 3.39-3.26 (m, 1H), 3.20 (ddd, J=16.8, 8.9, 4.4 Hz, 1H), 1.57-1.14 (m, 19H).

Step 3

Prepared according to General Procedure A, Step 2, Method B from tert-butyl 2-(diethoxyphosphoryl)-3-(3-(1-(4-(trifluoromethyl)phenyl)cyclopropyl)-1,2,4-oxadiazol-5-yl)propanoate (0.532 g, 0.93 mmol, 91% purity). The crude product was purified by chromatography on silica gel (0-50% MTBE/isohexane) to afford tert-butyl 2-((3-(1-(4-(trifluoromethyl)phenyl)cyclopropyl)-1,2,4-oxadiazol-5-yl)methyl)acrylate (0.107 g, 0.27 mmol) as a colourless oil. LCMS m/z 339.1 (M-tBu+H)$^+$ (ES$^+$). $^1$H NMR (400 MHz, DMSO-d6) δ 7.70 (d, J=8.1 Hz, 2H), 7.60 (d, J=8.1 Hz, 2H), 6.21 (s, 1H), 5.88 (s, 1H), 3.90 (s, 2H), 1.56-1.39 (m, 4H), 1.32 (s, 9H).

Step 4

Prepared according to General Procedure A, Step 3 from tert-butyl 2-((3-(1-(4-(trifluoromethyl)phenyl)cyclopropyl)-1,2,4-oxadiazol-5-yl)methyl)acrylate (0.107 g, 0.27 mmol). The crude product was purified by chromatography on silica gel (0-50% MTBE/isohexane) to afford 2-((3-(1-(4-(trifluoromethyl)phenyl)cyclopropyl)-1,2,4-oxadiazol-5-yl)methyl)acrylic acid (70 mg, 0.20 mmol) as a colourless oil. LCMS m/z 339.1 (M+H)$^+$ (ES$^+$). $^1$H NMR (400 MHz, DMSO-d6) δ 12.82 (s, 1H), 7.71 (d, J=8.2 Hz, 2H), 7.61 (d, J=8.1 Hz, 2H), 6.27 (d, J=1.2 Hz, 1H), 5.91 (d, J=1.3 Hz, 1H), 3.90 (s, 2H), 1.58-1.39 (m, 4H).

Intermediate 16—2-((3-(1-(4-bromophenyl)cyclopropyl)-1,2,4-oxadiazol-5-yl)methyl)acrylic acid

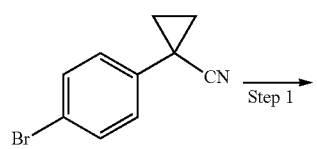

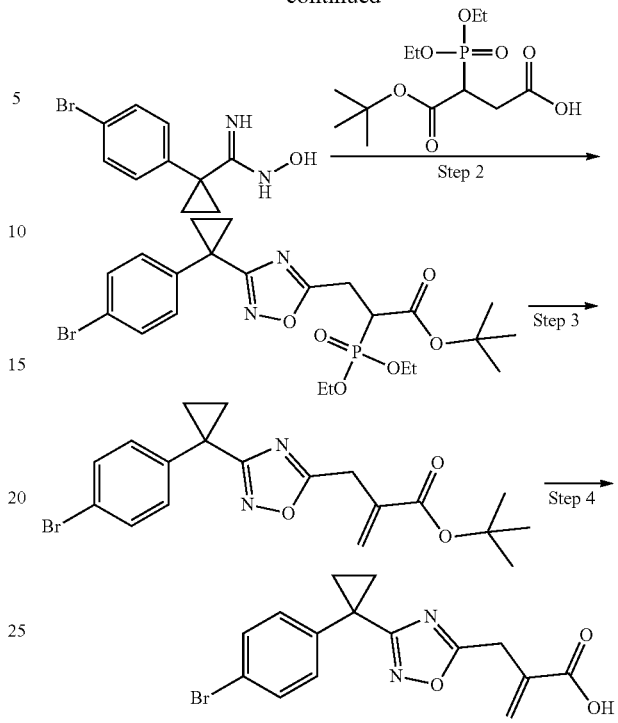

Step 1

Prepared according to Intermediate 5, Step 1 from 1-(4-bromophenyl)cyclopropane-1-carbonitrile (1.5 g, 6.8 mmol). The crude product was purified by chromatography on silica gel (0-5% (0.7 M Ammonia/MeOH)/DCM) to afford 1-(4-bromophenyl)-N-hydroxycyclopropane-1-carboximidamide (1.29 g, 4.30 mmol, 85% purity) as a pale orange solid. LCMS m/z 255.1/257.1 (M+H)$^+$ (ES$^+$). $^1$H NMR (400 MHz, DMSO-d6) δ 9.05 (s, 1H), 7.49-7.43 (m, 2H), 7.26-7.19 (m, 2H), 5.32 (s, br. 2H), 1.27-1.16 (m, 2H), 0.99-0.86 (m, 2H).

Step 2

Prepared according to General Procedure B, Method B from 1-(4-bromophenyl)-N-hydroxycyclopropane-1-carboximidamide (1.29 g, 4.30 mmol, 85% purity). The crude product was purified by chromatography on silica gel (0-100% MTBE/isohexane) to afford tert-butyl 3-(3-(1-(4-bromophenyl)cyclopropyl)-1,2,4-oxadiazol-5-yl)-2-(diethoxyphosphoryl)propanoate (1.80 g, 3.1 mmol, 90% purity) as a white solid. LCMS m/z 551.1/553.1 (M+Na)$^+$ (ES$^+$). $^1$H NMR (400 MHz, DMSO-d6) δ 7.59-7.48 (m, 2H), 7.40-7.25 (m, 2H), 4.15-3.97 (m, 4H), 3.60-3.43 (m, 1H), 3.32-3.26 (m, 1H), 3.25-3.11 (m, 1H), 1.53-1.31 (m, 13H), 1.25 (q, J=6.8 Hz, 6H).

Step 3

Prepared according to General Procedure A, Step 2, Method B from tert-butyl 3-(3-(1-(4-bromophenyl)cyclopropyl)-1,2,4-oxadiazol-5-yl)-2-(diethoxyphosphoryl)propanoate (1.80 g, 3.1 mmol, 90% purity). The crude product was purified by chromatography on silica gel (0-20% MTBE/isohexane) to afford tert-butyl 2-((3-(1-(4-bromophenyl)cyclopropyl)-1,2,4-oxadiazol-5-yl)methyl)acrylate (0.71 g, 1.7 mmol) as a clear and colourless oil. LCMS m/z 349.1/351.1 (M-tBu+H)$^+$ (ES$^+$). $^1$H NMR (400 MHz, DMSO-d6) δ 7.58-7.48 (m, 2H), 7.39-7.27 (m, 2H), 6.24-6.19 (m, 1H), 5.90-5.84 (m, 1H), 3.89 (s, 2H), 1.47-1.42 (m, 2H), 1.41-1.35 (m, 2H), 1.33 (s, 9H).

Step 4

Prepared according to General Procedure A, Step 3 from tert-butyl 2-((3-(1-(4-bromophenyl)cyclopropyl)-1,2,4-oxadiazol-5-yl)methyl)acrylate (0.71 g, 1.7 mmol). The crude product was purified by chromatography on silica gel (0-35% MTBE/isohexane), then further purified by preparative HPLC (Waters XSelect CSH C18 OBD prep column, 130A, 5 μm, 30 mm×100 mm column, 35-65% MeCN in Water 0.1% Formic Acid) to afford 2-((3-(1-(4-bromophenyl)cyclopropyl)-1,2,4-oxadiazol-5-yl)methyl)acrylic acid (0.447 g, 1.2 mmol) as a white solid. LCMS m/z 349.1/351.1 (M+H)+ (ES+). $^1$H NMR (400 MHz, DMSO-d6) δ 12.84 (s, 1H), 7.57-7.51 (m, 2H), 7.38-7.32 (m, 2H), 6.26 (d, J=1.2 Hz, 1H), 5.88 (q, J=1.3 Hz, 1H), 3.88 (d, J=1.0 Hz, 2H), 1.48-1.43 (m, 2H), 1.39-1.34 (m, 2H).

Intermediate 17—2-((3-(1-(4-(trifluoromethoxy)phenyl)cyclopropyl)-1,2,4-oxadiazol-5-yl)methyl)acrylic acid

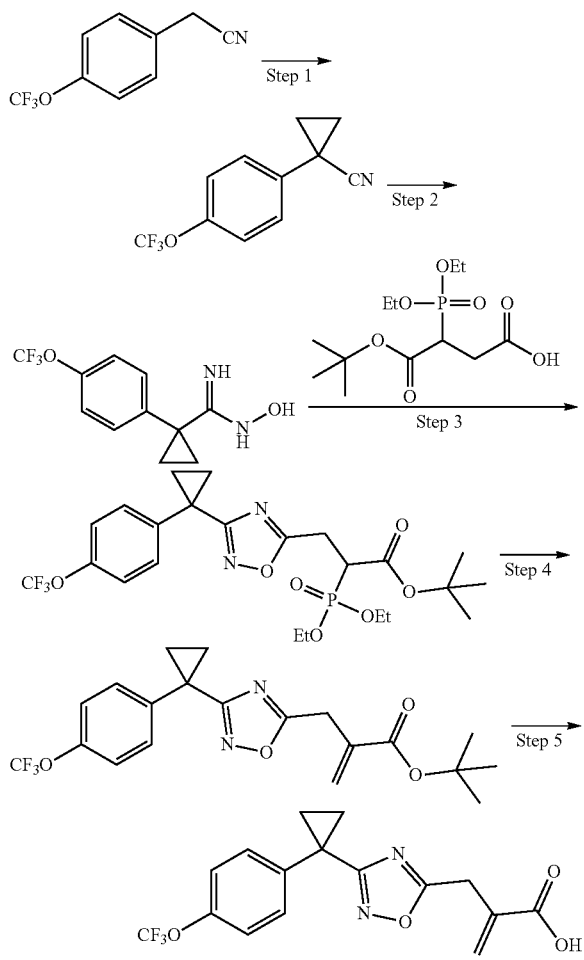

Step 1

A solution of NaOH (5.97 g, 149 mmol) in water (8 mL) was added dropwise to a mixture of 2-(4-(trifluoromethoxy)phenyl)acetonitrile (5.00 g, 25 mmol), 1-bromo-2-chloroethane (3.1 mL, 37.3 mmol) and benzyl(triethyl)ammonium chloride (113 mg, 0.5 mmol) at 50° C. The mixture was stirred at 50° C. for 16 h, then at RT for 3 days. The mixture was diluted with water (200 mL) and extracted with DCM (3×75 mL). The combined organic phases were washed with 1 M HCl (2×100 mL), water (100 mL), dried (MgSO4) and concentrated to afford 1-(4-(trifluoromethoxy)phenyl)cyclopropane-1-carbonitrile (5.42 g, 21 mmol, 86% purity) as an orange oil. $^1$H NMR (400 MHz, CDCl3) δ 7.38-7.33 (m, 2H), 7.25-7.18 (m, 2H), 1.84-1.70 (m, 2H), 1.51-1.36 (m, 2H).

Step 2

Prepared according to Intermediate 5, Step 1 from 1-(4-(trifluoromethoxy)phenyl)cyclopropane-1-carbonitrile (5.42 g, 21 mmol, 86% purity). The filtrate was concentrated in vacuo to afford N-hydroxy-1-(4-(trifluoromethoxy)phenyl)cyclopropane-1-carboximidamide (1.20 g, 3.8 mmol, 87%, 83% purity) as a colourless oil. LCMS m/z 255.1/257.1 (M+H)+ (ES+). $^1$H NMR (400 MHz, DMSO-d6) δ 9.05 (s, 1H), 7.49-7.43 (m, 2H), 7.26-7.19 (m, 2H), 5.32 (s, br. 2H), 1.27-1.16 (m, 2H), 0.99-0.86 (m, 2H).

Step 3

Prepared according to General Procedure B, Method B from N-hydroxy-1-(4-(trifluoromethoxy)phenyl)cyclopropane-1-carboximidamide (0.971 g, 3.25 mmol). The crude product was purified by chromatography on silica gel (0-100% MTBE/isohexane) to afford tert-butyl 2-(diethoxyphosphoryl)-3-(3-(1-(4-(trifluoromethoxy)phenyl)cyclopropyl)-1,2,4-oxadiazol-5-yl)propanoate (1.088 g, 1.6 mmol, 77% purity) as a brown oil. LCMS m/z 535.2 (M+H)+ (ES+).

Step 4

Prepared according to General Procedure A, Step 2, Method B from tert-butyl 2-(diethoxyphosphoryl)-3-(3-(1-(4-(trifluoromethoxy)phenyl)cyclopropyl)-1,2,4-oxadiazol-5-yl)propanoate (1.088 g, 1.6 mmol, 77% purity). The crude product was purified by chromatography on silica gel (0-50% MTBE/isohexane) to afford tert-butyl 2-((3-(1-(4-(trifluoromethoxy)phenyl)cyclopropyl)-1,2,4-oxadiazol-5-yl)methyl)acrylate (0.539 g, 1.3 mmol) as a colourless oil. LCMS m/z 355.1 (M-tBu+H)+ (ES+). $^1$H NMR (400 MHz, DMSO-d6) δ 7.51 (d, J=8.1 Hz, 2H), 7.34 (d, J=8.1 Hz, 2H), 6.21 (s, 1H), 5.89 (s, 1H), 3.90 (s, 2H), 1.59-1.23 (m, 13H).

Step 4

Prepared according to General Procedure A, Step 3 from tert-butyl 2-((3-(1-(4-(trifluoromethoxy)phenyl)cyclopropyl)-1,2,4-oxadiazol-5-yl)methyl)acrylate (0.539 g, 1.3 mmol). The crude product was purified by chromatography on silica gel (0-100% MTBE/isohexane) to afford 2-((3-(1-(4-(trifluoromethoxy)phenyl)cyclopropyl)-1,2,4-oxadiazol-5-yl)methyl)acrylic acid (371 mg, 1.0 mmol) as a colourless oil. LCMS m/z 355.1 (M+H)+ (ES+). H NMR (400 MHz, DMSO-d6) δ 12.95-12.70 (m, 1H), 7.61-7.45 (m, 2H), 7.42-7.26 (m, 2H), 6.27 (s, 1H), 5.91 (s, 1H), 3.89 (s, 2H), 1.52-1.35 (m, 4H).

Intermediate 18—2-((3-(4-(trifluoromethoxy)benzyl)-1,2,4-oxadiazol-5-yl)methyl)acrylic acid

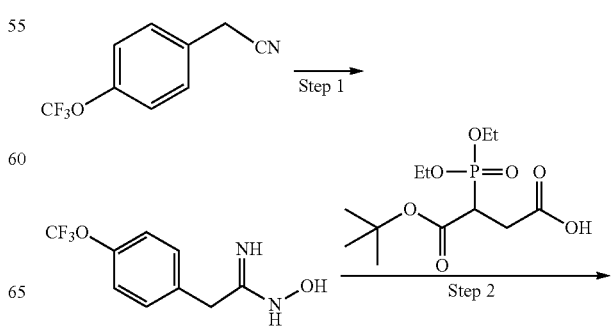

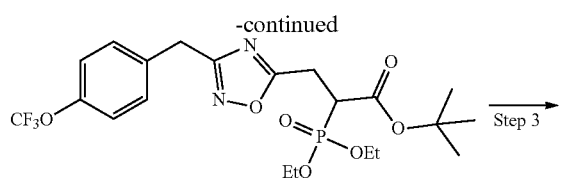

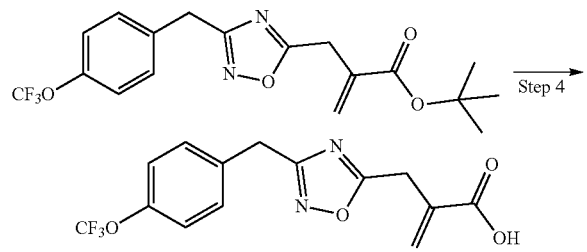

Step 1

Prepared according to Intermediate 5, Step 1 from 2-(4-(trifluoromethoxy)phenyl)acetonitrile (2.00 g, 9.94 mmol). The filtrate was concentrated in vacuo to afford N-hydroxy-2-(4-(trifluoromethoxy)phenyl)acetimidamide (2.201 g, 6.8 mmol, 72% purity) as a slightly black oil that solidified upon standing. LCMS m/z 235.1 (M+H)$^+$ (ES$^+$).

Step 2

Prepared according to General Procedure B, Method B from N-hydroxy-2-(4-(trifluoromethoxy)phenyl)acetimidamide (1.17 g, 3.6 mmol, 72% purity). The crude product was purified by chromatography on silica gel (0-100% MTBE/isohexane) to afford tert-butyl 2-(diethoxyphosphoryl)-3-(3-(4-(trifluoromethoxy)benzyl)-1,2,4-oxadiazol-5-yl)propanoate (1.25 g, 2.2 mmol, 90% purity) as a brown oil. LCMS m/z 531.2 (M+Na)$^+$ (ES$^+$). $^1$H NMR (400 MHz, DMSO-d6) δ 7.41 (d, J=9.0 Hz, 2H), 7.31 (d, J=8.1 Hz, 2H), 4.16-3.99 (m, 6H), 3.54 (ddd, J=23.4, 10.9, 4.5 Hz, 1H), 3.41-3.16 (m, 2H), 1.31-1.17 (m, 15H).

Step 3

Prepared according to General Procedure A, Step 2, Method B from tert-butyl 2-(diethoxyphosphoryl)-3-(3-(4-(trifluoromethoxy)benzyl)-1,2,4-oxadiazol-5-yl)propanoate (1.25 g, 2.2 mmol, 90% purity). The crude product was purified by chromatography on silica gel (0-50% MTBE/isohexane) to afford tert-butyl 2-((3-(4-(trifluoromethoxy)benzyl)-1,2,4-oxadiazol-5-yl)methyl)acrylate (0.605 g, 1.5 mmol) as a colourless oil. LCMS m/z 329.2 (M-tBu+H)$^+$ (ES$^+$). $^1$H NMR (400 MHz, DMSO-d6) δ 7.42 (d, J=8.6 Hz, 2H), 7.31 (d, J=8.2 Hz, 2H), 6.21 (s, 1H), 5.89 (s, 1H), 4.10 (s, 2H), 3.91 (s, 2H), 1.22 (s, 9H).

Step 4

Prepared according to General Procedure A, Step 3 from tert-butyl 2-((3-(4-(trifluoromethoxy)benzyl)-1,2,4-oxadiazol-5-yl)methyl)acrylate (0.605 g, 1.5 mmol). The crude product was purified by chromatography on silica gel (0-100% MTBE/isohexane) to afford 2-((3-(4-(trifluoromethoxy)benzyl)-1,2,4-oxadiazol-5-yl)methyl)acrylic acid (0.405 g, 1.2 mmol) as a colourless oil. LCMS m/z 329.1 (M+H)$^+$ (ES$^+$). $^1$H NMR (400 MHz, DMSO-d6) δ 12.81 (s, 1H), 7.41 (d, J=8.2 Hz, 2H), 7.32 (d, J=8.2 Hz, 2H), 6.27 (s, 1H), 5.91 (s, 1H), 4.12 (s, 2H), 3.91 (s, 2H).

Intermediates 6—4-methoxybenzyl (S)-4,4,4-trifluoro-3-hydroxybutanoate and Intermediate 7—4-methoxybenzyl (R)-4,4,4-trifluoro-3-hydroxybutanoate

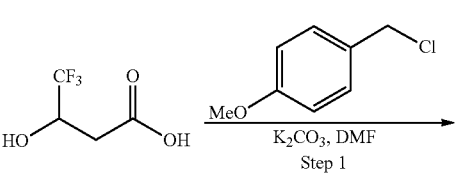

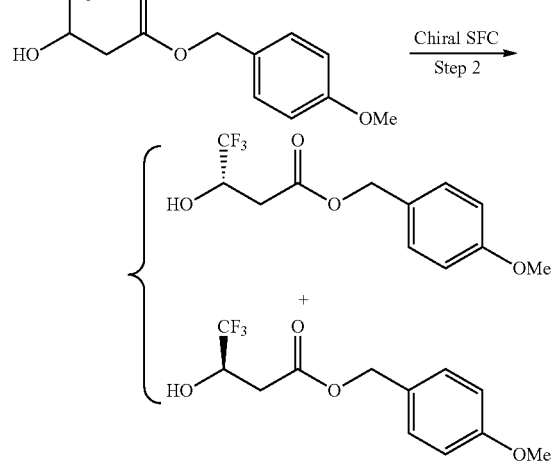

Step 1

To a mixture of 4,4,4-trifluoro-3-hydroxybutanoic acid (45 g, 285 mmol) and K$_2$CO$_3$ (39.3 g, 285 mmol) in DMF (1200 mL) was added PMBCl (44.5 g, 285 mmol) at 0° C., and the reaction mixture was stirred at room temperature overnight. The reaction mixture was quenched with water and extracted with EtOAc. The organic layers were washed with water and brine, dried over anhydrous Na$_2$SO$_4$ and filtered. The filtrate was concentrated under reduced pressure at 40° C. and the residue was purified by flash column chromatography (120 g SiO$_2$, 0-40% MTBE/petroleum ether) to give 4-methoxybenzyl 4,4,4-trifluoro-3-hydroxybutanoate (55 g, 198 mmol, 70%) as a white solid. LCMS (System 2, Method B) m/z 301.2 (M+Na)$^+$ (ES$^+$).

Step 2

4-Methoxybenzyl 4,4,4-trifluoro-3-hydroxybutanoate (55 g, 198 mmol) was resolved into separate enantiomers using chiral SFC (Column: CHIRALPAK AD-5 5 μm 30×250 mm; Column temperature: 35° C.; Flow rate: 45 mL/min; Solvent system: 20% IPA/CO$_2$; Collection wavelength: 215 nm). The collected fractions were concentrated under reduced pressure at 40° C. to give 4-methoxybenzyl (S)-4,4,4-trifluoro-3-hydroxybutanoate (21 g, 75.5 mmol, 38%) as the first eluting peak and 4-methoxybenzyl (R)-4,4,4-trifluoro-3-hydroxybutanoate (21 g, 75.5 mmol, 38%) as the second eluting peak. Both compounds were isolated as white solids.

Chiral SFC analysis (Column: CHIRALPAKAD-3 3 μm 4.6×100 mm; Column temperature: 35° C.; Flow rate: 2 mL/min; Solvent system: 20% (0.2% (7M NH$_3$/MeOH) in MeOH)/CO$_2$; Collection wavelength: 215 nm):

4-methoxybenzyl (S)-4,4,4-trifluoro-3-hydroxybutanoate Intermediate 6: Rt=0.943 min, 99.1% ee 4-methoxybenzyl (R)-4,4,4-trifluoro-3-hydroxybutanoate Intermediate 7: Rt=1.281 min, 99.4% ee Intermediate 8—2-(4-butylphenyl)acetonitrile

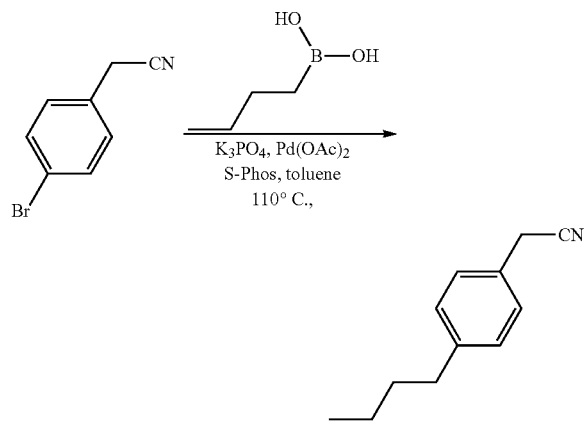

A mixture of 2-(4-bromophenyl)acetonitrile (15.0 g, 76.5 mmol), butylboronic acid (11.7 g, 114.8 mmol), palladium (II) acetate (1.71 g, 7.65 mmol), S-Phos (CAS: 657408-07-6) (6.27 g, 15.3 mmol) and potassium phosphate (32.4 g, 153.0 mmol) in toluene (250 mL) was stirred at 110° C. overnight. The mixture was cooled to room temperature, filtered and the filtrate was concentrated under reduced pressure at 40° C. The residue was purified by flash column chromatography (120 g silica, 0-20% EtOAc/petroleum ether) to give 2-(4-butylphenyl)acetonitrile (11.0 g, 63.5 mmol, 83%) as a colorless liquid. $^1$H NMR (400 MHz, CDCl$_3$) δ: 7.26-7.16 (m, 4H), 3.71 (s, 2H), 2.65-2.57 (m, 2H), 1.64-1.53 (m, 2H), 1.40-1.29 (m, 2H), 0.93 (t, J=7.3 Hz, 3H).

Intermediate 9—2-(4-pentylphenyl)acetonitrile

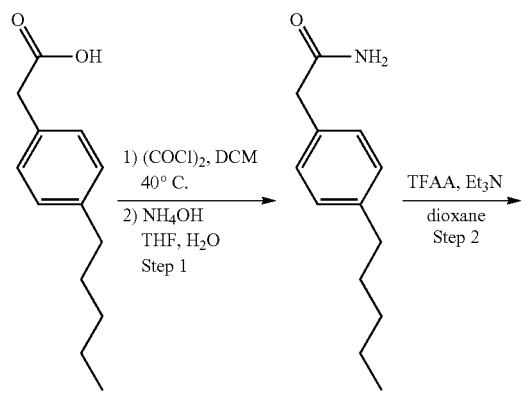

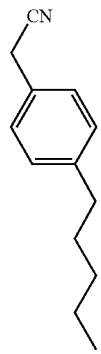

Step 1

To a solution of 2-(4-pentylphenyl)acetic acid (5.0 g, 24.2 mmol) in dry DCM (250 ml) was added oxalyl chloride (36.9 g, 291 mmol) at 0° C. The reaction was heated to reflux for 2 h and then cooled to room temperature. The solvent was removed under reduced pressure at 30° C. and the excess oxalyl chloride was co-evaporated with toluene (2×30 mL) under reduced pressure at 45° C. The residue was re-dissolved in THF (140 mL), cooled to 0° C. and aqueous ammonia (28 wt. %, 36.7 g, 315 mmol) was added dropwise over 10 min. The reaction was then allowed to warm to room temperature and stirred for an additional 2 h. The mixture was extracted with DCM (3×250 mL), and the combined organic layers were washed with brine, dried over Na$_2$SO$_4$, filtered and concentrated under reduced pressure at 30° C. The residue was purified by flash column chromatography (40 g SiO$_2$, 20-40% EtOAc/petroleum ether) to give 2-(4-pentylphenyl)acetamide (4.6 g, 22.4 mmol, 93%) as a yellow oil. LCMS (System 2, Method C) m/z 206.4 (M+H)$^+$ (ES$^+$).

Step 2

To an ice cold solution of 2-(4-pentylphenyl)acetamide (4.6 g, 22.4 mmol) and triethylamine (9.9 g, 89.6 mmol) in 1,4-dioxane (120 mL) was added TFAA (18.8 g, 89.6 mmol) dropwise over 10 min. The reaction mixture was allowed to warm to room temperature and was stirred overnight, then concentrated slightly and poured into water (100 mL) and extracted with EtOAc (3×50 mL). The combined organic layers were washed with brine (30 mL), dried over Na$_2$SO$_4$, filtered and the solvent was removed under reduced pressure. The crude product was purified by flash column chromatography (120 g SiO$_2$, 20-40% EtOAc/petroleum ether) to give 2-(4-pentylphenyl)acetonitrile (4.0 g, 21.4 mmol, 96%) as a yellow oil. LCMS (System 2, Method C) m/z 188.4 (M+H)$^+$ (ES$^+$).

Intermediate 10—2-((3-(4-butylbenzyl)-1,2,4-oxadiazol-5-yl)methyl)acrylic acid

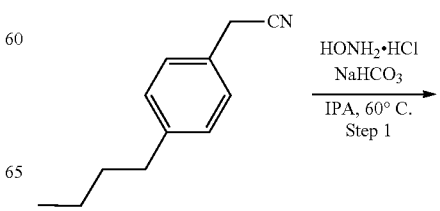

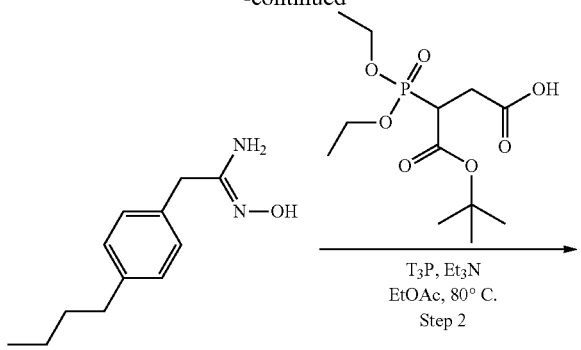

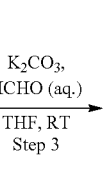

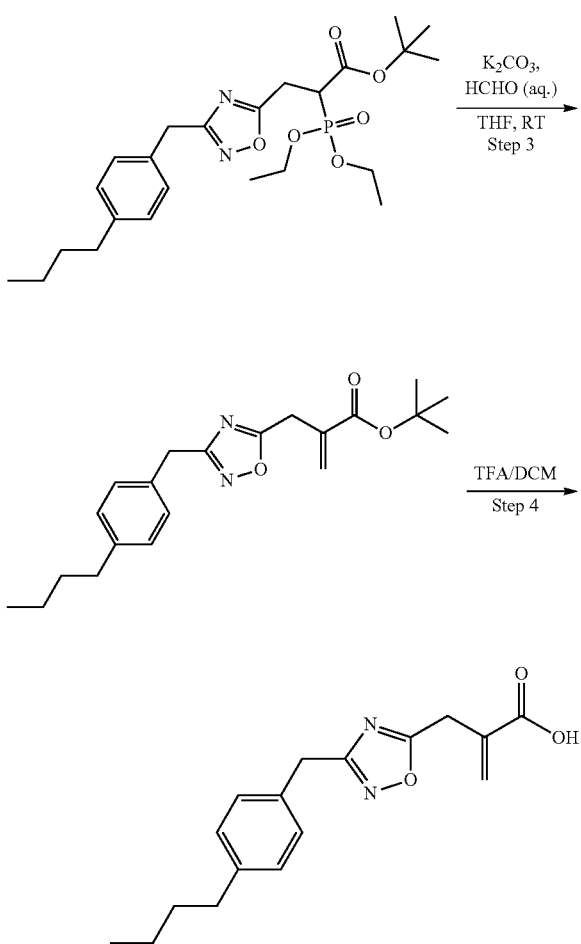

Step 1

A mixture of hydroxylamine hydrochloride (5.22 g, 75.0 mmol) and sodium bicarbonate (6.30 g, 75.0 mmol) in isopropyl alcohol (150 mL) was stirred at room temperature for 20 min, and then 2-(4-butylphenyl)acetonitrile (Intermediate 8, 10.00 g, 57.7 mmol) was added. The resulting suspension was stirred at 60° C. overnight, then cooled to room temperature, filtered and concentrated under reduced pressure at 40° C. The residue was dissolved in DCM (200 mL) and re-filtered. The filtrate was concentrated under reduced pressure at 40° C. to give crude 2-(4-butylphenyl)-N'-hydroxyacetimidamide (13.5 g, 65.4 mmol, >100%) as an off-white solid. The crude product was used directly in the next step. LCMS (System 2, Method C) m/z 207.4 $(M+H)^+$ $(ES^+)$.

Step 2

To a solution of 2-(4-butylphenyl)-N'-hydroxyacetimidamide (13.5 g, 65.4 mmol), 4-(tert-butoxy)-3-(diethoxyphosphoryl)-4-oxobutanoic acid (13.8 g, 44.5 mmol) and triethylamine (13.6 g, 133.5 mmol) in ethyl acetate (30 mL) at 0° C. was added propylphosphonic anhydride (T3P, CAS: 68957-94-8) solution in EtOAc (50 wt. %, 56.6 g, 89.0 mmol), and the mixture was stirred at 80° C. overnight. The mixture was quenched with dilute aqueous HCl (0.5 M, 60 mL), the phases were separated and the aqueous phase was extracted with ethyl acetate (2×100 mL). The combined organic layers were washed with $H_2O$ (2×30 mL) and brine, dried over $Na_2SO_4$, filtered and concentrated under reduced pressure at 30° C. The residue was purified by flash column chromatography (120 g $SiO_2$, 20-40% EtOAc/petroleum ether) to give tert-butyl 3-(3-(4-butylbenzyl)-1,2,4-oxadiazol-5-yl)-2-(diethoxyphosphoryl)propanoate (14.5 g, 30.2 mmol, 68%) as a colorless oil. LCMS (System 2, Method C) m/z 481.2 $(M+H)^+$ $(ES^+)$.

Step 3

To a mixture of tert-butyl 3-(3-(4-butylbenzyl)-1,2,4-oxadiazol-5-yl)-2-(diethoxyphosphoryl)propanoate (14.5 g, 30.2 mmol) and potassium carbonate (9.06 g, 60.3 mmol) in THF (100 mL) at room temperature was added formaldehyde solution in water (37 wt. %, 24.5 mL, 302 mmol), and the reaction mixture was stirred at room temperature for 4 h. The mixture was diluted with $H_2O$ (50 mL) and the phases were separated. The aqueous phase was extracted with MTBE (2×50 mL). The combined organic layers were washed with $H_2O$ (2×30 mL) and brine, dried over $Na_2SO_4$, filtered and concentrated under reduced pressure at 30° C. The residue was purified by flash column chromatography (120 g $SiO_2$, 0-20% MTBE/petroleum ether) to give tert-butyl 2-((3-(4-butylbenzyl)-1,2,4-oxadiazol-5-yl)methyl)acrylate (8.50 g, 23.8 mmol, 79%) as a colorless oil. LCMS (System 2, Method B) m/z 379.3 $(M+Na)^+$ $(ES^+)$.

Step 4

A solution of tert-butyl 2-((3-(4-butylbenzyl)-1,2,4-oxadiazol-5-yl)methyl)acrylate (8.50 g, 23.8 mmol) in TFA (20 mL) and DCM (60 mL) was stirred at room temperature overnight. The mixture was concentrated under reduced pressure at 30° C. and the residue was purified by reversed phase column chromatography (330 g C18 silica; flow rate: 60 mL/min; 60-80% MeCN/(10 mM formic acid/water); collection wavelength: 214 nm). The collected fractions were concentrated under reduced pressure at 30° C. to remove MeCN, and the residue was lyophilized to give 2-((3-(4-butylbenzyl)-1,2,4-oxadiazol-5-yl)methyl)acrylic acid (6.00 g, 20.0 mmol, 84%) as a white solid. LCMS (System 2, Method B) m/z 301.3 $(M+H)^+$ $(ES^+)$. $^1$H NMR (400 MHz, DMSO-d6) δ: 12.80 (br, 1H), 7.14 (q, J=8.2 Hz, 4H), 6.26 (s, 1H), 5.90 (d, J=1.4 Hz, 1H), 3.99 (s, 2H), 3.90 (s, 2H), 2.54 (d, J=7.6 Hz, 2H), 1.57-1.46 (m, 2H), 1.34-1.22 (m, 2H), 0.88 (t, J=7.3 Hz, 3H).

The following compounds were prepared using a similar procedure as used to synthesise Intermediate 10:

| Int. No. | Starting material/Structure/Name | LCMS data |
|---|---|---|
| 11 | Intermediate 9 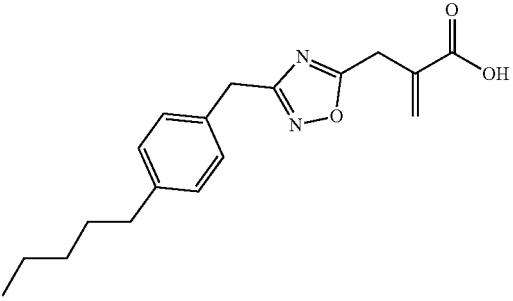 2-((3-(4-pentylbenzyl)-1,2,4-oxadiazol-5-yl)methyl)acrylic acid | LCMS (System 2, Method C) m/z 479.1 (M + H)⁺ ES⁺). |

Intermediate 12—2-(2-(4-methoxybenzyl)-2H-tetrazol-5-yl)ethan-1-ol and Intermediate 13—2-(1-(4-methoxybenzyl)-1H-tetrazol-5-yl)ethan-1-ol Intermediate 14—(2-(4-methoxybenzyl)-2H-tetrazol-5-yl)methanol

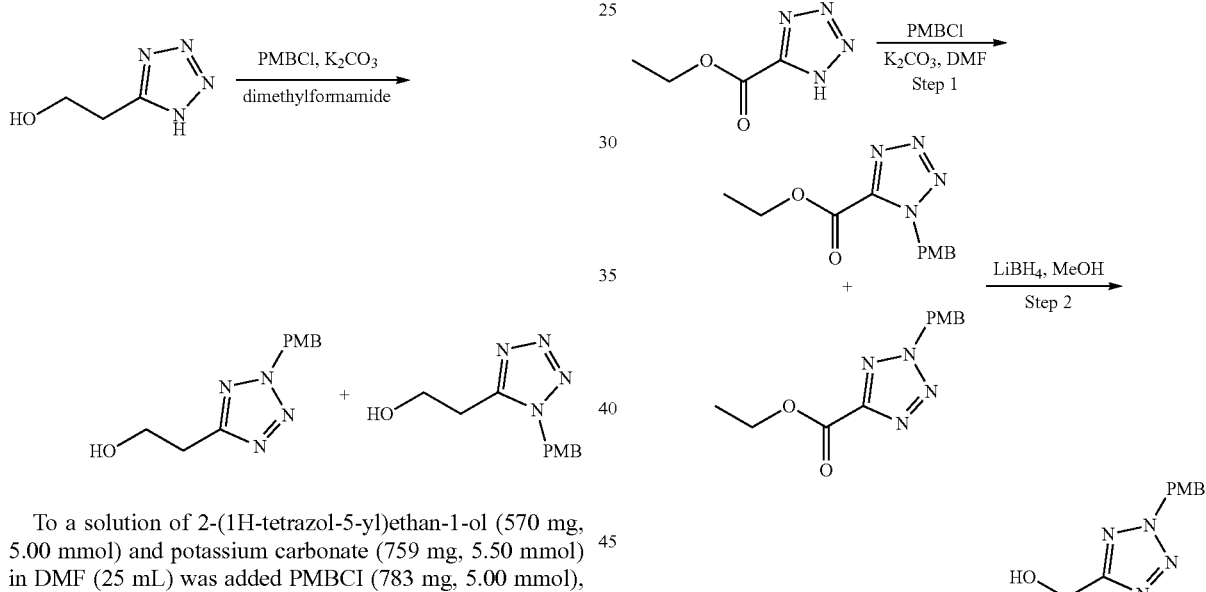

To a solution of 2-(1H-tetrazol-5-yl)ethan-1-ol (570 mg, 5.00 mmol) and potassium carbonate (759 mg, 5.50 mmol) in DMF (25 mL) was added PMBCl (783 mg, 5.00 mmol), and the mixture was allowed to stir at room temperature overnight. The mixture was then quenched with water (20 mL) and extracted with EtOAc (3×20 mL). The separated organic phases were washed with brine, dried over Na₂SO₄ and filtered. The filtrate was concentrated under reduced pressure at 40° C., and the residue was purified by flash column chromatography (25 g SiO₂, 0-70% EtOAc/petroleum ether) to give 2-(2-(4-methoxybenzyl)-2H-tetrazol-5-yl)ethan-1-ol (300 mg, 1.28 mmol, 25%) as yellow oil and 2-(1-(4-methoxybenzyl)-1H-tetrazol-5-yl)ethan-1-ol (320 mg, 1.37 mmol, 27%) as a yellow oil.

2-(2-(4-methoxybenzyl)-2H-tetrazol-5-yl)ethan-1-ol: ¹H NMR (400 MHz, CDCl₃) δ: 7.38-7.29 (m, 2H), 6.93-6.85 (m, 2H), 5.66 (s, 2H), 4.02 (t, J=6.1 Hz, 2H), 3.80 (s, 3H), 3.11 (t, J=5.9 Hz, 2H), 2.44 (br, 1H).

2-(1-(4-methoxybenzyl)-1H-tetrazol-5-yl)ethan-1-ol: ¹H NMR (400 MHz, CDCl₃) δ: 7.21-7.13 (m, 2H), 6.92-6.84 (m, 2H), 5.48 (s, 2H), 4.07-4.00 (m, 2H), 3.80 (s, 3H), 2.92 (t, J=5.6 Hz, 2H), 2.77 (br, 1H).

Step 1

A mixture of ethyl 1H-tetrazole-5-carboxylate (4.6 g, 32.4 mmol), PMBCl (5.1 g, 32.4 mmol) and potassium carbonate (4.5 g, 32.4 mmol) in DMF (50 mL) was stirred at room temperature overnight. The reaction mixture was diluted with H₂O (150 mL) and extracted with EtOAc (3×50 mL). The combined organic layers were dried over Na₂SO₄, filtered and the filtrate was concentrated under reduced pressure at 40° C. The residue was purified by flash column chromatography (120 g SiO₂, 0-40% EtOAc/petroleum ether) to give ethyl 2-(4-methoxybenzyl)-2H-tetrazole-5-carboxylate (2.1 g, 8.0 mmol, 25%) as a white solid and crude ethyl 1-(4-methoxybenzyl)-1H-tetrazole-5-carboxylate (2.2 g, 8.4 mmol, 26%) as a white solid which could not be obtained pure from contamination with ethyl 2-(4-methoxybenzyl)-2H-tetrazole-5-carboxylate.

ethyl 2-(4-methoxybenzyl)-2H-tetrazole-5-carboxylate: LCMS (System 2, Method B) m/z 285.3 (M+Na)⁺, 547.3

(2M+Na)⁺ (ES⁺). ¹H NMR (400 MHz, DMSO-d6) δ: 7.42-7.34 (m, 2H), 7.00-6.92 (m, 2H), 5.95 (s, 2H), 4.39 (q, J=7.1 Hz, 2H), 3.74 (s, 3H), 1.32 (t, J=7.1 Hz, 3H).

Step 2

To a solution of ethyl 2-(4-methoxybenzyl)-2H-tetrazole-5-carboxylate (1.4 g, 5.35 mmol) in methanol (40 mL) at 0° C. was added lithium borohydride solution in THF (2 M, 5.35 mL, 10.68 mmol) and the reaction mixture was stirred at 0° C. for 1 h. The reaction mixture was quenched with dilute aqueous HCl (0.5 M, 20 mL) and concentrated under reduced pressure at 35° C. to remove methanol. The aqueous residue was extracted with EtOAc (2×20 mL) and the phases were separated. The combined organic layers were dried over Na₂SO₄, filtered and the filtrate was concentrated under reduced pressure. The residue was purified by flash column chromatography (120 g SiO₂, 0-60% EtOAc/petroleum ether) to give (2-(4-methoxybenzyl)-2H-tetrazol-5-yl)methanol (800 mg, 3.63 mmol, 68%) as a yellow oil. LCMS (System 2, Method B) m/z 243.2 (M+Na)⁺ (ES⁺). ¹H NMR (400 MHz, DMSO-d6) δ: 7.38-7.30 (m, 2H), 6.98-6.90 (m, 2H), 5.81 (s, 2H), 5.58 (br, 1H), 4.63 (s, 2H), 3.74 (s, 3H).

Intermediate 15—4-methoxybenzyl 4,4,4-trifluoro-3-hydroxy-2,2-dimethylbutanoate

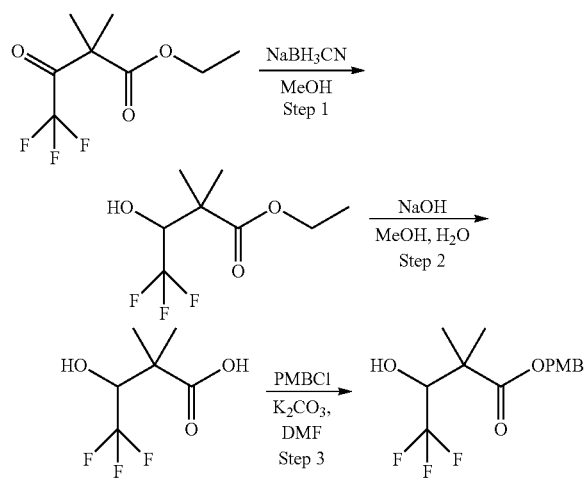

Step 1

To a solution of ethyl 4,4,4-trifluoro-2,2-dimethyl-3-oxobutanoate (1.00 g, 4.71 mmol) in MeOH (24 mL) at 0° C. was added sodium cyanoborohydride (961 mg, 14.13 mmol), and the mixture was allowed to stir at room temperature for 16 h. The mixture was concentrated under reduced pressure to remove MeOH, and the residue was quenched with H₂O (20 mL) and extracted with EtOAc (2×20 mL). The combined organic phases were washed with brine, dried over Na₂SO₄ and filtered. The filtrate was concentrated under reduced pressure at 30° C. to give ethyl 4,4,4-trifluoro-3-hydroxy-2,2-dimethylbutanoate (1.00 g, 4.67 mmol, 99%) as a yellow oil, which was used directly in the next step. ¹H NMR (400 MHz, DMSO-d6) δ: 6.67 (d, J=7.4 Hz, 1H), 4.28-4.17 (m, 1H), 4.08 (q, J=7.1 Hz, 2H), 1.20-1.17 (m, 6H), 1.12-1.09 (m, 3H).

Step 2

A mixture of ethyl 4,4,4-trifluoro-3-hydroxy-2,2-dimethylbutanoate (1.00 g, 4.67 mmol) and NaOH (560 mg, 14.01 mmol) in MeOH (25 mL) and H₂O (25 mL) was stirred at room temperature for 16 h. The mixture was concentrated under reduced pressure at 35° C., the residue was adjusted to pH=5 with dilute aqueous HCl (0.5 M) and the mixture was then extracted with EtOAc (2×30 mL). The combined organic layers were washed with brine, dried over Na₂SO₄ and filtered. The filtrate was concentrated under reduced pressure at 30° C. to give 4,4,4-trifluoro-3-hydroxy-2,2-dimethylbutanoic acid (800 mg, 4.30 mmol, 92%) as a yellow oil, which was used directly in the next step. ¹H NMR (400 MHz, DMSO-d6) δ: 12.38 (br, 1H), 6.57 (d, J=7.4 Hz, 1H), 4.28-4.18 (m, 1H), 1.16 (s, 3H), 1.08 (d, J=1.7 Hz, 3H).

Step 3

To a mixture of 4,4,4-trifluoro-3-hydroxy-2,2-dimethylbutanoic acid (800 mg, 4.30 mmol) and K₂CO₃ (890 mg, 6.45 mmol) in DMF (25 mL) at 0° C. was added PMBCl (808 mg, 5.16 mmol), and the reaction mixture was stirred at room temperature for 16 h. The reaction mixture was quenched with water and extracted with EtOAc. The organic layers were separated and washed with water and aqueous NH₄Cl solution, then dried over Na₂SO₄ and filtered. The filtrate was concentrated under reduced pressure at 30° C., and the residue was purified by flash column chromatography (25 g SiO₂, 0-40% MTBE/petroleum ether) to give 4-methoxybenzyl 4,4,4-trifluoro-3-hydroxy-2,2-dimethylbutanoate (800 mg, 2.61 mmol, 60%) as a yellow oil. LCMS (System 2, Method C) m/z 329.2 (M+Na)⁺ (ES⁺).

Intermediate 21—2-((3-(1-(4-((trifluoromethyl)thio)phenyl)cyclopropyl)-1,2,4-oxadiazol-5-yl)methyl)acrylic acid

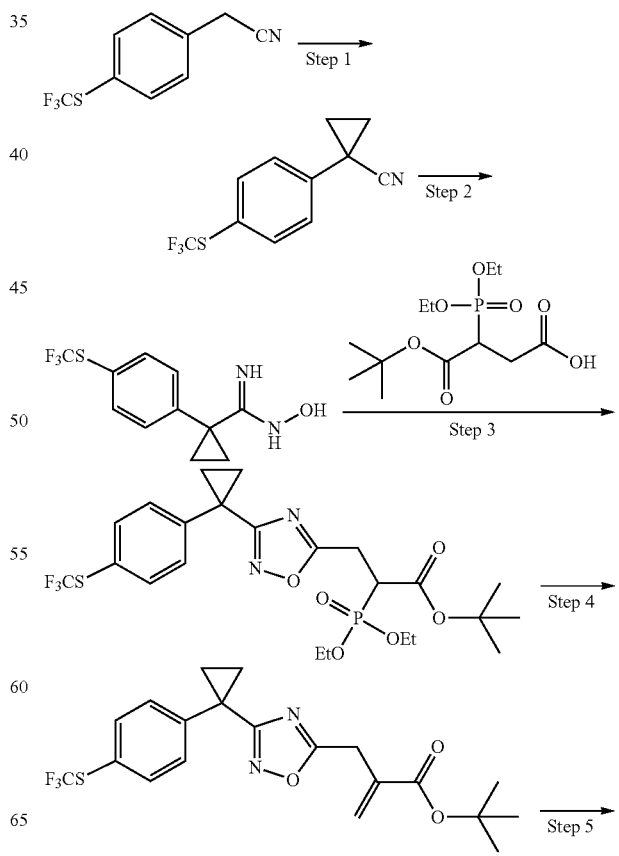

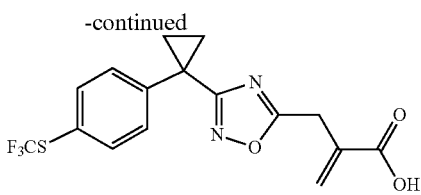

Step 1

Prepared according to Intermediate 17, Step 1 from 2-(4-((trifluoromethyl)thio)phenyl)acetonitrile (2.50 g, 12.0 mmol) to afford 1-(4-((trifluoromethyl)thio)phenyl)cyclopropane-1-carbonitrile (2.51 g, 10.2 mmol, 85%) as an orange oil. $^1$H NMR (400 MHz, DMSO-d6) δ 7.84-7.66 (m, 2H), 7.59-7.39 (m, 2H), 1.92-1.78 (m, 2H), 1.69-1.55 (m, 2H).

Step 2

Prepared according to Intermediate 5, Step 1 from 1-(4-((trifluoromethyl)thio)phenyl)cyclopropane-1-carbonitrile (2.51 g, 10.2 mmol). The filtrate was concentrated in vacuo to afford N-hydroxy-1-(4-((trifluoromethyl)thio)phenyl)cyclopropane-1-carboximidamide (2.82 g, 9.90 mmol, 97%) as a colourless oil. LCMS m/z 277.0 (M+H)$^+$ (ES$^+$). $^1$H NMR (400 MHz, DMSO-d6) δ 9.09 (s, 1H), 7.68-7.59 (m, 2H), 7.51-7.37 (m, 2H), 5.42 (s, 2H), 1.38-1.24 (m, 2H), 1.10-0.98 (m, 2H).

Step 3

Prepared according to General Procedure B, Method B, Intermediate 5, Step 2 from N-hydroxy-1-(4-((trifluoromethyl)thio)phenyl)cyclopropane-1-carboximidamide (2.82 g, 9.90 mmol). The crude product was purified by chromatography on silica gel (0-100% EtOAc/isohexane) to afford tert-butyl 2-(diethoxyphosphoryl)-3-(3-(1-(4-((trifluoromethyl)thio)phenyl)cyclopropyl)-1,2,4-oxadiazol-5-yl)propanoate (3.04 g, 5.41 mmol, 55%) as a light yellow oil. LCMS m/z 551.1 (M+H)+(ES$^+$). $^1$H NMR (400 MHz, DMSO-d6) δ 7.72-7.64 (m, 2H), 7.56-7.48 (m, 2H), 4.14-3.98 (m, 4H), 3.53 (ddd, J=23.4, 10.9, 4.4 Hz, 1H), 3.37-3.27 (m, 1H), 3.21 (ddd, J=16.9, 8.9, 4.4 Hz, 1H), 1.54-1.43 (m, 4H), 1.35 (s, 9H), 1.24 (d, J=7.0 Hz, 6H).

Step 4

Prepared according to General Procedure A, Step 2, Method B from tert-butyl 2-(diethoxyphosphoryl)-3-(3-(1-(4-((trifluoromethyl)thio)phenyl)cyclopropyl)-1,2,4-oxadiazol-5-yl)propanoate (3.04 g, 5.41 mmol). The crude product was purified by chromatography on silica gel (0-50% EtOAc/isohexane) to afford tert-butyl 2-((3-(1-(4-((trifluoromethyl)thio)phenyl)cyclopropyl)-1,2,4-oxadiazol-5-yl)methyl)acrylate (1.03 g, 2.39 mmol, 44%) as a clear colourless gum. LCMS m/z 371.1 (M-tBu+H)$^+$ (ES$^+$). $^1$H NMR (400 MHz, DMSO-d6) δ 7.72-7.65 (m, 2H), 7.58-7.49 (m, 2H), 6.23-6.19 (m, 1H), 5.91-5.86 (m, 1H), 3.90 (s, 2H), 1.52-1.40 (m, 4H), 1.33 (s, 9H).

Step 5

Prepared according to General Procedure A, Step 3 from tert-butyl 2-((3-(1-(4-((trifluoromethyl)thio)phenyl)cyclopropyl)-1,2,4-oxadiazol-5-yl)methyl)acrylate (1.03 g, 2.39 mmol). The crude product was purified by chromatography on silica gel (0-50% EtOAc/isohexane) to afford 2-((3-(1-(4-((trifluoromethyl)thio)phenyl)cyclopropyl)-1,2,4-oxadiazol-5-yl)methyl)acrylic acid (815 mg, 2.2 mmol, 92%) as a colourless gum. LCMS m/z 371.0 (M+H)$^+$ (ES$^+$). $^1$H NMR (400 MHz, DMSO-d6) δ 12.84 (s, 1H), 7.72-7.65 (m, 2H), 7.57-7.50 (m, 2H), 6.26 (d, J=1.2 Hz, 1H), 5.89 (d, J=1.3 Hz, 1H), 3.89 (s, 2H), 1.50 (td, J=5.7, 2.1 Hz, 2H), 1.44 (td, J=5.7, 2.0 Hz, 2H). $^{19}$F NMR (376 MHz, DMSO-d6) 5-42.00.

Example 1—2-((2-((3-octyl-1,2,4-oxadiazol-5-yl)methyl)acryloyl)oxy)acetic acid

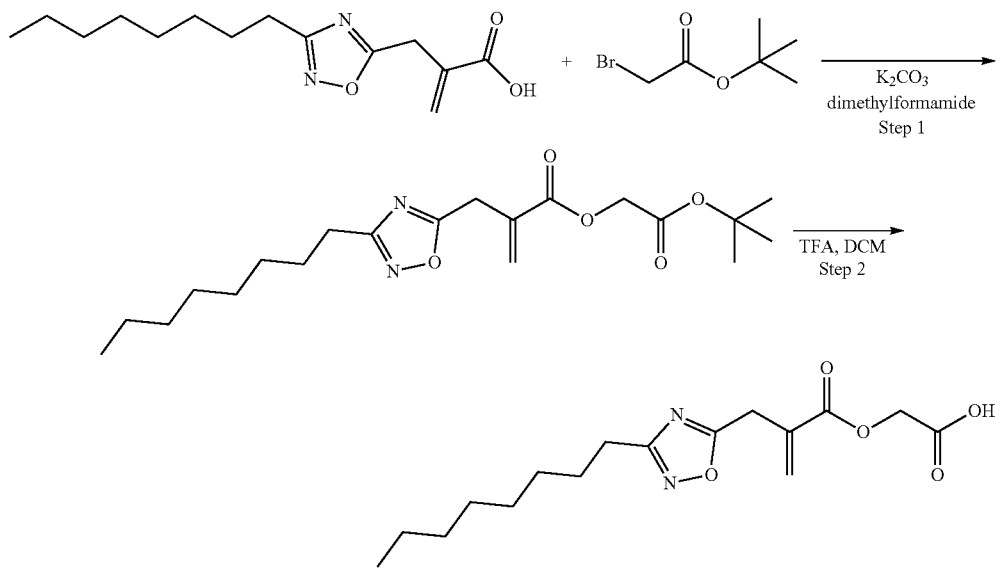

Step 1

Tert-butyl bromoacetate (2.0 mL, 13.5 mmol) in DMF (2 mL) was added to a stirred solution of 2-((3-octyl-1,2,4-oxadiazol-5-yl)methyl)acrylic acid (Intermediate 3, 3.00 g, 11.3 mmol) and potassium carbonate (1.87 g, 13.5 mmol) in DMF (20 mL). The mixture was stirred at RT for 18 h, then diluted with EtOAc (100 mL) and washed with water (100 mL) and brine (100 mL). The organic phase was dried (phase separator) and concentrated. The crude product was purified by chromatography on RP Flash C18 (0-100% (0.1% Formic acid in MeCN)/(0.1% Formic Acid in Water)) to afford 2-(tert-butoxy)-2-oxoethyl 2-((3-octyl-1,2,4-oxadiazol-5-yl)methyl)acrylate (3.60 g, 9.4 mmol) as a clear yellow oil. LCMS m/z 325.5 (M-tBu+H)⁺ (ES⁺). ¹H NMR (400 MHz, DMSO-d6) δ 6.42 (d, J=0.8 Hz, 1H), 6.10 (d, J=1.0 Hz, 1H), 4.61 (s, 2H), 3.99 (s, 1H), 2.64 (t, J=7.4 Hz, 2H), 1.69-1.59 (m, 3H), 1.40 (s, 9H), 1.33-1.19 (m, 10H), 0.91-0.80 (m, 3H).

Step 2

Trifluoroacetic acid (7.3 mL, 95 mmol) was added to a solution of 2-(tert-butoxy)-2-oxoethyl 2-((3-octyl-1,2,4-oxadiazol-5-yl)methyl)acrylate (3.60 g, 9.4 mmol) in DCM (20 mL). The mixture was stirred at RT for 20 h, then concentrated. The residue was co-evaporated with toluene (2×10 mL). The crude product was purified by chromatography on silica gel (0-100% EtOAc/isohexane) to afford 2-((2-((3-octyl-1,2,4-oxadiazol-5-yl)methyl)acryloyl)oxy)acetic acid (2.90 g, 8.9 mmol) as a clear colourless oil. LCMS m/z 325.1 (M+H)⁺ (ES⁺). ¹H NMR (400 MHz, DMSO-d6) δ 13.11 (s, 1H), 6.41 (s, 1H), 6.07 (d, J=1.1 Hz, 1H), 4.64 (s, 2H), 3.99 (s, 1H), 2.64 (t, J=7.5 Hz, 2H), 1.70-1.56 (m, 2H), 1.34-1.20 (m, 10H), 0.92-0.77 (m, 3H).

Example 2—2-((2-((3-octyl-1,2,4-oxadiazol-5-yl)methyl)acryloyl)oxy)propanoic acid colourless oil. LCMS m/z 417.3 (M+Na)⁺ (ES⁺). ¹H NMR (400 MHz, DMSO-d6) δ 6.29 (s, 1H), 6.00 (s, 1H), 4.24 (t, J=6.0 Hz, 2H), 3.94 (s, 2H), 2.64 (t, J=7.4 Hz, 2H), 2.54 (t, J=6.0 Hz, 2H), 1.62 (t, J=7.3 Hz, 2H), 1.39 (s, 9H), 1.32-1.19 (m, 10H), 0.86 (t, J=6.6 Hz, 3H).

Step 2

Trifluoroacetic acid (0.9 mL, 12 mmol) was added to a solution of 3-(tert-butoxy)-3-oxopropyl 2-((3-octyl-1,2,4-oxadiazol-5-yl)methyl)acrylate (0.131 g, 0.33 mmol) in DCM (1 mL) at RT. The mixture was stirred at RT for 2 h, then concentrated. The residue was co-evaporated with toluene (2×10 mL). The crude product was purified by chromatography on silica gel (0-50% EtOAc/isohexane) to afford 3-((2-((3-octyl-1,2,4-oxadiazol-5-yl)methyl)acryloyl)oxy)propanoic acid (0.083 g, 0.24 mmol) as a clear colourless oil. LCMS m/z 339.3 (M+H)⁺ (ES⁺). ¹H NMR (400 MHz, DMSO-d6) δ 12.38 (s, 1H), 6.29 (s, 1H), 5.99 (s, 1H), 4.24 (t, J=6.2 Hz, 2H), 3.94 (s, 2H), 2.64 (t, J=7.4 Hz, 2H), 2.56 (t, J=6.2 Hz, 2H), 1.68-1.56 (m, 2H), 1.33-1.18 (m, 10H), 0.86 (t, J=6.6 Hz, 3H).

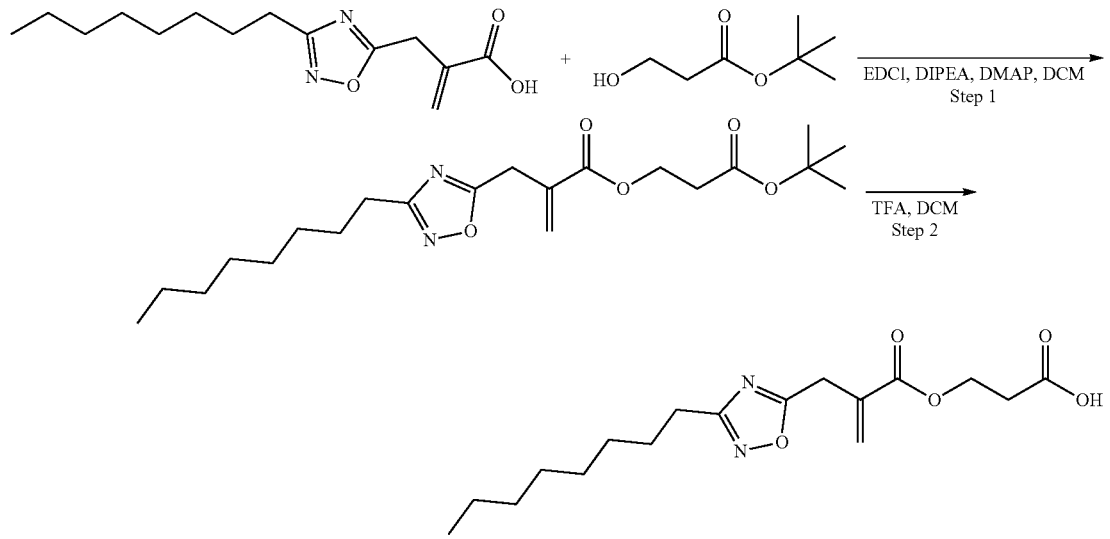

A slurry of EDCI (216 mg, 1.13 mmol) in DCM (2.5 mL) was added dropwise to a solution of 2-((3-octyl-1,2,4-oxadiazol-5-yl)methyl)acrylic acid (Intermediate 3, 0.250 g, 0.94 mmol), tert-butyl 3-hydroxypropanoate (0.17 mL, 1.13 mmol), DMAP (12 mg, 0.094 mmol) and DIPEA (0.20 mL, 1.13 mmol) in DCM (2.5 mL) at 0° C. The mixture was allowed to warm to RT slowly and stirred for 16 h. The mixture was poured into 1 M HCl (25 mL) and extracted with EtOAc (3×25 mL). The combined organic layers were washed with water (25 mL), brine (25 mL), dried (Na₂SO₄) and concentrated. The crude product was purified by chromatography on silica gel (0-20% EtOAc/isohexane) to afford 3-(tert-butoxy)-3-oxopropyl 2-((3-octyl-1,2,4-oxadiazol-5-yl)methyl)acrylate (0.131 g, 0.33 mmol) as a clear Example 3—2-((2-((3-(4-chlorobenzyl)-1,2,4-oxadiazol-5-yl)methyl)acryloyl)oxy)acetic acid

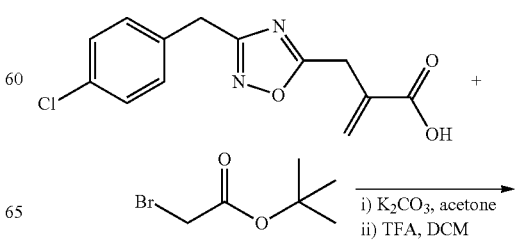

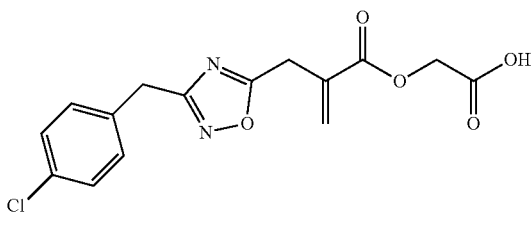

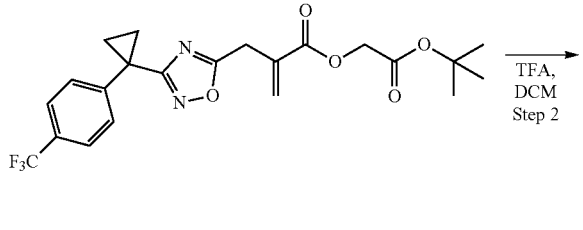

Tert-butyl bromoacetate (0.11 mL, 0.75 mmol) was added to a suspension of 2-((3-(4-chlorobenzyl)-1,2,4-oxadiazol-5-yl)methyl)acrylic acid (Intermediate 4, 0.20 g, 0.72 mmol) and potassium carbonate (0.15 g, 1.1 mmol) in acetone (15 mL). The mixture was stirred for 3 h then partitioned between EtOAc (50 mL) and water (100 mL). The phases were separated and the organic phase was extracted with EtOAc (2×25 mL). The combined organic phases were washed with brine (100 mL), dried (MgSO$_4$) and concentrated. The residue was taken up in DCM (3 mL) and trifluoroacetic acid (1 mL, 0.01 mol) was added. The mixture was stirred at RT for 3 h, then concentrated. The crude product was purified by chromatography on silica gel (0-60% EtOAc/isohexane) to afford 2-((2-((3-(4-chlorobenzyl)-1,2,4-oxadiazol-5-yl)methyl)acryloyl)oxy)acetic acid (32 mg, 94 µmol) as a colourless gum. LCMS m/z 337.2/339.2 (M+H)$^+$ (ES$^+$). $^1$H NMR (400 MHz, DMSO-d6) δ 13.13 (s, 1H), 7.39 (d, J=8.5 Hz, 2H), 7.31 (d, J=8.5 Hz, 2H), 6.41 (s, 1H), 6.07 (d, J=1.2 Hz, 1H), 4.63 (s, 2H), 4.07 (s, 2H), 3.99 (s, 2H).

Example 4—2-((2-((3-(1-(4-(trifluoromethyl)phenyl)cyclopropyl)-1,2,4-oxadiazol-5-yl)methyl)acryloyl)oxy)acetic acid

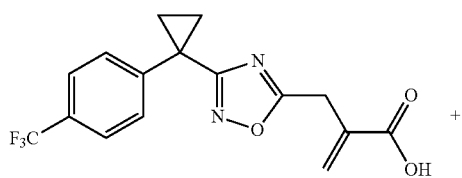

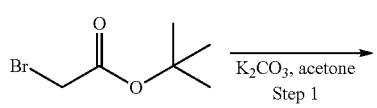

Step 1

Tert-butyl bromoacetate (0.2 mL, 1.35 mmol) was added dropwise to a suspension of 2-((3-(1-(4-(trifluoromethyl)phenyl)cyclopropyl)-1,2,4-oxadiazol-5-yl)methyl)acrylic acid (Intermediate 5, 0.433 g, 1.28 mmol) and potassium carbonate (265 mg, 1.92 mmol) in acetone (25 mL) at RT. The mixture was stirred at RT for 16 h, then diluted with water (50 mL) and extracted with EtOAc (3×20 mL). The combined organic layers were washed with brine (30 mL), dried (Na$_2$SO$_4$) and concentrated. The crude product was purified by chromatography on silica gel (0-50% EtOAc/isohexane) to afford 2-(tert-butoxy)-2-oxoethyl 2-((3-(1-(4-(trifluoromethyl)phenyl)cyclopropyl)-1,2,4-oxadiazol-5-yl)methyl)acrylate (0.382 g, 0.84 mmol) as a white solid. LCMS m/z 397.1 (M-tBu+H)$^+$ (ES$^+$). $^1$H NMR (500 MHz, DMSO-d6) δ 7.74-7.67 (m, 2H), 7.63-7.57 (m, 2H), 6.41 (d, J=0.8 Hz, 1H), 6.11-6.07 (m, 1H), 4.62 (s, 2H), 3.98 (s, 2H), 1.56-1.51 (m, 2H), 1.47-1.43 (m, 2H), 1.40 (s, 9H).

Step 2

Trifluoroacetic acid (2.3 mL, 30 mmol) was added to a solution of 2-(tert-butoxy)-2-oxoethyl 2-((3-(1-(4-(trifluoromethyl)phenyl)cyclopropyl)-1,2,4-oxadiazol-5-yl)methyl)acrylate (0.382 g, 0.84 mmol) in DCM (2.3 mL) at RT. The mixture was stirred for 2 h, then concentrated. The residue was co-evaporated with toluene (2×10 mL). The crude product was purified by chromatography on silica gel (0-100% EtOAc/isohexane) to afford 2-((2-((3-(1-(4-(trifluoromethyl)phenyl)cyclopropyl)-1,2,4-oxadiazol-5-yl)methyl)acryloyl)oxy)acetic acid (0.239 g, 0.60 mmol) as a colourless gum. LCMS m/z 397.1 (M+H)$^+$ (ES$^+$). $^1$H NMR (400 MHz, DMSO-d6) δ 13.11 (s, 1H), 7.71 (d, J=8.2 Hz, 2H), 7.65-7.56 (m, 2H), 6.41 (d, J=0.8 Hz, 1H), 6.08 (d, J=1.0 Hz, 1H), 4.65 (s, 2H), 3.98 (s, 2H), 1.57-1.50 (m, 2H), 1.49-1.42 (m, 2H).

The following compounds were synthesised using the same procedure.

| Example Number | Structure/Name | Characterising data |
|---|---|---|
| 18 | From Intermediate 16<br><br>2-((2-((3-(1-(4-bromophenyl)cyclopropyl)-1,2,4-oxadiazol-5-yl)methyl)acryloyl)oxy)acetic acid | LCMS m/z 408.3 (M + H)+ ES+).<br>$^1$H NMR (400 MHz, DMSO-d6) δ 13.09 (s, 1H), 7.55-7.49 (m, 2H), 7.37-7.30 (m, 2H), 6.39 (s, 1H), 6.06 (s, 1H), 4.64 (s, 2H), 3.96 (s, 2H), 1.51-1.44 (m, 2H), 1.39-1.32 (m, 2H) |
| 19 | From Intermediate 17<br><br>2-((2-((3-(1-(4-(trifluoromethoxy)phenyl)cyclopropyl)-1,2,4-oxadiazol-5-yl)methyl)acryloyl)oxy)acetic acid | LCMS m/z 413.3 (M + H)+ ES+).<br>$^1$H NMR (400 MHz, DMSO-d6) δ 13.13 (s, 1H), 7.55-7.48 (m, 2H), 7.38-7.29 (m, 2H), 6.40 (s, 1H), 6.07 (s, 1H), 4.65 (s, 2H), 3.97 (s, 2H), 1.55-1.46 (m, 2H), 1.44-1.35 (m, 2H) |
| 20 | From Intermediate 18<br><br>2-((2-((3-(4-(trifluoromethoxy)benzyl)-1,2,4-oxadiazol-5-yl)methyl)acryloyl)oxy)acetic acid | LCMS m/z 387.0 (M + H)+ ES+).<br>$^1$H NMR (400 MHz, DMSO-d6) δ 13.09 (s, 1H), 7.46-7.39 (m, 2H), 7.37-7.28 (m, 2H), 6.41 (s, 1H), 6.08 (d, J = 1.0 Hz, 1H), 4.63 (s, 2H), 4.12 (s, 2H), 4.00 (s, 2H) |
| 21 | From Intermediate 20<br><br>2-((2-((3-pentyl-1,2,4-oxadiazol-5-yl)methyl)acryloyl)oxy)acetic acid | LCMS m/z 282.6 (M + H)+ ES+).<br>$^1$H NMR (400 MHz, DMSO-d6) δ 13.12 (s, 1H), 6.41 (s, 1H), 6.08 (s, 1H), 4.64 (s, 2H), 3.99 (s, 2H), 2.64 (t, J = 7.5 Hz, 2H), 1.63 (p, J = 7.4 Hz, 2H), 1.36-1.20 (m, 4H), 0.87 (t, J = 6.9 Hz, 3H) |
| 22 | From Intermediate 21<br><br>2-((2-((3-(1-(4-((trifluoromethyl)thio)phenyl)cyclopropyl)-1,2,4-oxadiazol-5-yl)methyl)acryloyl)oxy)acetic acid | LCMS m/z 429.1 (M + H)+ (ES+). $^1$H NMR (400 MHz, DMSO-d6) δ 13.10 (s, 1H), 7.72-7.64 (m, 2H), 7.57-7.47 (m, 2H), 6.40 (s, 1H), 6.09-6.04 (m, 1H), 4.64 (s, 2H), 3.97 (s, 2H), 1.56-1.48 (m, 2H), 1.47-1.39 (m, 2H). |

Example 5—(R)-4,4,4-trifluoro-3-((2-((3-octyl-1,2,4-oxadiazol-5-yl)methyl)acryloyl)oxy)butanoic acid

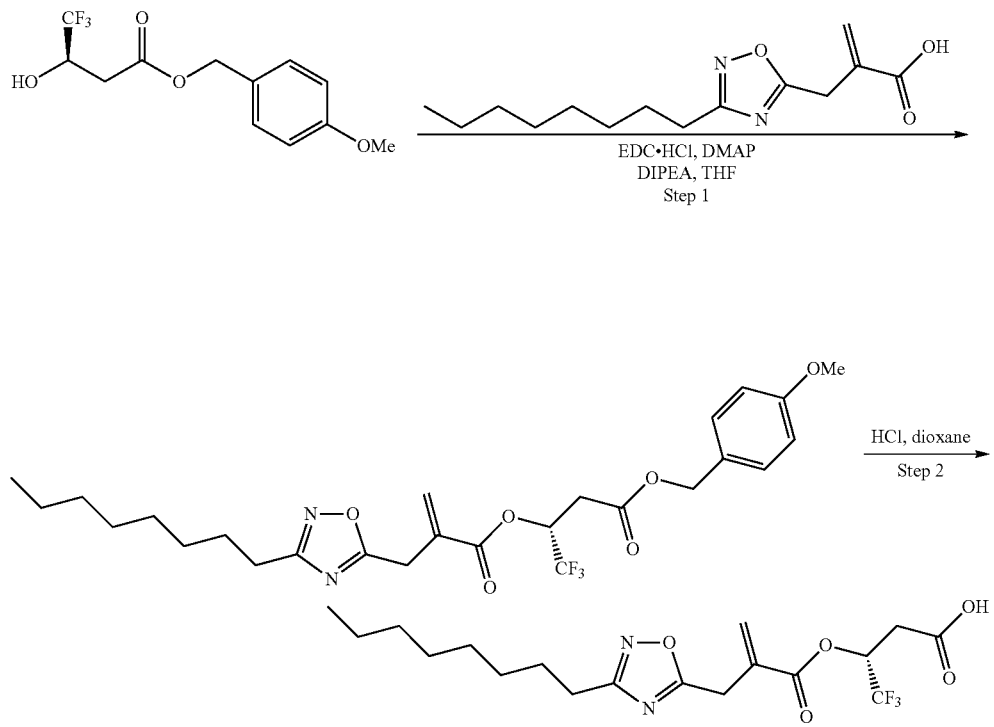

Step 1

To a solution of (R)-4-methoxybenzyl 4,4,4-trifluoro-3-hydroxybutanoate (Intermediate 7, 2.09 g, 7.52 mmol), 2-((3-octyl-1,2,4-oxadiazol-5-yl)methyl)acrylic acid (Intermediate 3, 2 g, 7.52 mmol) and DMAP (734 mg, 6.02 mmol) in THF (38 mL) was added EDC·HCl (2.17 g, 11.3 mmol) and DIPEA (2.91 g, 22.6 mmol) at 0° C., and the resulting pale yellow mixture was stirred at room temperature for 1.5 h. The mixture was quenched with dilute aqueous HCl (0.5 M, 46 mL), separated and the aqueous phase extracted with MTBE (2×40 mL). The separated organic phases were washed with brine, dried over anhydrous $Na_2SO_4$, and filtered. The filtrate was concentrated under reduced pressure at 40° C., and the residue was purified by flash column chromatography (40 g $SiO_2$, 0-15% MTBE/petroleum ether) to give (R)-4-methoxybenzyl 4,4,4-trifluoro-3-(2-((3-octyl-1,2,4-oxadiazol-5-yl)methyl)acryloyloxy)butanoate (1.7 g, 3.23 mmol, 43%) as a yellow oil. LCMS (System 2, Method C) m/z 549.2 (M+Na)$^+$ (ES$^+$).

Step 2

A mixture of (R)-4-methoxybenzyl 4,4,4-trifluoro-3-(2-((3-octyl-1,2,4-oxadiazol-5-yl)methyl)acryloyloxy) butanoate (1.7 g, 3.23 mmol) in HCl solution in 1,4-dioxane (4 M, 16 mL) was stirred at room temperature overnight. The mixture was concentrated under reduced pressure at 30° C. and the residue was purified by reversed phase column chromatography (330 g C18 silica; flow rate: 60 mL/min; 50-80% MeCN/(10 mM formic acid/water); collection wavelength: 214 nm). The collected fractions were concentrated under reduced pressure at 30° C. to remove MeCN, and the residue was lyophilized to give the still impure product. The residue was extracted with MTBE (20 mL), and the extract was washed with water and brine, dried over anhydrous $Na_2SO_4$ and filtered. The filtrate was concentrated under reduced pressure at 30° C. to give (R)-4,4,4-trifluoro-3-(2-((3-octyl-1,2,4-oxadiazol-5-yl)methyl)acryloyloxy)butanoic acid (927 mg, 71%) as a pale yellow oil. LCMS (System 2, Method B) m/z 407.2 (M+H)$^+$ (ES$^+$). $^1$H NMR (400 MHz, DMSO-d6) δ: 12.86 (br, 1H), 6.42 (s, 1H), 6.14 (s, 1H), 5.77-5.72 (m, 1H), 4.00 (s, 2H), 2.91 (dd, J=17.0, 3.7 Hz, 1H), 2.70 (dd, J=17.0, 9.3 Hz, 1H), 2.62 (t, J=7.6 Hz, 2H), 1.60 (t, J=7.2 Hz, 2H), 1.25-1.18 (m, 10H), 0.85 (t, J=6.8 Hz, 3H).

Example 6—(S)-4,4,4-trifluoro-3-((2-((3-octyl-1,2,4-oxadiazol-5-yl)methyl)acryloyl)oxy)butanoic acid

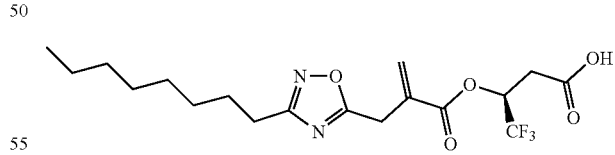

Prepared by a similar procedure to Example 5 but using (S)-4-methoxybenzyl 4,4,4-trifluoro-3-hydroxybutanoate (Intermediate 6). LCMS (System 2, Method B) m/z 407.2 (M+H)$^+$ (ES$^+$). $^1$H NMR (400 MHz, DMSO-d6) δ: 12.84 (br, 1H), 6.42 (s, 1H), 6.14 (s, 1H), 5.77-5.72 (m, 1H), 4.00 (s, 2H), 2.91 (dd, J=17.0, 3.7 Hz, 1H), 2.70 (dd, J=17.0, 9.3 Hz, 1H), 2.62 (t, J=7.6 Hz, 2H), 1.60 (t, J=7.2 Hz, 2H), 1.25-1.19 (m, 10H), 0.85 (t, J=6.8 Hz, 3H).

The following compounds were prepared using a similar procedure to Examples 5 and 6:

| Example No. | Intermediates used in step 1/Example Structure/Name | LCMS/¹H NMR data |
|---|---|---|
| 7 | Intermediates 5 and 7<br>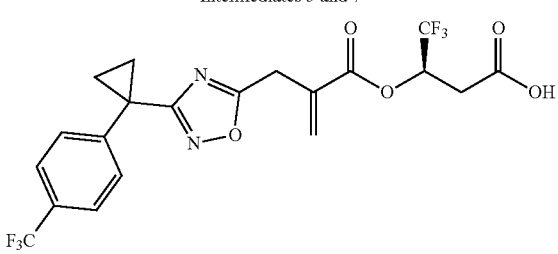<br>(R)-4,4,4-trifluoro-3-((2-((3-(1-(4-(trifluoromethyl)phenyl)cyclopropyl)-1,2,4-oxadiazol-5-yl)methyl)acryloyl)oxy)butanoic acid | LCMS (System 2, Method B) m/z 479.1 (M + H)⁺ ES⁺). ¹H NMR (400 MHz, DMSO-d6) δ: 12.79 (br, 1H), 7.70 (d, J = 8.1 Hz, 2H), 7.60 (d, J = 8.1 Hz, 2H), 6.42 (s, 1H), 6.14 (s, 1H), 5.81-5.70 (m, 1H), 3.99 (s, 2H), 2.93 (dd, J = 17.1, 3.6 Hz, 1H), 2.70 (dd, J = 17.1, 9.4 Hz, 1H), 1.54-1.38 (m, 4H). |
| 8 | Intermediates 5 and 6<br>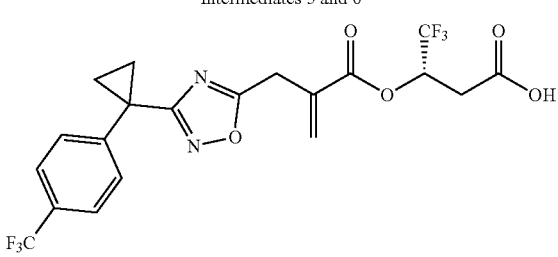<br>(S)-4,4,4-trifluoro-3-((2-((3-(1-(4-(trifluoromethyl)phenyl)cyclopropyl)-1,2,4-oxadiazol-5-yl)methyl)acryloyl)oxy)butanoic acid | LCMS (System 2, Method B) m/z 479.2 (M + H)⁺ ES⁺). ¹H NMR (400 MHz, DMSO-d6) δ: 12.83 (br, 1H), 7.70 (d, J = 8.2 Hz, 2H), 7.60 (d, J = 8.1 Hz, 2H), 6.42 (s, 1H), 6.14 (s, 1H), 5.81-5.70 (m, 1H), 3.99 (s, 2H), 2.93 (dd, J = 17.1, 3.6 Hz, 1H), 2.70 (dd, J = 17.1, 9.4 Hz, 1H), 1.55-1.38 (m, 4H). |
| 9 | Intermediates 7 and 10<br>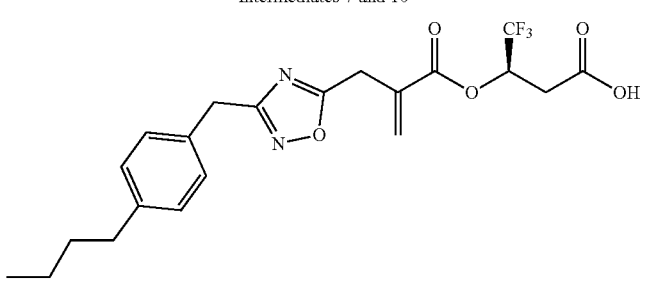<br>(R)-3-((2-((3-(4-butylbenzyl)-1,2,4-oxadiazol-5-yl)methyl)acryloyl)oxy)-4,4,4-trifluorobutanoic acid | LCMS (System 2, Method B) m/z 441.2 (M + H)⁺ ES⁺). ¹H NMR (400 MHz, DMSO-d6) δ: 12.84 (br, 1H), 7.13 (q, J = 8.2 Hz, 4H), 6.41 (s, 1H), 6.13 (s, 1H), 5.79-5.67 (m, 1H), 3.99 (s, 2H), 3.97 (s, 2H), 2.89 (dd, J = 17.0, 3.8 Hz, 1H), 2.68 (dd, J = 17.0, 9.2 Hz, 1H), 2.54 (d, J = 7.6 Hz, 2H), 1.57-1.45 (m, 2H), 1.34-1.21 (m, 2H), 0.88 (t, J = 7.3 Hz, 3H). |
| 10 | Intermediates 6 and 10<br>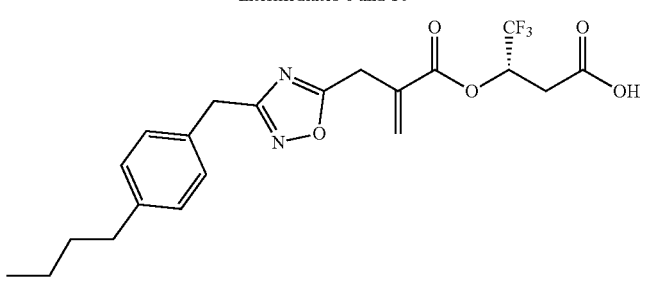<br>(S)-3-((2-((3-(4-butylbenzyl)-1,2,4-oxadiazol-5-yl)methyl)acryloyl)oxy)-4,4,4-trifluorobutanoic acid | LCMS (System 2, Method B) m/z 441.3 (M + H)⁺ ES⁺). ¹H NMR (400 MHz, DMSO-d6) δ: 12.83 (br, 1H), 7.13 (q, J = 8.1 Hz, 4H), 6.41 (s, 1H), 6.13 (s, 1H), 5.78-5.67 (m, 1H), 3.99 (s, 2H), 3.97 (s, 2H), 2.89 (dd, J = 17.0, 3.8 Hz, 1H), 2.68 (dd, J = 17.0, 9.2 Hz, 1H), 2.54 (d, J = 7.7 Hz, 2H), 1.57-1.45 (m, 2H), 1.34-1.21 (m, 2H), 0.88 (t, J = 7.3 Hz, 3H). |

-continued

| Example No. | Intermediates used in step 1/Example Structure/Name | LCMS/¹H NMR data |
|---|---|---|
| 11 | Intermediates 7 and 11<br>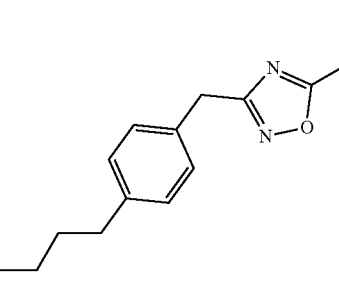<br>(R)-4,4,4-trifluoro-3-((2-((3-(4-pentylbenzyl)-1,2,4-oxadiazol-5-yl)methyl)acryloyl)oxy)butanoic acid | LCMS (System 2, Method B) m/z 455.2 (M + H)⁺ ES⁺). ¹H NMR (400 MHz, DMSO-d6) δ: 12.82 (br, 1H), 7.13 (q, J = 7.8 Hz, 4H), 6.41 (s, 1H), 6.13 (s, 1H), 5.79-5.67 (m, 1H), 3.99 (s, 2H), 3.97 (s, 2H), 2.89 (dd, J = 17.0, 3.8 Hz, 1H), 2.68 (dd, J = 17.1, 9.4 Hz, 1H), 2.56-2.51 (m, 2H), 1.59-1.47 (m, 2H), 1.34-1.19 (m, 4H), 0.85 (t, J = 6.8 Hz, 3H). |
| 12 | Intermediates 6 and 11<br>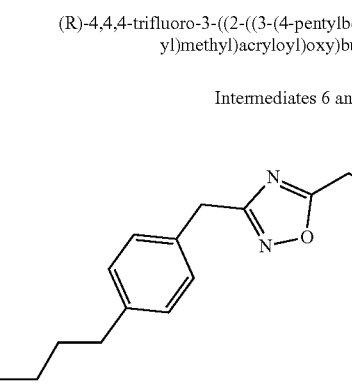<br>(S)-4,4,4-trifluoro-3-((2-((3-(4-pentylbenzyl)-1,2,4-oxadiazol-5-yl)methyl)acryloyl)oxy)butanoic acid | LCMS (System 2, Method B) m/z 455.2 (M + H)⁺ ES⁺). ¹H NMR (400 MHz, DMSO-d6) δ: 12.82 (br, 1H), 7.13 (q, J = 8.1 Hz, 4H), 6.41 (s, 1H), 6.13 (s, 1H), 5.79-5.67 (m, 1H), 3.99 (s, 2H), 3.97 (s, 2H), 2.89 (dd, J = 17.0, 3.8 Hz, 1H), 2.68 (dd, J = 17.0, 9.3 Hz, 1H), 2.55-2.50 (m, 2H), 1.58-1.47 (m, 2H), 1.35-1.18 (m, 4H), 0.85 (t, J = 7.0 Hz, 3H). |

Example 13—2-((2-((3-(4-butylbenzyl)-1,2,4-oxadiazol-5-yl)methyl)acryloyl)oxy)acetic acid

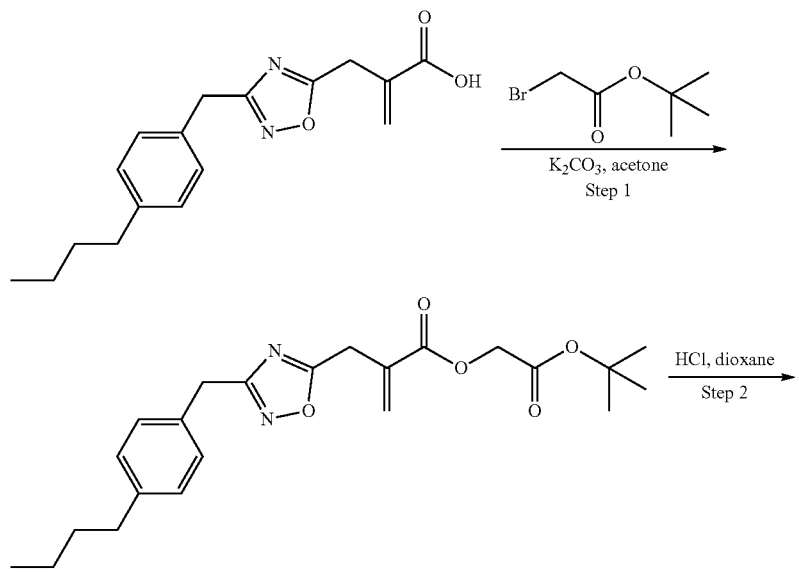

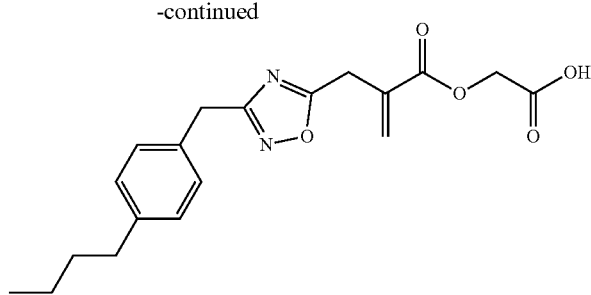

Step 1

To a solution of 2-((3-(4-butylbenzyl)-1,2,4-oxadiazol-5-yl)methyl)acrylic acid (Intermediate 10, 250 mg, 0.83 mmol) and $K_2CO_3$ (229 mg, 1.66 mmol) in acetone (6 mL) at room temperature was added tert-butyl 2-bromoacetate (162 mg, 0.83 mmol), and the resulting pale yellow mixture was stirred at room temperature for 4 h. The reaction mixture was filtered and the filtrate was concentrated under reduced pressure at 30° C. The residue was purified by flash column chromatography (25 g $SiO_2$, 0-15% MTBE/petroleum ether) to give 2-(tert-butoxy)-2-oxoethyl 2-((3-(4-butylbenzyl)-1,2,4-oxadiazol-5-yl)methyl)acrylate (278 mg, 0.67 mmol, 81%) as a colorless oil. LCMS (System 2, Method C) m/z 415.2 $(M+H)^+$ $(ES^+)$.

Step 2

A solution of 2-(tert-butoxy)-2-oxoethyl 2-((3-(4-butylbenzyl)-1,2,4-oxadiazol-5-yl)methyl)acrylate (278 mg, 0.67 mmol) in HCl solution in 1,4-dioxane (4 M, 5 mL) was stirred at room temperature overnight. The mixture was concentrated under reduced pressure at 30° C., and the residue was purified by preparative HPLC (Column: Waters X-Bridge C18 OBD 10 μm 19×250 mm; Flow Rate: 20 mL/min; solvent system: MeCN/(0.1% TFA/water); gradient: 55-95% MeCN; collection wavelength: 214 nm). The collected fractions were concentrated under reduced pressure at 35° C. to remove MeCN, and the residue was lyophilized to give 2-((2-((3-(4-butylbenzyl)-1,2,4-oxadiazol-5-yl)methyl)acryloyl)oxy)acetic acid (99 mg, 0.28 mmol, 42%) as a colorless oil. LCMS (System 2, Method B) m/z 359.1 $(M+H)^+$ $(ES^+)$. $^1H$ NMR (400 MHz, DMSO-d6) δ: 13.09 (br, 1H), 7.14 (q, J=8.2 Hz, 4H), 6.40 (s, 1H), 6.06 (s, 1H), 4.62 (s, 2H), 3.99 (s, 2H), 3.98 (s, 2H), 2.54 (d, J=7.7 Hz, 2H), 1.57-1.46 (m, 2H), 1.35-1.21 (m, 2H), 0.88 (t, J=7.3 Hz, 3H).

Example 14—2-(1H-tetrazol-5-yl)ethyl 2-((3-(4-butylbenzyl)-1,2,4-oxadiazol-5-yl)methyl)acrylate

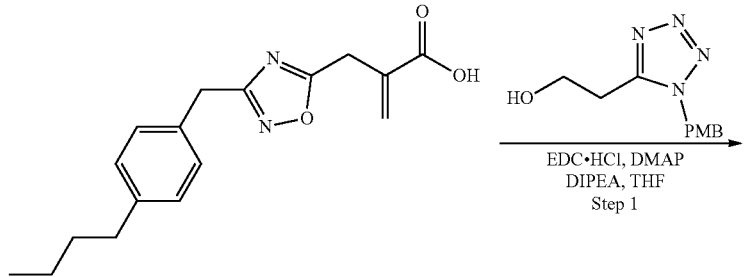

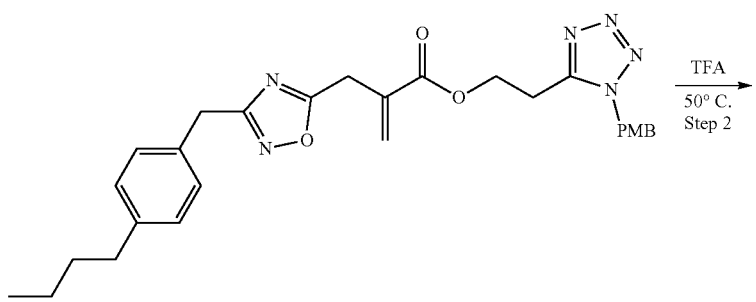

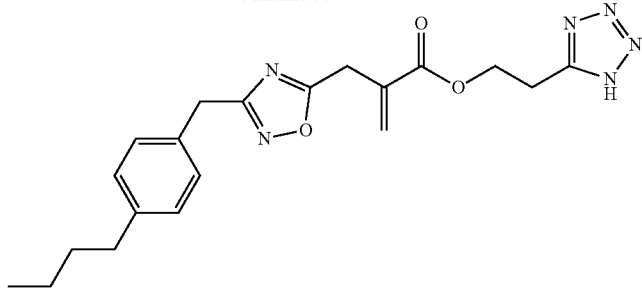

Step 1

To a solution of 2-((3-(4-butylbenzyl)-1,2,4-oxadiazol-5-yl)methyl)acrylic acid (Intermediate 10, 333 mg, 1.11 mmol), 2-(1-(4-methoxybenzyl)-1H-tetrazol-5-yl)ethan-1-ol (Intermediate 13, 260 mg, 1.11 mmol) and DMAP (108 mg, 0.89 mmol) in THF (6 mL) at 0° C. was added EDC·HCl (320 mg, 1.665 mmol) and DIPEA (430 mg, 3.33 mmol), and the resulting pale yellow mixture was stirred at room temperature for 1 h. The mixture was quenched with dilute aqueous HCl (0.5 M, 7 mL), the phases were separated, and the organic phase was extracted with MTBE (2×8 mL). The combined organic layers were washed with brine, dried over $Na_2SO_4$ and filtered. The filtrate was concentrated under reduced pressure at 35° C., and the residue was purified by flash column chromatography (25 g $SiO_2$, 0-15% MTBE/petroleum ether) to give 2-(1-(4-methoxybenzyl)-1H-tetrazol-5-yl)ethyl 2-((3-(4-butylbenzyl)-1,2,4-oxadiazol-5-yl)methyl)acrylate (250 mg, 0.48 mmol, 43%) as a yellow oil. LCMS (System 2, Method C) m/z 517.1 (M+H)$^+$ (ES$^+$).

Step 2

A mixture of 2-(1-(4-methoxybenzyl)-1H-tetrazol-5-yl)ethyl 2-((3-(4-butylbenzyl)-1,2,4-oxadiazol-5-yl)methyl) acrylate (250 mg, 0.48 mmol) in TFA (6 mL) was stirred at 50° C. overnight. The mixture was concentrated under reduced pressure at 40° C. and the residue was purified by preparative HPLC (Column: Waters X-Bridge C18 OBD 10 μm 19×250 mm; Flow Rate: 20 mL/min; solvent system: MeCN/(0.05% TFA/water); gradient: 55-95% MeCN; collection wavelength: 214 nm). The collected fractions were concentrated under reduced pressure at 40° C. to remove MeCN, and the residue was lyophilized to give 2-(1H-tetrazol-5-yl)ethyl 2-((3-(4-butylbenzyl)-1,2,4-oxadiazol-5-yl)methyl)acrylate (96 mg, 0.24 mmol, 49%) as a white solid. LCMS (System 2, Method B) m/z 397.1 (M+H)$^+$ (ES$^+$). $^1$H NMR (400 MHz, DMSO-d6) δ: 16.09 (br, 1H), 7.13 (q, J=8.1 Hz, 4H), 6.24 (s, 1H), 5.96 (s, 1H), 4.40 (t, J=6.4 Hz, 2H), 3.97 (s, 2H), 3.91 (s, 2H), 3.20 (t, J=6.4 Hz, 2H), 2.55-2.50 (m, 2H), 1.56-1.44 (m, 2H), 1.34-1.21 (m, 2H), 0.87 (t, J=7.3 Hz, 3H).

Example 15—3-((2-((3-(4-butylbenzyl)-1,2,4-oxadiazol-5-yl)methyl)acryloyl)oxy)propanoic acid

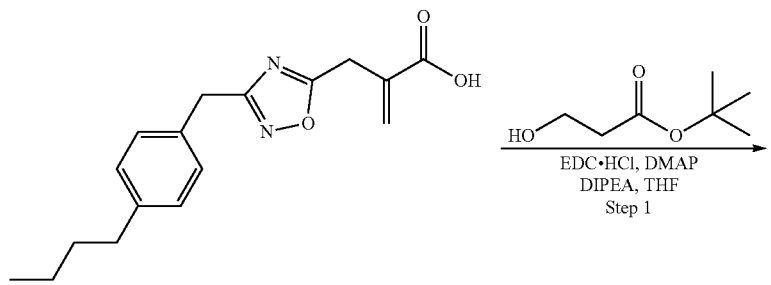

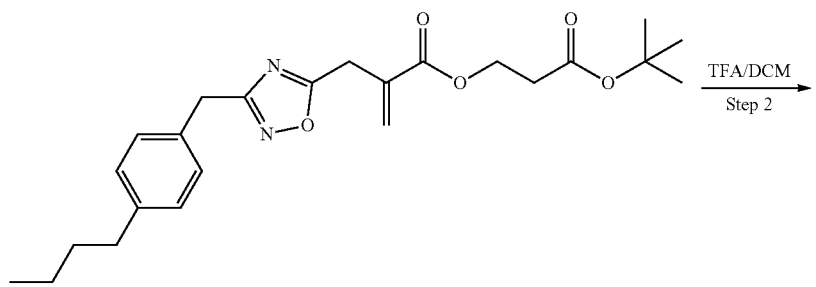

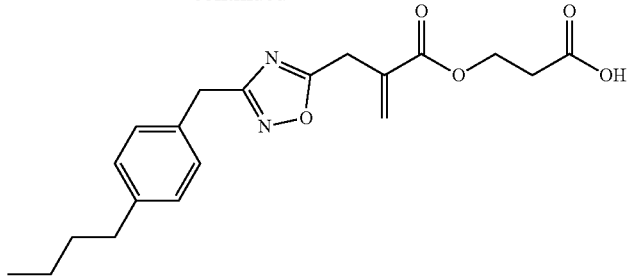

Step 1

To a solution of 2-((3-(4-butylbenzyl)-1,2,4-oxadiazol-5-yl)methyl)acrylic acid (Intermediate 10, 300 mg, 1.00 mmol), tert-butyl 3-hydroxypropanoate (161 mg, 1.10 mmol), DIPEA (387 mg, 3.00 mmol) and EDC·HCl (288 mg, 1.50 mmol) in THF (5 mL) at 0° C. was added DMAP (98 mg, 0.8 mmol), and the resulting mixture was stirred at room temperature for 1.5 h. The mixture was adjusted pH=6 using dilute aqueous HCl (0.5 M), then the phases were separated, and the aqueous phase was extracted with EtOAc (2×5 mL). The separated organic layers were washed with brine, dried over $Na_2SO_4$ and filtered. The filtrate was concentrated under reduced pressure at 30° C., and the residue was purified by flash column chromatography (25 g $SiO_2$, 0-10% MTBE/petroleum ether) to give 3-(tert-butoxy)-3-oxopropyl 2-((3-(4-butylbenzyl)-1,2,4-oxadiazol-5-yl)methyl)acrylate (180 mg, 0.42 mmol, 42%) as a pale yellow oil. LCMS (System 2, Method C) m/z 429.2 (M+H)$^+$ (ES$^+$).

Step 2

A solution of 3-(tert-butoxy)-3-oxopropyl 2-((3-(4-butylbenzyl)-1,2,4-oxadiazol-5-yl)methyl)acrylate (180 mg, 0.42 mmol) in TFA (2 mL) and DCM (4 mL) was stirred at room temperature for 16 h. The mixture was concentrated under reduced pressure at 30° C. and the residue was purified by preparative HPLC (Column: Waters X-Bridge C18 OBD 10 μm 19×250 mm; Flow Rate: 20 mL/min; solvent system: MeCN/(0.1% TFA/water); gradient: 60-95% MeCN; collection wavelength: 214 nm). The collected fractions were concentrated under reduced pressure at 30° C. to remove MeCN, and the residue was lyophilized to give 3-((2-((3-(4-butylbenzyl)-1,2,4-oxadiazol-5-yl)methyl)acryloyl)oxy) propanoic acid (119 mg, 0.32 mmol, 76%) as a pale yellow oil. LCMS (System 2, Method B) m/z 373.1 (M+H)$^+$ (ES$^+$).
$^1$H NMR (400 MHz, DMSO-d6) δ: 12.37 (br, 1H), 7.14 (q, J=8.0 Hz, 4H), 6.27 (s, 1H), 5.98 (s, 1H), 4.21 (t, J=6.2 Hz, 2H), 3.99 (s, 2H), 3.93 (s, 2H), 2.57-2.50 (m, 4H), 1.57-1.45 (m, 2H), 1.35-1.21 (m, 2H), 0.88 (t, J=7.3 Hz, 3H).

Example 16—(1H-tetrazol-5-yl)methyl 2-((3-(4-butylbenzyl)-1,2,4-oxadiazol-5-yl)methyl)acrylate

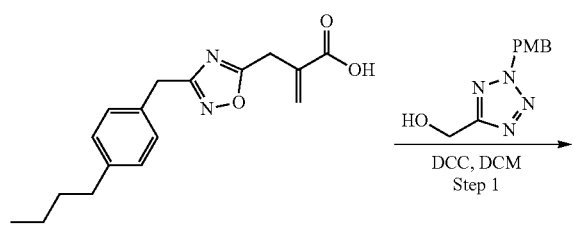

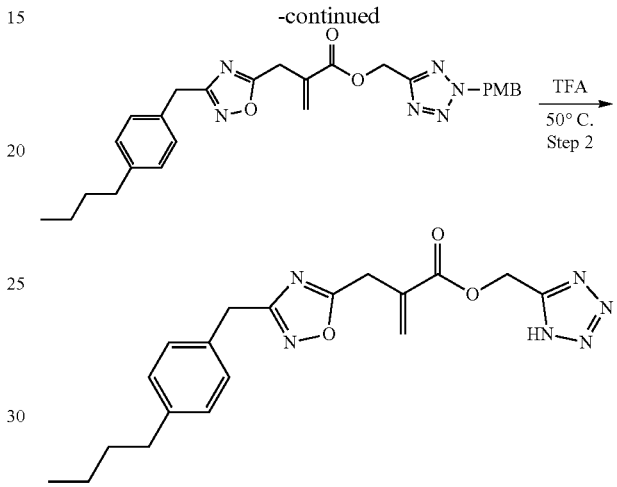

Step 1

A solution of 2-((3-(4-butylbenzyl)-1,2,4-oxadiazol-5-yl)methyl)acrylic acid (Intermediate 10, 330 mg, 1.10 mmol), (2-(4-methoxybenzyl)-2H-tetrazol-5-yl)methanol (Intermediate 14, 242 mg, 1.10 mmol) and DCC (453 mg, 1.40 mmol) in DCM (5 mL) was stirred at room temperature for 16 h. The mixture was quenched with $H_2O$, the phases were separated and the aqueous phase was extracted with DCM (2×5 mL). The combined organic layers were washed with brine, dried over $Na_2SO_4$ and filtered. The filtrate was concentrated under reduced pressure at 30° C., and the residue was purified by flash column chromatography (25 g $SiO_2$, 0-20% MTBE/petroleum ether) to give (2-(4-methoxybenzyl)-2H-tetrazol-5-yl)methyl 2-((3-(4-butylbenzyl)-1,2,4-oxadiazol-5-yl)methyl)acrylate (250 mg, 0.50 mmol, 45%) as a pale yellow oil. LCMS (System 2, Method C) m/z 503.2 (M+H)$^+$ (ES$^+$).

Step 2

A solution of (2-(4-methoxybenzyl)-2H-tetrazol-5-yl)methyl 2-((3-(4-butylbenzyl)-1,2,4-oxadiazol-5-yl)methyl)acrylate (250 mg, 0.50 mmol) in TFA (5 mL) was stirred at 50° C. for 3 h. The mixture was concentrated under reduced pressure at 30° C. and the residue was purified by preparative HPLC (Column: Waters X-Bridge C18 OBD 10 μm 19×250 mm; Flow Rate: 20 mL/min; solvent system: MeCN/(0.1% TFA/water); gradient: 50-95% MeCN; collection wavelength: 214 nm). The collected fractions were concentrated under reduced pressure at 30° C. to remove MeCN, and the residue was lyophilized to give (1H-tetrazol-5-yl)methyl 2-((3-(4-butylbenzyl)-1,2,4-oxadiazol-5-yl)methyl)acrylate (122 mg, 0.32 mmol, 64%) as a pale yellow oil. LCMS (System 2, Method B) m/z 383.1 (M+H)$^+$ (ES$^+$).
$^1$H NMR (400 MHz, DMSO-d6) δ: 16.76 (br, 1H), 7.18-7.08

(m, 4H), 6.44 (s, 1H), 6.08 (s, 1H), 5.48 (s, 2H), 4.00 (s, 2H), 3.97 (s, 2H), 2.57-2.50 (m, 2H), 1.57-1.45 (m, 2H), 1.34-1.21 (m, 2H), 0.88 (t, J=7.3 Hz, 3H).

Example 17—4,4,4-trifluoro-2,2-dimethyl-3-((2-((3-octyl-1,2,4-oxadiazol-5-yl)methyl)acryloyl)oxy)butanoic acid ent: 60-95% MeCN; collection wavelength: 214 nm). The collected fractions were concentrated under reduced pressure at 30° C. to remove MeCN, and the residue was lyophilized to give 4,4,4-trifluoro-2,2-dimethyl-3-((2-((3-octyl-1,2,4-oxadiazol-5-yl)methyl)acryloyl)oxy)butanoic acid (17 mg, 0.04 mmol, 7%) as a pale yellow oil. LCMS (System 2, Method 3) m/z 435.1 (M+H)$^+$ (ES$^+$). $^1$H NMR (400 MHz, CDCl$_3$) δ: 6.57 (s, 1H), 5.97 (s, 1H), 5.85 (q,

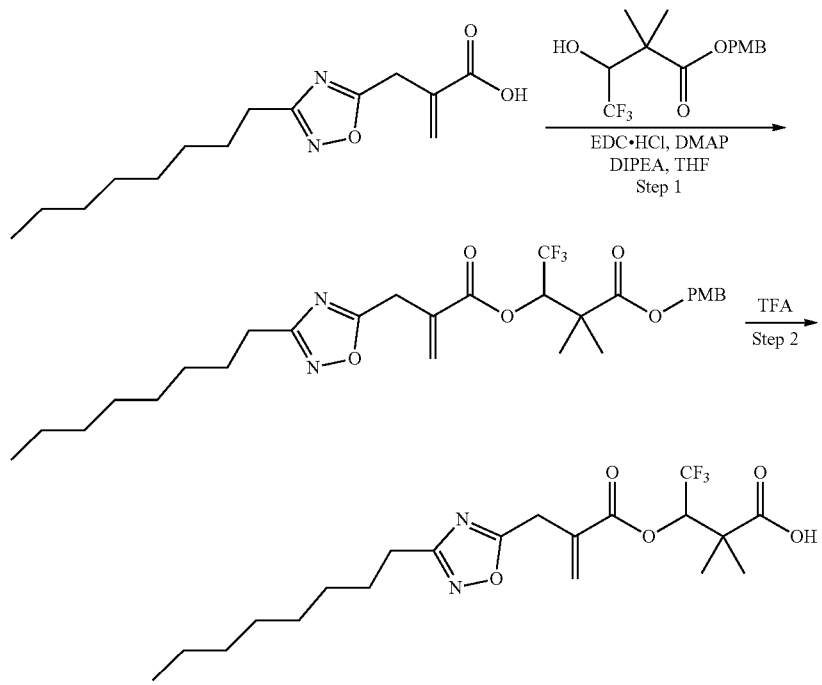

J=7.0 Hz, 1H), 4.01-3.86 (m, 2H), 2.73-2.64 (m, 2H), 1.76-1.64 (m, 2H), 1.39-1.19 (m, 16H), 0.91-0.82 (m, 3H). One exchangeable proton not observed.

Biological Example 1—THP-1 AlphaLISA IL-1β

Measuring Inhibitory Effects on IL-1, Cytokine Output from THP-1s

The cytokine inhibition profiles of compounds of formula (I) were determined in a differentiated THP-1 cell assay. All assays were performed in RPMI-1640 growth medium (Gibco), supplemented with 10% fetal bovine serum (FBS; Gibco), 1% penicillin-streptomycin and 1% sodium pyruvate unless specified otherwise. The IL-1p cytokine inhibition assay was run in a background of differentiated THP-1 cells as described below. All reagents described were from Sigma-Aldrich unless specified otherwise. Compounds were prepared as 10 mM DMSO stocks.

Assay Procedure

THP-1 cells were expanded as a suspension up to 80% confluence in appropriate growth medium. Cells were harvested, suspended, and treated with an appropriate concentration of phorbol 12-myristate 13-acetate (PMA) over a 72 hr period (37° C./5% CO$_2$).

Following 72 hrs of THP-1 cell incubation, cellular medium was removed and replaced with fresh growth media containing 1% of FBS. Working concentrations of compounds were prepared separately in 10% FBS treated growth medium and pre-incubated with the cells for 30 minutes (37°

Step 1

To a solution of 4-methoxybenzyl 4,4,4-trifluoro-3-hydroxy-2,2-dimethylbutanoate (Intermediate 15, 495 mg, 1.62 mmol), 2-((3-octyl-1,2,4-oxadiazol-5-yl)methyl) acrylic acid (Intermediate 3, 430 mg, 1.62 mmol) and DMAP (158 mg, 1.30 mmol) in DCM (8 mL) at 0° C. was added EDC·HCl (467 mg, 2.43 mmol) and DIPEA (627 mg, 4.86 mmol), and the resulting pale yellow mixture was stirred at room temperature for 3 h. The mixture was quenched with dilute aqueous HCl (0.5 M, 10 mL), the phases were separated and the aqueous phase was extracted with DCM (2×10 mL). The combined organic layers were washed with brine, dried over Na$_2$SO$_4$ and filtered. The filtrate was concentrated under reduced pressure at 35° C., and the residue was purified by flash column chromatography (25 g SiO$_2$, 0-15% MTBE/petroleum ether) to give impure 4-methoxybenzyl 4,4,4-trifluoro-2,2-dimethyl-3-((2-((3-octyl-1,2,4-oxadiazol-5-yl)methyl)acryloyl)oxy)butanoate (330 mg, 0.60 mmol, 38%) as a yellow oil. LCMS (System 2, Method C) m/z 555.0 (M+H)$^+$ (ES$^+$).

Step 2

A mixture of 4-methoxybenzyl 4,4,4-trifluoro-2,2-dimethyl-3-((2-((3-octyl-1,2,4-oxadiazol-5-yl)methyl)acryloyl) oxy)butanoate (330 mg, 0.60 mmol) in TFA (3 mL) was stirred at room temperature overnight. The mixture was concentrated under reduced pressure at 30° C. and the residue was purified by preparative HPLC (Column: Waters X-Bridge C18 OBD 10 μm 19×250 mm; Flow Rate: 20 mL/min; solvent system: MeCN/(0.1% TFA/water); gradi- C./5% $CO_2$). Following the 30 minute compound pre-incubation, THP-1s were treated with an appropriate concentration of LPS and the cells were subsequently incubated for a 24 hr period (37° C./5% $CO_2$). An appropriate final concentration of Nigericin was then dispensed into the THP-1 plates and incubated for 1 hour (37° C./5% $CO_2$) before THP-1 supernatants were harvested and collected in separate polypropylene 96-well holding plates.

Reagents from an IL-1β and IL-6 commercial kit (Perkin Elmer) were prepared and run according to the manufacturer's instructions. Subsequently, fluorescence signal detection in a microplate reader was measured (EnVision® Multilabel Reader, Perkin Elmer).

Percentage inhibition was calculated per cytokine by normalising the sample data to the high and low controls used within each plate (+/−LPS respectively). Percentage inhibition was then plotted against compound concentration and the 50% inhibitory concentration ($IC_{50}$) was determined from the resultant concentration-response curve.

The data for all compounds of formula (I) tested are presented in Table 1 below. 4-Octyl itaconate, ethyl 2-(2-chlorobenzyl)acrylate (INF39; Cocco et al. 2017) and 2-(2-chlorobenzyl)acrylic acid (Cocco et al., 2017) were included as comparator compounds.

TABLE 1

THP-1 cell IL-1β and IL-6 $IC_{50}$ values (μM) (+++ indicates $IC_{50}$ of <5 μM; ++ indicates $IC_{50}$ of 5-10 μM; + indicates $IC_{50}$ of 11-20 μM; ± indicates $IC_{50}$ of 21-24 μM)

| Compound | IL-1β ($IC_{50}$) | IL-6 ($IC_{50}$) |
|---|---|---|
| 4-octyl itaconate | 33 | 25 |
| ethyl 2-(2-chlorobenzyl)acrylate | >100 | NT* |
| 2-(2-chlorobenzyl)acrylic acid | >100 | NT |
| Example 1 | +++ | +++ |
| Example 2 | +++ | NT |
| Example 3 | + | NT |
| Example 4 | +++ | ++ |
| Example 5 | +++ | +++ |
| Example 6 | +++ | +++ |
| Example 7 | +++ | +++ |
| Example 8 | +++ | +++ |
| Example 9 | +++ | +++ |
| Example 10 | +++ | +++ |
| Example 11 | +++ | +++ |
| Example 12 | +++ | +++ |
| Example 13 | +++ | +++ |
| Example 14 | +++ | +++ |
| Example 15 | +++ | +++ |
| Example 16 | +++ | +++ |
| Example 17 | +++ | +++ |
| Example 18 | +++ | +++ |
| Example 19 | +++ | +++ |
| Example 20 | ++ | +++ |
| Example 21 | ± | + |
| Example 22 | +++ | +++ |

NT* = not tested

These results reveal that compounds of formula (I) are expected to have anti-inflammatory activity as shown by their $IC_{50}$ values for inhibition of IL-1p and IL-6 release in this assay. All compounds of the invention tested exhibited improved IL-1β lowering properties ($IC_{50}$ values) compared to 4-octyl itaconate, ethyl 2-(2-chlorobenzyl)acrylate and 2-(2-chlorobenzyl)acrylic acid. All compounds of the invention tested exhibited improved IL-6 lowering properties ($IC_{50}$ values) compared to 4-octyl itaconate.

Biological Example 2—NRF2 Activation Assay

Measuring Compound Activation Effects on the Anti-Inflammatory Transcription Factor NRF2 in DiscoverX PathHunter NRF2 Translocation Kit Potency and efficacy of compounds of formula (I) against the target of interest to activate NRF2 (nuclear factor erythroid 2-related factor 2) were determined using the PathHunter NRF2 translocation kit (DiscoverX). The NRF2 translocation assay was run using an engineered recombinant cell line, utilising enzyme fragment complementation to determine activation of the Keap1-NRF2 protein complex and subsequent translocation of NRF2 into the nucleus. Enzyme activity was quantified using a chemiluminescent substrate consumed following the formation of a functional enzyme upon PK-tagged NRF2 translocation into the nucleus.

Additionally, a defined concentration of DMF was used as the 'High' control to normalise test compound activation responses to.

Assay Procedure

U2OS PathHunter eXpress cells were thawed from frozen prior to plating. Following plating, U2OS cells were incubated for 24 hrs (37° C./5% $CO_2$) in commercial kit provided cell medium.

Following 24 hrs of incubation, plated U2OS cells were directly treated with an appropriate final concentration of compound. Plated U2OS cells were incubated with an appropriate final concentration of compound.

Following compound treatment, the U2OS plates were incubated for a further 6 hours (37° C./5% $CO_2$) before detection reagent from the PathHunter NRF2 commercial kit was prepared and added to test plates according to the manufacturer's instructions. Subsequently, the luminescence signal detection was measured in a microplate reader (PHERAstar®, BMG Labtech).

Percentage activation was calculated by normalising the sample data to the high and low controls used within each plate (+/−DMF). Percentage activation/response was then plotted against compound concentration and the 50% activation concentration ($EC_5$) was determined from the plotted concentration-response curve.

A number of compounds of formula (I) were tested, and the results are shown in Table 2 below. 4-Octyl itaconate and 2-(2-chlorobenzyl)acrylic acid (Cocco et al., 2017) were included as comparator compounds. DMF is shown as the high and low control as mentioned above.

TABLE 2

NRF2 activation (For $EC_{50}$ values, +++ means <5 μM, ++ means 5-10 μM range and + means 11-21 μM range; for $E_{max}$ values ++++ means >250%, +++ means 166-250%, ++ means 135-165%, + means 101-134%, ± means 3-100%)

| Compound | $EC_{50}$ (μM) | $E_{max}$ (%) |
|---|---|---|
| dimethyl fumarate | 6.1 | 100 |
| 4-octyl itaconate | 22 | 165 |
| 2-(2-chlorobenzyl)acrylic acid | >100 | 2 |
| Example 1 | +++ | ++ |
| Example 2 | +++ | ++ |
| Example 3 | + | ++ |
| Example 4 | ++ | ++ |
| Example 5 | +++ | ++ |
| Example 6 | +++ | ++++ |
| Example 7 | +++ | ± |
| Example 8 | +++ | ++ |

TABLE 2-continued

NRF2 activation (For $EC_{50}$ values, +++ means <5 μM, ++ means 5-10 μM range and + means 11-21 μM range; for $E_{max}$ values ++++ means >250%, +++ means 166-250%, ++ means 135-165%, + means 101-134%, ± means 3-100%)

| Compound | $EC_{50}$ (μM) | $E_{max}$ (%) |
|---|---|---|
| Example 9 | +++ | + |
| Example 10 | +++ | ++ |
| Example 11 | +++ | + |
| Example 12 | +++ | +++ |
| Example 13 | +++ | +++ |
| Example 14 | +++ | ++ |
| Example 16 | +++ | ++ |
| Example 18 | ++ | +++ |
| Example 19 | ++ | +++ |
| Example 21 | + | +++ |
| Example 22 | +++ | ++ |

These results reveal that compounds of formula (I) are expected to have anti-inflammatory activity as shown by their $EC_{50}$ and $E_{max}$ values for NRF2 activation in this assay. All Examples tested exhibited lower $EC_{50}$ values compared to 4-octyl itaconate. Examples 6 and 12 exhibited higher potency (lower $EC_{50}$ and higher $E_{max}$ values) compared to 4-octyl itaconate. All Examples tested exhibited higher potencies (lower $EC_{50}$ and higher $E_{max}$ values) compared to 2-(2-chlorobenzyl)acrylic acid.

Biological Example 3—Hepatocyte Stability Assay

Defrosted cryo-preserved hepatocytes (viability >70%) were used to determine the metabolic stability of a compound via calculation of intrinsic clearance ($CI_{int}$; a measure of the removal of a compound from the liver in the absence of blood flow and cell binding). Clearance data are particularly important for in vitro work as they can be used in combination with in vivo data to predict the half-life and oral bioavailability of a drug.

The metabolic stability in hepatocytes assay involves a time-dependent reaction using both positive and negative controls. The cells were pre-incubated at 37° C. and spiked with test compound (and positive control); samples taken at pre-determined time intervals were analysed to monitor the change in concentration of the initial drug compound over 60 minutes. A buffer incubation reaction (with no hepatocytes present) acted as a negative control and two cocktail solutions, containing compounds with known high and low clearance values (verapamil/7-hydroxycoumarin and propranolol/diltiazem), acted as positive controls.

1. The assay was run with a cell concentration of 0.5×10⁶ cells/mL in Leibovitz buffer.
2. All compounds and controls were run in duplicate.
3. Compound concentration was 10 μM.
4. All compounds and controls were incubated with both cells and buffer to show turnover was due to hepatic metabolism.
5. All wells on the incubation plate had 326.7 μL of either cells or buffer added.
6. Prior to assay, cell and buffer-only incubation plates were preincubated for 10 mins at 37° C.
7. The assay was initiated by adding compounds, 3.3 μL of 1 mM in 10% DMSO-90% Buffer; final DMSO concentration is 0.1%.
8. Samples were taken at regular timepoints (0, 5, 10, 20, 40, 60 min) until 60 mins.
9. Sample volume was 40 μL and was added to 160 μL of crash solvent (acetonitrile with internal standard) and stored on ice.
10. At the end of the assay, the crash plates were centrifuged at 3500 rpm for 20 mins at 4° C.
11. 80 μL of clear supernatant was removed and mixed with 80 μL of deionised water before being analysed by LC-MS/MS.

Raw LC-MS/MS data was exported to, and analysed in, Microsoft Excel for determination of intrinsic clearance. The percentage remaining of a compound was monitored using the peak area of the initial concentration as 100%. Intrinsic clearance and half-life values were calculated using a graph of the natural log of percentage remaining versus the time of reaction in minutes. Half-life (min) and intrinsic clearance ($CI_{int}$ in μL min⁻¹ 10⁻⁶ cells) values were calculated using the gradient of the graph (the elimination rate constant, k) and Equations 1 and 2.

$$t_{\frac{1}{2}} = \frac{\ln 2}{k} \qquad \{Equation\ 1\}$$

$$Cl_{int} = \left(\frac{\ln 2}{t_{\frac{1}{2}}}\right) \times \left(\frac{350}{0.175}\right) \qquad \{Equation\ 2\}$$

A number of compounds of formula (I) were tested, and the results are shown in Table 3 below. 4-Octyl itaconate, ethyl 2-(2-chlorobenzyl)acrylate and 2-(2-chlorobenzyl) acrylic acid (Cocco et al., 2017) were included as comparator compounds.

TABLE 3

Hepatocyte stability (For $Cl_{int}$ (μL min⁻¹ 10⁻⁶ cells; mouse), +++ means <95, ++ means 95-350, and + means ≥351; For $Cl_{int}$ (μL min⁻¹ 10⁻⁶ cells; human), ++++ means <13, +++ means 13-20, ++ means 21-400, and + means >400; For T½ (min; mouse), +++ means >11, ++ means 5-11, and + means ≤4; For T½ (min; human), ++++ means >100, +++ means 60-100, ++ means 5-59, and + means <5)

| Compound | Species | $Cl_{int}$ (μL min⁻¹ 10⁻⁶ cells) | T½ (min) |
|---|---|---|---|
| 4-octyl itaconate | Mouse | 351 | 4 |
|  | Human | 401 | 4 |
| ethyl 2-(2-chlorobenzyl)acrylate | Mouse | >460 | <3 |
|  | Human | >460 | <3 |
| 2-(2-chlorobenzyl)acrylic acid | Mouse | 95 | 11 |
|  | Human | 21 | 59 |
| Example 1 | Mouse | + | + |
|  | Human | ++ | ++ |
| Example 2 | Mouse | + | + |
|  | Human | ++ | ++ |
| 4-octyl itaconate | Mouse | 351 | 4 |
|  | Human | 401 | 4 |
| ethyl 2-(2-chlorobenzyl)acrylate | Mouse | >460 | <3 |
|  | Human | >460 | <3 |
| 2-(2-chlorobenzyl)acrylic acid | Mouse | 95 | 11 |
|  | Human | 21 | 59 |
| Example 3 | Mouse | +++ | +++ |
|  | Human | ++++ | ++++ |
| Example 4 | Mouse | ++ | ++ |
|  | Human | +++ | +++ |
| Example 5 | Mouse | + | + |
|  | Human | ++ | ++ |
| Example 6 | Mouse | + | + |
|  | Human | ++ | ++ |
| Example 7 | Mouse | + | + |
|  | Human | ++ | ++ |

TABLE 3-continued

Hepatocyte stability (For $Cl_{int}$ (µL min$^{-1}$ 10$^{-6}$ cells; mouse), +++ means <95, ++ means 95-350, and + means ≥351; For $Cl_{int}$ (µL min$^{-1}$ 10$^{-6}$ cells; human), ++++ means <13, +++ means 13-20, ++ means 21-400, and + means >400; For T½ (min; mouse), +++ means >11, ++ means 5-11, and + means ≤4; For T½ (min; human), ++++ means >100, +++ means 60-100, ++ means 5-59, and + means <5)

| Compound | Species | $Cl_{int}$ (µL min$^{-1}$ 10$^{-6}$ cells) | T½ (min) |
|---|---|---|---|
| Example 8 | Mouse | + | + |
| | Human | ++ | ++ |
| Example 10 | Mouse | + | + |
| | Human | + | + |
| Example 13 | Mouse | + | + |
| | Human | ++ | ++ |
| Example 14 | Mouse | + | + |
| | Human | ++ | ++ |
| Example 15 | Mouse | + | + |
| | Human | ++ | ++ |
| Example 16 | Mouse | + | + |
| | Human | ++ | ++ |
| Example 17 | Mouse | + | + |
| | Human | ++ | ++ |
| Example 18 | Mouse | ++ | ++ |
| | Human | +++ | +++ |
| Example 19 | Mouse | ++ | ++ |
| | Human | ++ | ++ |
| 4-octyl itaconate | Mouse | 351 | 4 |
| | Human | 401 | 4 |
| ethyl 2-(2-chlorobenzyl)acrylate | Mouse | >460 | <3 |
| | Human | >460 | <3 |
| 2-(2-chlorobenzyl)acrylic acid | Mouse | 95 | 11 |
| | Human | 21 | 59 |
| Example 20 | Mouse | ++ | ++ |
| | Human | ++++ | ++++ |
| Example 22 | Mouse | + | + |
| | Human | ++ | ++ |

These results reveal that compounds of the invention are expected to have acceptable or improved metabolic stabilities, as shown by their intrinsic clearance ($Cl_{int}$) and half-life ($T_{1/2}$) values in this assay. Certain compounds of formula (I) shown in Table 3 were more stable, i.e., they exhibited lower intrinsic clearance ($Cl_{int}$) and longer half-life ($T_{1/2}$) values compared to 4-octyl itaconate and ethyl 2-(2-chlorobenzyl)acrylate at least in human hepatocytes. Example 3 is more stable in both human and mouse hepatocytes compared to 4-octyl itaconate, ethyl 2-(2-chlorobenzyl)acrylate and 2-(2-chlorobenzyl)acrylic acid.

REFERENCES

The following publications cited in this specification are herein incorporated by reference in their entirety.
Ackermann et al. *Proc. Soc. Exp. Bio. Med.* 1949, 72(1), 1-9.
Andersen J. L. et al. *Nat. Commun.* 2018, 9, 4344.
Angiari S. and O'Neill L. A. *Cell Res.* 2018, 28, 613-615.
Bagavant G. et al. *Indian J. Pharm. Sci.* 1994, 56, 80-85.
Bambouskova M. et al. *Nature* 2018, 556, 501-504.
Blewett M. M. et al. *Sci. Sign.* 2016, 9 (445), rs10; 6.
Brennan M. S. et al. *PLoS One* 2015, 10, e0120254.
Brück J. et al. *Exp. Dermatol.* 2018, 27, 611-624.
Cocco M. et al. *J. Med. Chem.* 2014, 57, 10366-10382.
Cocco M. et al. *J. Med. Chem.* 2017, 60, 3656-3671.
Cordes T. et al. *J. Biol. Chem.* 2016, 291, 14274-14284.
Cordes T. et al. *Mol. Metab.* 2020, 32, 122-135.
Daly R. et al. *medRxiv* 2019, 19001594; doi: https://doi.org/10.1101/19001594.
Daniels B. P. et al. *Immunity* 2019, 50(1), 64-76.e4.
Dibbert S. et al. *Arch. Dermatol. Res.* 2013, 305, 447-451.
ElAzzouny M. et al. *J. Biol. Chem.* 2017, 292, 4766-4769.
Gillard G. O. et al. *J. Neuroimmunol.* 2015, 283, 74-85.
Gu L. et al. *Immunol. Cell Biol.* 2020, 98(3), 229-241.
Hanke T. et al. *Pharmacol. Therapeut.* 2016, 157, 163-187.
Hunt T. et al. *Consortium of Multiple Sclerosis Centers 2015 Annual Meeting*, 27-30 May 2015, Indianapolis, IN, USA: Poster DX37.
Kobayashi E. H. et al. *Nat. Commun.* 2016, 7, 11624.
Kornberg M. D. et al. *Science* 2018, 360, 449-453.
Kulkarni R. A. et al. *Nat. Chem. Biol.* 2019, 15, 391-400.
Lampropoulou V. et al. *Cell Metab.* 2016, 24, 158-166.
Lehmann J. C. U. et al. *J. Invest. Dermatol.* 2007, 127, 835-845.
Liao S.-T. et al. *Nat. Commun.* 2019, 10(1), 5091.
Liu H. et al. *Cell Commun. Signal.* 2018, 16, 81.
McGuire V. A. et al. *Sci. Rep.* 2016, 6, 31159.
Michelucci A. et al. *Proc. Natl. Acad. Sci. USA* 2013, 110, 7820-7825.
Mills E. A. et al. *Front. Neurol.* 2018, 9, 5.
Mills E. L. et al. *Cell* 2016, 167, 457-470.
Mills E. L. et al. *Nature* 2018, 556, 113-117.
Mrowietz U. et al. *Trends Pharmacol. Sci.* 2018, 39, 1-12.
Müller S. et al. *J. Dermatol. Sci.* 2017, 87, 246-251.
Murphy M. P. and O'Neill L. A. J. *Cell* 2018, 174, 780-784.
O'Neill L. A. J. and Artyomov M. N. *Nat. Rev. Immunol.* 2019 273-281.
Olagnier D. et al. *Nat. Commun.* 2018, 9, 3506.
Schmidt T. J. et al. *Bioorg. Med. Chem.* 2007, 15, 333-342.
Shan Q. et al. *Biochem. Biophys. Res. Commun.* 2019, 517, 538-544.
Straub R. H. and Schradin C. *Evol. Med. Public Health* 2016, 1, 37-51S.
Straub R. H. and Cutolo M. *Rheumatology* 2016, 55 (Suppl. 2), ii6-ii14.
Sun X. et al., *FASEB J.* 2019, 33, 12929-12940.
Tang C. et al. *Cell Physiol. Biochem.* 2018, 51, 979-990.
Tang C. et al. *Biochem. Biophys. Res. Commun.* 2019, 508, 921-927.
Tang H. et al. *Biochem. Biophys. Res. Commun.* 2008, 375, 562-565.
Tian et al. *Eur. J. Pharmacol.* 2020, 873, 172989.
van der Reest J. et al. *Nat. Commun.* 2018, 9, 1581.
von Glehn F. et al. *Mult. Scler. Relat. Disord.* 2018, 23, 46-50.
Yi F. et al. *Hepatology* 2020, 873, 172989.
Yu X.-H. et al. *Immunol. Cell Biol.* 2019, 97, 134-141.
Zhang D. et al. *Int. Immunopharmacol.* 2019, 77, 105924.
Zhang S. et al. *Bioorg. Med. Chem.* 2012, 20, 6073-6079.
Zhao C. et al. *Microb. Pathogen.* 2019, 133, 103541.
Zhao G. et al. *Biochem. Biophys. Res. Commun.* 2014, 448, 303-307.

MISCELLANEOUS

All references referred to in this application, including patent and patent applications, are incorporated herein by reference to the fullest extent possible.

Throughout the specification and the claims which follow, unless the context requires otherwise, the word 'comprise', and variations such as 'comprises' and 'comprising', will be understood to imply the inclusion of a stated integer, step, group of integers or group of steps but not to the exclusion of any other integer, step, group of integers or group of steps.

The application of which this description and claims forms part may be used as a basis for priority in respect of any subsequent application. The claims of such subsequent application may be directed to any feature or combination of features described herein. They may take the form of product, composition, process, or use claims and may include, by way of example and without limitation, the following claims.

The invention claimed is:
1. A compound of formula (I):

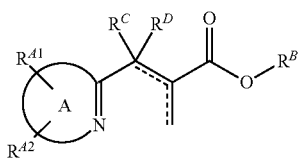

wherein,

represents a 5 membered heteroaryl ring, which in addition to the C=N shown contains one or more further heteroatoms independently selected from N, O and S; or

represents a 6 membered heteroaryl ring, which in addition to the C=N shown optionally contains one or more further N atoms;

$R^{A1}$ is $C_{1-10}$ alkyl wherein the alkyl group is optionally substituted by one or more $R^{A'}$ wherein $R^{A'}$ is selected from the group consisting of halo, $C_{1-6}$ haloalkyl, hydroxy, cyano, $OG^1$, $S(O)_{0-2}G^1$, $SF_5$, $C_{3-7}$ cycloalkyl, 5-7-membered heterocyclyl, and phenyl, wherein the phenyl is optionally substituted by $C_{1-2}$ haloalkyl, $C_{1-2}$ haloalkoxy or one or more halo atoms; wherein said $C_{3-7}$ cycloalkyl and said 5-7-membered heterocyclyl are optionally substituted by one or more groups selected from halo, $C_{1-3}$ alkyl and $C_{1-3}$ haloalkyl; and/or $R^{A'}$ represents two alkyl groups which are attached to the same carbon atom and joined to form a $C_{3-7}$ cycloalkyl ring; or $R^{A1}$ is selected from the group consisting of $C_{2-10}$ alkenyl, $C_{2-10}$ alkynyl, $-(CH_2)_{0-6}-C_{3-10}$ cycloalkyl, $-(CH_2)_{0-6}-C_{5-10}$ spirocycloalkyl, $-(CH_2)_{0-6}$-aryl and $-O$-aryl; wherein $R^{A1}$ is optionally substituted by one or more $R^{A''}$ wherein $R^{A''}$ is selected from the group consisting of halo, $C_{1-6}$ alkyl, $C_{1-6}$ haloalkyl, hydroxy, cyano, $OG^1$, $S(O)_{0-2}G^1$, $SF_5$, $(CH_2)_{0-3}C_{3-7}$ cycloalkyl, 5-7-membered heterocyclyl, and phenyl, wherein the phenyl is optionally substituted by $C_{1-2}$ haloalkyl, $C_{1-2}$ haloalkoxy or one or more halo atoms; wherein said $C_{3-7}$ cycloalkyl and said 5-7-membered heterocyclyl are optionally substituted by one or more groups selected from halo, $C_{1-3}$ alkyl and $C_{1-3}$ haloalkyl; and/or $R^{A1}$ is optionally substituted by two $R^{A''}$ substituents wherein both $R^{A''}$ are $C_{1-6}$ alkyl which are attached to the same carbon atom and are joined to form a $C_{3-7}$ cycloalkyl ring; and wherein the $C_{3-10}$ cycloalkyl group is optionally fused to a phenyl ring which phenyl ring is optionally substituted by one or more halo atoms;

wherein $G^1$ is $C_{1-6}$ alkyl, $C_{3-7}$ cycloalkyl, $C_{1-6}$ haloalkyl, or $(CH_2)_{0-1}$phenyl, wherein $G^1$ is optionally substituted by one or more $G^{1'}$ wherein $G^{1'}$ is selected from the group consisting of halo, $C_{1-2}$ alkyl, $C_{1-2}$ haloalkyl, hydroxy, cyano, nitro, $C_{1-2}$ alkoxy and $C_{1-2}$ haloalkoxy;

$R^{A2}$ is selected from the group consisting of halo, $C_{1-6}$ alkyl, $C_{2-6}$ alkenyl, $C_{2-6}$ alkynyl, $C_{1-6}$ haloalkyl, hydroxy, cyano, nitro, $NR^1R^2$, $OG^2$ and $S(O)_{0-2}G^2$;

wherein $G^2$ is $C_{1-6}$ alkyl, $C_{3-7}$ cycloalkyl, $C_{1-6}$ haloalkyl, or phenyl, wherein $G^2$ is optionally substituted by one or more $G^{2'}$ wherein $G^{2'}$ is selected from the group consisting of halo, $C_{1-2}$ alkyl, $C_{1-2}$ haloalkyl, hydroxy, cyano, nitro, $C_{1-2}$ alkoxy and $C_{1-2}$ haloalkoxy; and wherein $R^1$ and $R^2$ are independently H or $C_{1-2}$ alkyl or, taken together, $R^1$ and $R^2$ may combine to form a 5-7 membered heterocyclic ring;

or $R^{A2}$ is absent;

$R^B$ is selected from the group consisting of $CH_2COOH$, $CH_2CH_2COOH$, $CH_2$tetrazolyl and $CH_2CH_2$tetrazolyl, wherein $R^B$ is optionally substituted on an available carbon atom by one or more $R^{B'}$ wherein $R^{B'}$ is selected from the group consisting of difluoromethyl, trifluoromethyl and methyl; and/or wherein $R^B$ is optionally substituted by two $R^{B'}$ groups, attached to the same carbon atom, that are joined to form a $C_{3-6}$ cycloalkyl or a 4-6-membered heterocyclyl ring;

$R^C$ and $R^D$ are each independently H, $C_{1-2}$ alkyl, hydroxy, $C_{1-2}$ alkoxy or fluoro; or $R^C$ and $R^D$ may join to form a $C_{3-5}$ cycloalkyl ring;

wherein

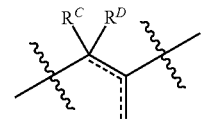

in the compound of formula (I) represents:

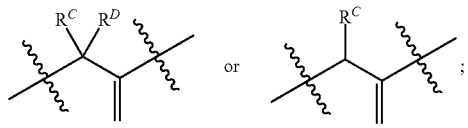

and
wherein,
the total number of carbon atoms in groups $R^{A1}$ and $R^{A2}$ taken together, including their optional substituents, is 5-14;
or a pharmaceutically acceptable salt and/or solvate thereof.

2. The compound according to claim 1, wherein

represents a 5 membered heteroaryl ring selected from the group consisting of imidazole, pyrazole, oxazole, isoxazole, thiazole, isothiazole, 1,2,3-triazole, 1,2,4-triazole, 1,2,4-oxadiazole, 1,2,5-oxadiazole, 1,3,4-oxadiazole, 1,2,4-thiadiazole, 1,2,5-thiadiazole, 1,3,4-thiadiazole and tetrazole.

3. The compound according to claim 1 wherein $R^{A1}$ is $C_{1-10}$ alkyl.

4. The compound according to claim 3 wherein $R^{A1}$ is not substituted.

5. The compound according to claim 1 wherein $R^{A1}$ is —$(CH_2)_{0-6}$-aryl.

6. The compound according to claim 5 wherein $R^{A1}$ is substituted by one or more $R^{A''}$.

7. The compound according to claim 5 wherein $R^{A1}$ is substituted by two $R^{A''}$ substituents wherein both $R^{A''}$ are $C_{1-6}$ alkyl which are attached to the same carbon atom and joined to form a $C_{3-7}$ cycloalkyl ring.

8. The compound according to claim 1, wherein $R^{A2}$ is absent.

9. The compound according to claim 1 wherein

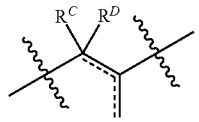

in the compound of formula (I) represents:

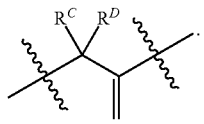

10. The compound according to claim 1, selected from the group consisting of:
2-((2-((3-octyl-1,2,4-oxadiazol-5-yl)methyl)acryloyl)oxy)acetic acid;
2-((2-((3-octyl-1,2,4-oxadiazol-5-yl)methyl)acryloyl)oxy)propanoic acid;
2-((2-((3-(4-chlorobenzyl)-1,2,4-oxadiazol-5-yl)methyl)acryloyl)oxy)acetic acid;
2-((2-((3-(1-(4-(trifluoromethyl)phenyl)cyclopropyl)-1,2,4-oxadiazol-5-yl)methyl)acryloyl)oxy)acetic acid;
(R)-4,4,4-trifluoro-3-((2-((3-octyl-1,2,4-oxadiazol-5-yl)methyl)acryloyl)oxy)butanoic acid;
(S)-4,4,4-trifluoro-3-((2-((3-octyl-1,2,4-oxadiazol-5-yl)methyl)acryloyl)oxy)butanoic acid;
(R)-4,4,4-trifluoro-3-((2-((3-(1-(4-(trifluoromethyl)phenyl)cyclopropyl)-1,2,4-oxadiazol-5-yl)methyl)acryloyl)oxy)butanoic acid;
(S)-4,4,4-trifluoro-3-((2-((3-(1-(4-(trifluoromethyl)phenyl)cyclopropyl)-1,2,4-oxadiazol-5-yl)methyl)acryloyl)oxy)butanoic acid;
(R)-3-((2-((3-(4-butylbenzyl)-1,2,4-oxadiazol-5-yl)methyl)acryloyl)oxy)-4,4,4-trifluorobutanoic acid;
(S)-3-((2-((3-(4-butylbenzyl)-1,2,4-oxadiazol-5-yl)methyl)acryloyl)oxy)-4,4,4-trifluorobutanoic acid;
(R)-4,4,4-trifluoro-3-((2-((3-(4-pentylbenzyl)-1,2,4-oxadiazol-5-yl)methyl)acryloyl)oxy)butanoic acid;
(S)-4,4,4-trifluoro-3-((2-((3-(4-pentylbenzyl)-1,2,4-oxadiazol-5-yl)methyl)acryloyl)oxy)butanoic acid;
2-((2-((3-(4-butylbenzyl)-1,2,4-oxadiazol-5-yl)methyl)acryloyl)oxy)acetic acid;
2-(1H-tetrazol-5-yl)ethyl 2-((3-(4-butylbenzyl)-1,2,4-oxadiazol-5-yl)methyl)acrylate;
3-((2-((3-(4-butylbenzyl)-1,2,4-oxadiazol-5-yl)methyl)acryloyl)oxy)propanoic acid;
(1H-tetrazol-5-yl)methyl 2-((3-(4-butylbenzyl)-1,2,4-oxadiazol-5-yl)methyl)acrylate;
4,4,4-trifluoro-2,2-dimethyl-3-((2-((3-octyl-1,2,4-oxadiazol-5-yl)methyl)acryloyl)oxy)butanoic acid;
2-((2-((3-(1-(4-bromophenyl)cyclopropyl)-1,2,4-oxadiazol-5-yl)methyl)acryloyl)oxy)acetic acid;
2-((2-((3-(1-(4-(trifluoromethoxy)phenyl)cyclopropyl)-1,2,4-oxadiazol-5-yl)methyl)acryloyl)oxy)acetic acid;
2-((2-((3-(4-(trifluoromethoxy)benzyl)-1,2,4-oxadiazol-5-yl)methyl)acryloyl)oxy)acetic acid; and
2-((2-((3-pentyl-1,2,4-oxadiazol-5-yl)methyl)acryloyl)oxy)acetic acid; and
2-((2-((3-(1-(4-((trifluoromethyl)thio)phenyl)cyclopropyl)-1,2,4-oxadiazol-5-yl)methyl)acryloyl)oxy)acetic acid;

or a pharmaceutically acceptable salt and/or solvate thereof.

11. A pharmaceutical composition comprising the compound of formula (I) according to claim 1, and one or more pharmaceutically acceptable diluents or carriers.

12. A method of treating an inflammatory disease or a disease associated with an undesirable immune response, which comprises administering a compound according to claim 1.

13. The method according to claim 12, wherein the inflammatory disease or disease associated with an undesirable immune response is, or is associated with, a disease selected from the group consisting of: psoriasis (including chronic plaque, erythrodermic, pustular, guttate, inverse and nail variants), asthma, chronic obstructive pulmonary disease (COPD, including chronic bronchitis and emphysema), heart failure (including left ventricular failure), myocardial infarction, angina pectoris, other atherosclerosis and/or atherothrombosis-related disorders (including peripheral vascular disease and ischaemic stroke), a mitochondrial and neurodegenerative disease, autoimmune paraneoplastic retinopathy, transplantation rejection (including antibody-mediated and T cell-mediated forms), multiple sclerosis, transverse myelitis, ischaemia-reperfusion injury, AGE-induced genome damage, an inflammatory bowel disease, primary sclerosing cholangitis (PSC), PSC-autoimmune hepatitis overlap syndrome, non-alcoholic fatty liver disease (non-alcoholic steatohepatitis), rheumatica, granuloma annulare, cutaneous lupus erythematosus (CLE), systemic lupus erythematosus (SLE), lupus nephritis, drug-induced lupus, autoimmune myocarditis or myopericarditis, Dressler's syndrome, giant cell myocarditis, post-pericardiotomy syndrome, drug-induced hypersensitivity syndromes (including hypersensitivity myocarditis), eczema, sarcoidosis, erythema nodosum, acute disseminated encephalomyelitis (ADEM), neuromyelitis optica spectrum disorders, MOG (myelin oligodendrocyte glycoprotein) antibody-associated disorders (including MOG-EM), optic neuritis, CLIPPERS (chronic lymphocytic inflammation with pontine perivascular enhancement responsive to steroids), diffuse myelinoclastic sclerosis, Addison's disease, alopecia areata, ankylosing spondylitis, other spondyloarthritides (including peripheral spondyloarthritis, that is associated with psoriasis, inflammatory bowel disease, reactive arthritis or juvenile onset forms), antiphospholipid antibody syndrome, autoimmune hemolytic anaemia, autoimmune hepatitis, autoimmune inner ear disease, pemphigoid (including bullous pemphigoid, mucous membrane pemphigoid, cicatricial pemphigoid, herpes gestationis or pemphigoid gestationis, ocular cicatricial pemphigoid), linear IgA disease, Behçet's disease, celiac disease, Chagas disease, dermatomyositis, diabetes mellitus type I, endometriosis, Goodpasture's syndrome, Graves' disease, Guillain-Barre syndrome and its subtypes (including acute inflammatory demyelinating polyneuropathy, AIDP, acute motor axonal neuropathy (AMAN), acute motor and sensory axonal neuropathy (AMSAN), pharyngeal-cervical-brachial variant, Miller-Fisher variant and Bickerstaff's brainstem encephalitis), progressive inflammatory neuropathy, Hashimoto's disease, hidradenitis suppurativa, inclusion body myositis, necrotising myopathy, Kawasaki disease, IgA nephropathy, Henoch-Schonlein purpura, idiopathic thrombocytopenia purpura, thrombotic thrombocytopenia purpura (TTP), Evans' syndrome, interstitial cystitis, mixed connective tissue disease, undifferentiated connective tissue disease, morphea, myasthenia gravis (including MuSK antibody positive and seronegative variants), narcolepsy, neuromyotonia, pemphigus vulgaris, pernicious anaemia, psoriatic arthritis, polymyositis, primary biliary cholangitis (also known as primary biliary cirrhosis), rheumatoid arthritis, palindromic rheumatism, schizophrenia, autoimmune (meningo-) encephalitis syndromes, scleroderma, Sjogren's syndrome, stiff person syndrome, polymylagia rheumatica, giant cell arteritis (temporal arteritis), Takayasu arteritis, polyarteritis nodosa, Kawasaki disease, granulomatosis with polyangitis (GPA; formerly known as Wegener's granulomatosis), eosinophilic granulomatosis with polyangiitis (EGPA; formerly known as Churg-Strauss syndrome), microscopic polyarteritis/polyangiitis, hypocomplementaemic urticarial vasculitis, hypersensitivity vasculitis, cryoglobulinemia, thromboangiitis obliterans (Buerger's disease), vasculitis, leukocytoclastic vasculitis, vitiligo, acute disseminated encephalomyelitis, adrenoleukodystrophy, Alexander's disease, Alper's disease, balo concentric sclerosis or Marburg disease, cryptogenic organising pneumonia (formerly known as bronchiolitis obliterans organizing pneumonia), Canavan disease, central nervous system vasculitic syndrome, Charcot-Marie-Tooth disease, childhood ataxia with central nervous system hypomyelination, chronic inflammatory demyelinating polyneuropathy (CIDP), diabetic retinopathy, globoid cell leukodystrophy (Krabbe disease), graft-versus-host disease (GVHD) (including acute and chronic forms, as well as intestinal GVHD), hepatitis C (HCV) infection or complication, herpes simplex viral infection or complication, human immunodeficiency virus (HIV) infection or complication, lichen planus, monomelic amyotrophy, cystic fibrosis, pulmonary arterial hypertension (PAH, including idiopathic PAH), lung sarcoidosis, idiopathic pulmonary fibrosis, paediatric asthma, atopic dermatitis, allergic dermatitis, contact dermatitis, allergic rhinitis, rhinitis, sinusitis, conjunctivitis, allergic conjunctivitis, keratoconjunctivitis sicca, dry eye, xerophthalmia, glaucoma, macular oedema, diabetic macular oedema, central retinal vein occlusion (CRVO), macular degeneration (including dry and/or wet age related macular degeneration, AMD), post-operative cataract inflammation, uveitis (including posterior, anterior, intermediate and pan uveitis), iridocyclitis, scleritis, corneal graft and limbal cell transplant rejection, gluten sensitive enteropathy (coeliac disease), dermatitis herpetiformis, eosinophilic esophagitis, achalasia, autoimmune dysautonomia, autoimmune encephalomyelitis, autoimmune oophoritis, autoimmune orchitis, autoimmune pancreatitis, aortitis and periaortitis, autoimmune retinopathy, autoimmune urticaria, Behcet's disease, (idiopathic) Castleman's disease, Cogan's syndrome, IgG4-related disease, retroperitoneal fibrosis, juvenile idiopathic arthritis including systemic juvenile idiopathic arthritis (Still's disease), adult-onset Still's disease, ligneous conjunctivitis, Mooren's ulcer, pityriasis lichenoides et varioliformis acuta (PLEVA, also known as Mucha-Habermann disease), multifocal motor neuropathy (MMN), paediatric acute-onset neuropsychiatric syndrome (PANS) (including paediatric autoimmune neuropsychiatric disorders associated with streptococcal infections (PANDAS)), paraneoplastic syndromes (including paraneoplastic cerebellar degeneration, Lambert-Eaton myaesthenic syndrome, limbic encephalitis, brainstem encephalitis, opsoclonus myoclonus ataxia syndrome, anti-NMDA receptor encephalitis, thymoma-associated multiorgan autoimmunity), perivenous encephalomyelitis, reflex sympathetic dystrophy, relapsing polychondritis, sperm & testicular autoimmunity, Susac's syndrome, Tolosa-Hunt syndrome, Vogt-Koyanagi-Harada Disease, anti-synthetase syndrome, autoimmune enteropathy, immune dysregulation polyendocrinopathy enteropathy X-linked (IPEX), microscopic colitis, autoimmune lymphoproliferative syndrome (ALPS), autoimmune polyendocrinopathy-candidiasis-ectodermal dystrophy syndrome (APEX), gout, pseudogout, amyloid (including AA or secondary amyloidosis), eosinophilic fasciitis (Shulman syndrome) progesterone hypersensitivity (including progesterone dermatitis), amilial Mediterranean fever (FMF), tumour necrosis factor (TNF) receptor-associated periodic fever syndrome (TRAPS), hyperimmunoglobulinaemia D with periodic fever syndrome (HIDS), PAPA (pyogenic arthritis, pyoderma gangrenosum, severe cystic acne) syndrome, deficiency of interleukin-1 receptor antagonist (DIRA), deficiency of the interleukin-36-receptor antagonist (DITRA), cryopyrin-associated periodic syndromes (CAPS) (including familial cold autoinflammatory syndrome [FCAS], Muckle-Wells syndrome, neonatal onset multisystem inflammatory disease [NOMID]), NLRP12-associated autoinflammatory disorders (NLRP12AD), periodic fever aphthous stomatitis (PFAPA), chronic atypical neutrophilic dermatosis with lipodystrophy and elevated temperature (CANDLE), Majeed syndrome, Blau syndrome (also known as juvenile systemic granulomatosis), macrophage activation syndrome, chronic recurrent multifocal osteomyelitis (CRMO), familial cold autoinflammatory syndrome, mutant adenosine deaminase 2 and monogenic interferonopathies (including Aicardi-Goutières syndrome, retinal vasculopathy with cerebral leukodystrophy, spondyloenchondrodysplasia, STING [stimulator of interferon genes]-associated vasculopathy with onset in infancy, proteasome associated autoinflammatory syndromes, familial chilblain lupus, dyschromatosis symmetrica hereditaria), Schnitzler syndrome; familial cylindromatosis, congenital B cell lymphocytosis, OTULIN-related autoinflammatory syndrome, type 2 diabetes mellitus, insulin resistance and the metabolic syndrome (including obesity-associated inflammation), atherosclerotic disorders.

14. The compound according to claim 6 wherein $R^{A''}$ is selected from the group consisting of halo, $C_{1-6}$ alkyl, $C_{1-6}$ haloalkyl, $OG^1$ wherein $G^1$ is $C_{1-6}$ haloalkyl, and $SC_{1-4}$ haloalkyl.

15. The compound according to claim 1, wherein $R^C$ is H and $R^D$ is H.

16. The compound according to claim 1, wherein $R^B$ is $CH_2COOH$ or $CH_2CH_2COOH$.

17. The compound according to claim 1, wherein $R^B$ is $CH_2$tetrazolyl or $CH_2CH_2$tetrazolyl.

18. The compound according to claim 1, wherein $R^B$ is substituted on an available carbon atom by one or more $R^{B'}$ and $R^{B'}$ is trifluoromethyl.

19. A process for the preparation of a compound of formula (I) or a salt and/or solvate thereof which comprises the step of:

reacting a compound of formula (III)

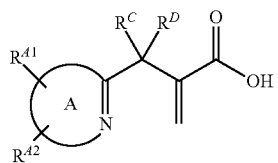

(III)

or a salt thereof;

with X—$R^B$—P or a salt thereof;

wherein $R^{A1}$, $R^{A2}$, A, $R^B$, $R^C$ and $R^D$ are as defined in claim 1, X represents a leaving group, and P represents a carboxylic acid protecting group;

followed by removing the protecting group P; or reacting a compound of formula (III)

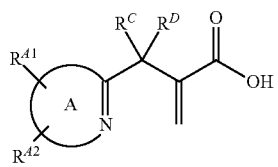

(III)

or a salt thereof;

with HO—$R^B$—P or a salt thereof;

wherein $R^{A1}$, $R^{A2}$, A, $R^B$, $R^C$ and $R^D$ are as defined in claim 1, and P represents a carboxylic acid protecting group or a tetrazolyl protecting group;

followed by removing the protecting group P; or reacting a compound of formula (III)

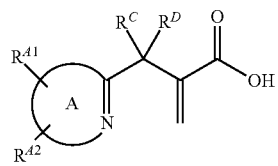

(III)

or a salt thereof;

with X—$R^B$—P or a salt thereof;

wherein $R^{A1}$, $R^{A2}$, A, $R^B$, $R^C$ and $R^D$ are as defined in claim 1, X represents a leaving group, and P represents a tetrazolyl protecting group;

followed by removing the protecting group P.

* * * * *